United States Patent
Zhang et al.

(10) Patent No.: US 10,971,007 B2
(45) Date of Patent: Apr. 6, 2021

(54) ROAD CONDITION INFORMATION SHARING METHOD

(71) Applicant: Huawei Technologies Co., Ltd., Shenzhen (CN)

(72) Inventors: Huimin Zhang, Shenzhen (CN); Kangmin Huang, Shenzhen (CN); Heng Liao, Shenzhen (CN); Rongdao Yu, Shenzhen (CN); Shanxi Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/954,028

(22) Filed: Apr. 16, 2018

(65) Prior Publication Data

US 2018/0233042 A1 Aug. 16, 2018

Related U.S. Application Data

(63) Continuation of application No. PCT/CN2015/092135, filed on Oct. 16, 2015.

(51) Int. Cl.
*G08G 1/09* (2006.01)
*G08G 1/0967* (2006.01)
(Continued)

(52) U.S. Cl.
CPC ... *G08G 1/096791* (2013.01); *G06K 9/00791* (2013.01); *G08G 1/00* (2013.01); *G08G 1/0175* (2013.01)

(58) Field of Classification Search
CPC .... G06K 9/00791; G08G 1/00; G08G 1/0175; G08G 1/096791
(Continued)

(56) References Cited

U.S. PATENT DOCUMENTS

2003/0052796 A1 3/2003 Schmidt et al.
2007/0162550 A1* 7/2007 Rosenberg ............. H04L 51/04
709/206
(Continued)

FOREIGN PATENT DOCUMENTS

CN 1645436 A 7/2005
CN 101286267 A 10/2008
(Continued)

OTHER PUBLICATIONS

CN/201580003163.8, Office Action, dated May 29, 2019.

*Primary Examiner* — Naomi J Small
(74) *Attorney, Agent, or Firm* — Leydig, Voit & Mayer, Ltd.

(57) ABSTRACT

Embodiments of the present invention disclose a road condition information sharing method. The method includes: receiving, by a server, a road condition information request sent by a first terminal, where the road condition information request carries a road condition position of concern; determining, by the server, a second terminal according to the road condition position of concern, where the second terminal has a road condition recording capability, and a distance between the second terminal and the road condition position of concern is less than a preset threshold; and sending, by the server, a road condition sharing request to the second terminal, so that the second terminal shares a road condition according to the road condition position of concern.

12 Claims, 23 Drawing Sheets

(51) Int. Cl.
 *G08G 1/00* (2006.01)
 *G06K 9/00* (2006.01)
 *G08G 1/017* (2006.01)

(58) Field of Classification Search
 USPC .......................................................... 340/905
 See application file for complete search history.

(56) References Cited

U.S. PATENT DOCUMENTS

| | | | |
|---|---|---|---|
| 2013/0065607 A1* | 3/2013 | Soulie | G08G 1/0112 455/456.1 |
| 2013/0132434 A1* | 5/2013 | Scofield | G08G 1/0112 707/771 |
| 2014/0324247 A1* | 10/2014 | Jun | G07C 5/0866 701/1 |
| 2015/0039361 A1 | 2/2015 | Crowther et al. | |
| 2015/0127724 A1 | 5/2015 | Xue et al. | |
| 2016/0019791 A1* | 1/2016 | Lin | G06K 9/325 382/105 |
| 2016/0057335 A1* | 2/2016 | Pisz | G08G 1/09675 348/149 |
| 2016/0231122 A1* | 8/2016 | Beaurepaire | G01C 21/3461 |

FOREIGN PATENT DOCUMENTS

| | | |
|---|---|---|
| CN | 101916509 A | 12/2010 |
| CN | 102354119 A | 2/2012 |
| CN | 102436737 A | 5/2012 |
| CN | 102542747 A | 7/2012 |
| CN | 102724773 A | 10/2012 |
| CN | 102938199 A | 2/2013 |
| CN | 202815222 U | 3/2013 |
| CN | 103021163 A | 4/2013 |
| CN | 103164885 A | 6/2013 |
| CN | 103310634 A | 9/2013 |
| CN | 103500503 A | 1/2014 |
| CN | 103546362 A | 1/2014 |
| CN | 203433558 U | 2/2014 |
| CN | 103700254 A | 4/2014 |
| CN | 103824449 A | 5/2014 |
| CN | 203706276 U | 7/2014 |
| CN | 203706426 U | 7/2014 |
| CN | 103971521 A | 8/2014 |
| CN | 103996293 A | 8/2014 |
| CN | 104077819 A | 10/2014 |
| CN | 104183120 A | 12/2014 |
| CN | 104202673 A | 12/2014 |
| CN | 104333596 A | 2/2015 |
| CN | 104535073 A | 4/2015 |
| CN | 104835214 A | 8/2015 |
| CN | 104882001 A | 9/2015 |
| CN | 104978861 A | 10/2015 |
| CN | 104980343 A | 10/2015 |
| KR | 20120133635 A | 12/2012 |
| TW | M452566 U | 5/2013 |

* cited by examiner

ROAD CONDITION INFORMATION SHARING METHOD

CROSS-REFERENCE TO RELATED APPLICATIONS

This application is a continuation of International Application No. PCT/CN2015/092135, filed on Oct. 16, 2015. the disclosure of which is hereby incorporated by reference in its entirety.

TECHNICAL FIELD

The present invention relates to the field of Internet technologies, and in particular, to a road condition information sharing method.

BACKGROUND

With growing development of in-vehicle device technologies and people's increasing concern about driving safety, more road condition information recording devices are mounted on vehicles to photograph and record images or videos in driving processes. In the prior art, an angle of view and information of a road condition recorded by a road condition information recording device on a vehicle of a user are limited, and usually cannot meet a driving requirement of the user.

SUMMARY

In view of this, embodiments of the present invention provide a road condition information sharing method, so that road condition information recorded by another second terminal can be obtained, and a user can obtain more comprehensive road condition information.

To resolve the foregoing technical problem, a first aspect of the embodiments of the present invention provides a road condition information sharing method, and the method includes:
  receiving, by a server, a road condition information request sent by a first terminal, where the road condition information request carries a road condition position of concern;
  determining, by the server, a second terminal according to the road condition position of concern, where the second terminal has a road condition recording capability, and a distance between the second terminal and the road condition position of concern is less than a preset threshold; and
  sending, by the server, a road condition sharing request to the second terminal, so that the second terminal shares a road condition according to the road condition position of concern.

In a first possible implementation of the first aspect, after the sending, by the server, a road condition sharing request to the second terminal, the method further includes:
  receiving, by the server, road condition information that is corresponding to the road condition position of concern and submitted by the second terminal; and
  sending, by the server, the road condition information corresponding to the road condition position of concern to the first terminal.

With reference to the first possible implementation of the first aspect, in a second possible implementation, the road condition information corresponding to the road condition position of concern includes a road condition photographing position; and after the receiving, by the server, road condition information that is corresponding to the road condition position of concern and submitted by the second terminal according to the road condition sharing request, the method further includes:
  identifying, by the server, a driving accident image from the road condition information corresponding to the road condition position of concern; and
  sending, by the server, road condition information corresponding to the driving accident image to the first terminal if a photographing position corresponding to the driving accident image matches the road condition position of concern.

With reference to the second possible implementation of the first aspect, in a third possible implementation, the road condition information request further carries a time point of concern;
  the road condition information corresponding to the road condition position of concern further includes a road condition photographing time; and
  after the identifying, by the server, a driving accident image from the road condition information corresponding to the road condition position of concern, the method further includes:
  sending, by the server, the road condition information corresponding to the driving accident image to the first terminal if the photographing position corresponding to the driving accident image matches the road condition position of concern and a photographing time corresponding to the driving accident image matches the time point of concern.

With reference to any one of the first aspect, or the first to the third possible implementations of the first aspect, in a fourth possible implementation, the determining, by the server, a second terminal according to the road condition position of concern includes:
  obtaining position information reported by all terminals within a preset time period;
  screening the reported position information to determine third terminals, where distances between the third terminals and the road condition position of concern are less than a preset distance;
  determining road condition recording capabilities of the third terminals; and
  determining a third terminal whose road condition recording capability meets a preset criterion as the second terminal.

With reference to any one of the first to the fourth possible implementations of the first aspect, in a fifth possible implementation, before the sending, by the server, the road condition information corresponding to the road condition position of concern to the first terminal, the method further includes:
  performing, by the server according to a spatial relationship of road condition recording positions of second terminals, image compositing on road condition information that is corresponding to the road condition position of concern and submitted by at least one second terminal; and
  the sending, by the server, the road condition information corresponding to the road condition position of concern to the first terminal includes:
  sending, to the first terminal, the road condition information that is corresponding to the road condition position of concern and on which image compositing is performed.

A second aspect of the embodiments of the present invention provides a road condition information sharing method, and the method includes:
  sending, by a first terminal, a road condition information request to a server, where the road condition information request carries a road condition position of concern, so that the server determines a second terminal according to the road condition position of concern, and sends a road condition sharing request to the second terminal, where the second terminal has a road condition recording capability, and a distance between the second terminal and the road condition position of concern is less than a preset threshold; and receiving, by the first terminal, road condition information that is corresponding to the road condition position of concern and sent by the second terminal according to the road condition sharing request.

In a first possible implementation of the second aspect, the method further includes:

performing, by the first terminal according to a spatial relationship of road condition recording positions of second terminals, image compositing on road condition information that is corresponding to the road condition position of concern and sent by at least one second terminal; and displaying, by the first terminal, the road condition information that is corresponding to the road condition position of concern and on which image compositing is performed.

In a second possible implementation of the second aspect, the road condition information that is corresponding to the road condition position of concern and sent by the second terminal carries the road condition recording capability of the second terminal; and the method further includes:

displaying, by the first terminal, the road condition information corresponding to the road condition position of concern according to the road condition recording capability of the second terminal.

With reference to any one of the second aspect, or the first or the second possible implementation of the second aspect, in a third possible implementation, the method further includes:

reporting, by the first terminal to an accident assessment server, the road condition information that is corresponding to the road condition position of concern and sent by the second terminal.

With reference to any one of the second aspect, or the first to the third possible implementations of the second aspect, in a fourth possible implementation, the road condition information corresponding to the road condition position of concern is static information or driving state information of a surrounding vehicle that is photographed by the second terminal in real time; and after the receiving, by the first terminal, road condition information that is corresponding to the road condition position of concern and sent by the second terminal, the method further includes:

determining, by the first terminal according to the static information or the driving state information of the surrounding vehicle of the second terminal, whether the surrounding vehicle has a security risk; and if determining that the surrounding vehicle has a security risk, sending a driving security prompt according to the surrounding vehicle that has a security risk.

A third aspect of the embodiments of the present invention provides a road condition information sharing method, and the method includes:

reporting, by a second terminal, position information to a server;

receiving, by the second terminal, a road condition sharing request sent by the server according to the position information, where the road condition sharing request carries a specified road condition position of concern; and sharing, by the second terminal, a road condition according to the road condition position of concern.

In a first possible implementation of the third aspect, the road condition sharing request further carries a terminal identifier of a first terminal; and the sharing, by the second terminal, a road condition according to the road condition position of concern includes:

sending, by the second terminal, road condition information corresponding to the road condition position of concern to the first terminal according to the terminal identifier of the first terminal.

With reference to the first possible implementation of the third aspect, in a second possible implementation, the sending, by the second terminal, road condition information corresponding to the road condition position of concern to the first terminal according to the terminal identifier of the first terminal includes:

submitting, by the second terminal, a road driving condition corresponding to the position of concern to a network base station, where the road driving condition carries the terminal identifier of the first terminal, so that the network base station sends the road driving condition corresponding to the position of concern to the first terminal.

With reference to the first possible implementation of the third aspect, in a third possible implementation, the road condition information corresponding to the road condition position of concern includes a road condition photographing position; and after the receiving, by the second terminal, a road condition sharing request sent by the server according to the position information, the method further includes:

identifying, by the second terminal, a driving accident image from the road condition information corresponding to the road condition position of concern; and sending, by the second terminal, road condition information corresponding to the driving accident image to the first terminal according to the terminal identifier of the first terminal if a photographing position corresponding to the driving accident image matches the road condition position of concern.

With reference to the third possible implementation of the third aspect, in a fourth possible implementation, the road condition sharing request further carries a time point of concern; and after the receiving, by the second terminal, a road condition sharing request sent by the server according to the position information, the method further includes:

sending, by the second terminal, the road condition information corresponding to the driving accident image to the first terminal according to the terminal identifier of the first terminal if the photographing position corresponding to the driving accident image matches the road condition position of concern and a photographing time corresponding to the driving accident image matches the time point of concern.

With reference to any one of the third aspect, or the first to the fourth possible implementations of the third aspect, in a fifth possible implementation, when sharing the road condition according to the road condition position of concern, the second terminal further shares a road condition recording capability of the second terminal.

A fourth aspect of the embodiments of the present invention provides a road condition information obtaining method, and the method includes:

determining, by a road accident condition reporting device, an accident occurrence position and an accident occurrence time point;

sending, by the road accident condition reporting device, a road condition information request to a second terminal, where the second terminal has a road condition recording capability, and a distance between the accident occurrence position and the second terminal at the accident occurrence time point is less than a preset threshold;

receiving, by the road accident condition reporting device, road condition information that is corresponding to the accident occurrence position and sent by the second terminal; and reporting, by the road accident condition reporting device to an accident assessment server, the road condition information that is corresponding to the accident occurrence position and sent by the second terminal, so that the accident assessment server performs accident assessment according to the road condition information corresponding to the accident occurrence position.

In a first possible implementation of the fourth aspect, before the sending, by the road accident condition reporting device, a road condition information request to a second terminal, the method further includes:

establishing, by the road accident condition reporting device, a communication connection to the second terminal that is located in a preset area around the accident occurrence position at the accident occurrence time point.

With reference to the first possible implementation of the fourth aspect, in a second possible implementation, the establishing a communication connection to the second terminal that is located in a preset area around the accident occurrence position at the accident occurrence time point includes:

submitting, by the road accident condition reporting device, the accident occurrence position and the accident occurrence time point to a server, so that the server determines the second terminal according to the accident occurrence position and the accident occurrence time point;

receiving, by the road accident condition reporting device, communication connection information of the second terminal that is sent by the server; and establishing, by the road accident condition reporting device, the communication connection to the second terminal according to the communication connection information of the second terminal.

With reference to any one of the fourth aspect, or the first or the second possible implementation of the fourth aspect, in a third possible implementation, the determining, by a road accident condition reporting device, an accident occurrence position and an accident occurrence time point includes:

obtaining, by means of identification, a driving accident image in road condition information photographed by the road accident condition reporting device, extracting a photographing position and a photographing time corresponding to the driving accident image obtained by means of identification, and using the photographing position and the photographing time as the accident occurrence position and the accident occurrence time point respectively.

A fifth aspect of the embodiments of the present invention provides a road condition information obtaining method, and the method includes:

determining, by a road condition reporting initiation device, an accident occurrence position and an accident occurrence time point;

sending, by the road condition reporting initiation device, a road condition information request to a second terminal, where the second terminal has a road condition recording capability, and a distance between the accident occurrence position and the second terminal at the accident occurrence time point is less than a preset threshold, so that the second terminal reports road condition information corresponding to the accident occurrence position to an accident assessment server.

In a first possible implementation of the fifth aspect, the method further includes:

determining, by the road condition reporting initiation device, a third terminal that meets a road accident condition rephotographing qualification, where the road accident condition rephotographing qualification includes: the accident occurrence position is located ahead of a driving route of the third terminal; and sending, by the road condition reporting initiation device, a road accident condition rephotographing request to the third terminal, where the road condition rephotographing request carries the accident occurrence position, so that the third terminal obtains a rephotographed road driving condition corresponding to the accident occurrence position, and reports the rephotographed road driving condition corresponding to the accident occurrence position to the accident assessment server.

With reference to the first possible implementation of the fifth aspect, in a second possible implementation, the determining, by the road condition reporting initiation device, a third terminal that meets a road accident condition rephotographing qualification includes:

broadcasting the road accident condition rephotographing qualification to a road condition recording terminal in an area to which the accident occurrence position belongs, so that the road condition recording terminal in the area to which the accident occurrence position belongs detects whether the road condition recording terminal meets the road accident condition rephotographing qualification; and determining, according to a rephotographing qualification acknowledgement message returned by the road condition recording terminal in the area to which the accident occurrence position belongs, the third terminal that meets the road accident condition rephotographing qualification.

With reference to the first possible implementation of the fifth aspect, in a third possible implementation, the determining, by the road condition reporting initiation device, a third terminal that meets a road accident condition rephotographing qualification includes:

obtaining driving state information of a road condition recording terminal in an area to which the accident occurrence position belongs;

determining whether the driving state information of the road condition recording terminal in the area to which the accident occurrence position belongs meets the road accident condition rephotographing qualification; and determining a road condition recording terminal whose driving state information meets the road accident condition rephotographing qualification as the third terminal.

A sixth aspect of the embodiments of the present invention provides a road condition information prompting method, and the method includes:

obtaining current real-time road condition information that includes static information or driving state information of a surrounding vehicle that is photographed in real time; and determining, according to the static information or the driving state information of the surrounding vehicle, whether the surrounding vehicle has a security risk; and if the surrounding vehicle has a security risk, sending a driving security prompt according to the surrounding vehicle that has a security risk.

In a first possible implementation of the sixth aspect, the static information of the surrounding vehicle includes vehicle license plate information or a vehicle model identity; and the determining, according to the static information of the surrounding vehicle, whether the surrounding vehicle has a security risk includes:

uploading the vehicle license plate information or the vehicle model identity of the surrounding vehicle to a server;

receiving vehicle security information that is delivered by the server according to the driving security record of the vehicle corresponding to the vehicle license plate information or the vehicle model identity; and determining, according to the vehicle security information, whether the surrounding vehicle has a security risk.

In a second possible implementation of the sixth aspect, the driving state information of the surrounding vehicle includes a speed or a driving path of the corresponding vehicle; and the determining, according to the driving state information of the surrounding vehicle, whether the surrounding vehicle has a security risk includes:

determining, according to the speed or the driving path of the surrounding vehicle, whether a driver in the surrounding vehicle is in an abnormal state; and if the driver is in an abnormal state, considering that the surrounding vehicle has a security risk.

A seventh aspect of the present invention provides a server, and the server includes:

a road condition request receiving module, configured to receive a road condition information request sent by a first terminal, where the road condition information request carries a road condition position of concern;

a terminal searching module, configured to determine a second terminal according to the road condition position of concern, where the second terminal has a road condition recording capability, and a distance between the second terminal and the road condition position of concern is less than a preset threshold; and a sharing request sending module, configured to send a road condition sharing request to the second terminal, so that the second terminal shares a road condition according to the road condition position of concern.

In a first possible implementation of the seventh aspect, the server further includes:

a road condition information receiving module, configured to receive road condition information that is corresponding to the road condition position of concern and submitted by the second terminal; and a road condition information sending module, configured to send the road condition information corresponding to the road condition position of concern to the first terminal.

With reference to the first possible implementation of the seventh aspect, in a second possible implementation, the road condition information corresponding to the road condition position of concern includes a road condition photographing position; and the server further includes:

an accident image identification module, configured to identify a driving accident image from the road condition information corresponding to the road condition position of concern; where the road condition information sending module is configured to send road condition information corresponding to the driving accident image to the first terminal when a photographing position corresponding to the driving accident image matches the road condition position of concern.

With reference to the second possible implementation of the seventh aspect, in a third possible implementation, the road condition information request further carries a time point of concern;

the road condition information corresponding to the road condition position of concern further includes a road condition photographing time; and the road condition information sending module is configured to send the road condition information corresponding to the driving accident image to the first terminal when the photographing position corresponding to the driving accident image matches the road condition position of concern and a photographing time corresponding to the driving accident image matches the time point of concern.

With reference to any one of the seventh aspect, or the first to the third possible implementations of the seventh aspect, in a fourth possible implementation, the terminal searching module includes:

a terminal position obtaining unit, configured to obtain position information reported by all terminals within a preset time period;

a terminal screening unit, configured to screen the reported position information to determine third terminals, where distances between the third terminals and the road condition position of concern are less than a preset distance;

a recording capability obtaining unit, configured to determine road condition recording capabilities of the third terminals; and a terminal determining unit, configured to determine a third terminal whose road condition recording capability meets a preset criterion as the second terminal.

With reference to any one of the first to the fourth possible implementations of the seventh aspect, in a fifth possible implementation, the server further includes:

an image compositing module, configured to perform, according to a spatial relationship of road condition recording positions of second terminals, image compositing on road condition information that is corresponding to the road condition position of concern and submitted by at least one second terminal; where the road condition information sending module is configured to send, to the first terminal, the road condition information that is corresponding to the road condition position of concern and on which image compositing is performed.

An eighth aspect of the embodiments of the present invention provides a terminal, and the terminal includes:

a road condition request module, configured to send a road condition information request to a server, where the road condition information request carries a road condition position of concern, so that the server determines a second terminal according to the road condition position of concern, and sends a road condition sharing request to the second terminal, where the second terminal has a road condition recording capability, and a distance between the second terminal and the road condition position of concern is less than a preset threshold; and a road condition receiving module, configured to receive road condition information that is corresponding to the road condition position of concern and sent by the second terminal according to the road condition sharing request.

In a first possible implementation of the eighth aspect, the terminal further includes:

an image compositing module, configured to perform, according to a spatial relationship of road condition recording positions of second terminals, image compositing on road condition information that is corresponding to the road condition position of concern and sent by at least one second terminal; and a road condition displaying module, configured to display the road condition information that is corresponding to the road condition position of concern and on which image compositing is performed.

In a second possible implementation of the eighth aspect, the road condition information that is corresponding to the road condition position of concern and sent by the second terminal carries the road condition recording capability of the second terminal; and the terminal further includes:

a road condition displaying module, configured to display the road condition information corresponding to the road condition position of concern according to the road condition recording capability of the second terminal.

With reference to any one of the eighth aspect, or the first or the second possible implementation of the eighth aspect, in a third possible implementation, the terminal further includes:

a road condition reporting module, configured to report, to an accident assessment server, the road condition information that is corresponding to the road condition position of concern and sent by the second terminal.

With reference to any one of the eighth aspect, or the first to the third possible implementations of the eighth aspect, in a fourth possible implementation, the road condition information corresponding to the road condition position of concern is static information or driving state information of a surrounding vehicle that is photographed by the second terminal in real time; and the terminal further includes:

a driving prompting module, configured to: determine, according to the static information or the driving state information of the surrounding vehicle of the second terminal, whether the surrounding vehicle has a security risk; and if determining that the surrounding vehicle has a security risk, send a driving security prompt according to the surrounding vehicle that has a security risk.

A ninth aspect of the embodiments of the present invention provides a terminal, and the terminal includes:

a position reporting module, configured to report position information to a server;

a sharing request receiving module, configured to receive a road condition sharing request sent by the server according to the position information, where the road condition sharing request carries a specified road condition position of concern; and a road condition sharing module, configured to share a road condition according to the road condition position of concern.

In a first possible implementation of the ninth aspect, the road condition sharing request further carries a terminal identifier of a first terminal; and the road condition sharing module is configured to send road condition information corresponding to the road condition position of concern to the first terminal according to the terminal identifier of the first terminal.

With reference to the first possible implementation of the ninth aspect, in a second possible implementation, the road condition sharing module is configured to submit a road driving condition corresponding to the position of concern to a network base station, where the road driving condition carries the terminal identifier of the first terminal, so that the network base station sends the road driving condition corresponding to the position of concern to the first terminal.

With reference to the first possible implementation of the ninth aspect, in a third possible implementation, the road condition information corresponding to the road condition position of concern includes a road condition photographing position; and the terminal further includes:

an accident image identification module, configured to identify a driving accident image from the road condition information corresponding to the road condition position of concern; where the road condition sharing module is configured to send road condition information corresponding to the driving accident image to the first terminal according to the terminal identifier of the first terminal when a photographing position corresponding to the driving accident image matches the road condition position of concern.

With reference to the third possible implementation of the ninth aspect, in a fourth possible implementation, the road condition sharing request further carries a time point of concern; and the road condition sharing module is configured to send the road condition information corresponding to the driving accident image to the first terminal according to the terminal identifier of the first terminal when the photographing position corresponding to the driving accident image matches the road condition position of concern and a photographing time corresponding to the driving accident image matches the time point of concern.

With reference to any one of the ninth aspect or the first to the fourth possible implementations of the ninth aspect, in a fifth possible implementation, when sharing the road condition according to the road condition position of concern, the road condition sharing module is further configured to share a road condition recording capability of the second terminal.

A tenth aspect of the embodiments of the present invention provides a road accident condition reporting device, including:

an accident determining module, configured to determine an accident occurrence position and an accident occurrence time point; and a road condition request module, configured to send a road condition information request to a second terminal, where the second terminal has a road condition recording capability, and a distance between the accident occurrence position and the second terminal at the accident occurrence time point is less than a preset threshold;

a road accident condition collecting module, configured to receive road condition information that is corresponding to the accident occurrence position and sent by the second terminal; and a road accident condition reporting module, configured to report, to an accident assessment server, the road condition information that is corresponding to the accident occurrence position and sent by the second terminal, so that the accident assessment server performs accident assessment according to the road condition information corresponding to the accident occurrence position.

In a first possible implementation of the tenth aspect, the road accident condition reporting device further includes:

a driving terminal communications module, configured to establish a communication connection to the second terminal that is located in a preset area around the accident occurrence position at the accident occurrence time point.

With reference to the first possible implementation of the tenth aspect, in a second possible implementation, the driving terminal communications module includes:

a driving terminal searching unit, configured to submit the accident occurrence position and the accident occurrence time point to a server, so that the server searches, according to the accident occurrence position and the accident occurrence time point, for the second terminal that is located in the preset area around the accident occurrence position at the accident occurrence time point;

a connection information receiving unit, configured to receive communication connection information of the second terminal that is sent by the server; and a driving terminal communications unit, configured to establish the communication connection to the second terminal according to the communication connection information of the second terminal.

With reference to any one of the tenth aspect, or the first or the second possible implementation of the tenth aspect, in a third possible implementation, the road accident condition reporting device further includes:

a road condition recording module, configured to photograph road condition information; where the accident determining module is configured to:

obtain, by means of identification, a driving accident image in the road condition information photographed by the road condition recording module; extract a photographing position and a photographing time corresponding to the driving accident image obtained by means of identification; and use the photographing position and the photographing time as the accident occurrence position and the accident occurrence time point respectively.

An eleventh aspect of the embodiments of the present invention provides a road condition reporting initiation device, including:

an accident determining module, configured to determine an accident occurrence position and an accident occurrence time point; and a road condition reporting initiation module, configured to send a road condition information request to a second terminal, where the second terminal has a road condition recording capability, and a distance between the accident occurrence position and the second terminal at the accident occurrence time point is less than a preset threshold, so that the second terminal reports road condition information corresponding to the accident occurrence position to an accident assessment server.

In a first possible implementation of the eleventh aspect, the road condition reporting initiation device further includes:

a rephotographing terminal searching module, configured to determine a third terminal that meets a road accident condition rephotographing qualification, where the road accident condition rephotographing qualification includes: the accident occurrence position is located ahead of a driving route of the third terminal; and a rephotographing request sending module, configured to send a road accident condition rephotographing request to the third terminal, where the road condition rephotographing request carries the accident occurrence position, so that the third terminal obtains a rephotographed road driving condition corresponding to the accident occurrence position, and reports the rephotographed road driving condition corresponding to the accident occurrence position to the accident assessment server.

With reference to the first possible implementation of the eleventh aspect, in a second possible implementation, the rephotographing terminal searching module includes:

a rephotographing qualification broadcasting unit, configured to broadcast the road accident condition rephotographing qualification to a road condition recording terminal in an area to which the accident occurrence position belongs, so that the road condition recording terminal in the area to which the accident occurrence position belongs detects whether the road condition recording terminal meets the road accident condition rephotographing qualification; and a rephotographing terminal determining unit, configured to determine, according to a rephotographing qualification acknowledgement message returned by the road condition recording terminal in the area to which the accident occurrence position belongs, the third terminal that meets the road accident condition rephotographing qualification.

With reference to the first possible implementation of the eleventh aspect, in a third possible implementation, the rephotographing terminal searching module includes:

a driving state obtaining unit, configured to obtain driving state information of a road condition recording terminal in an area to which the accident occurrence position belongs; and a rephotographing terminal determining unit, configured to: determine whether the driving state information of the road condition recording terminal in the area to which the accident occurrence position belongs meets the road accident condition rephotographing qualification; and determine a road condition recording terminal whose driving state information meets the road accident condition rephotographing qualification as the third terminal.

A twelfth aspect of the embodiments of the present invention provides a road condition information prompting device, and the road condition information prompting device includes:

a road condition obtaining module, configured to obtain current real-time road condition information that includes static information or driving state information of a surrounding vehicle that is photographed in real time; and a driving prompting module, configured to: determine, according to the static information or the driving state information of the surrounding vehicle, whether the surrounding vehicle has a security risk; and if the surrounding vehicle has a security risk, send a driving security prompt according to the surrounding vehicle that has a security risk.

In a first possible implementation of the twelfth aspect, the static information of the surrounding vehicle includes vehicle license plate information or a vehicle model identity; and the road condition information prompting device further includes:

a vehicle information uploading module, configured to upload the vehicle license plate information or the vehicle model identity of the surrounding vehicle to a server, so that the server queries a driving security record of the vehicle corresponding to the vehicle license plate information or the vehicle model identity; and a security information receiving module, configured to receive vehicle security information that is delivered by the server according to the driving security record of the vehicle corresponding to the vehicle license plate information or the vehicle model identity; where the driving prompting module is configured to: determine, according to the vehicle security information, whether the surrounding vehicle has a security risk; and send the driving security prompt according to the surrounding vehicle that has a security risk.

In a second possible implementation of the twelfth aspect, the driving state information of the surrounding vehicle includes a speed or a driving path of the corresponding vehicle; and the driving prompting module is configured to:

determining, according to the speed or the driving path of the surrounding vehicle, whether a driver in the surrounding vehicle is in an abnormal state; and if the driver is in an abnormal state, considering that the surrounding vehicle has a security risk.

The embodiments of the present invention provide a road condition information sharing method. A second terminal is triggered to share a road condition according to a specified road condition position of concern, so that a user terminal can obtain, from another road condition recording terminal, road condition information recorded by the another road condition recording terminal, and a user can obtain more comprehensive road condition information.

In addition, according to the embodiments of the present invention, road condition information corresponding to multiple terminals in an accident occurrence position is reported to an accident assessment server, so that the accident assessment server can perform accident assessment according to more road condition information, and accident assessment accuracy is improved.

In addition, according to the embodiments of the present invention, security analysis is performed on a surrounding vehicle in road condition information, whether the surrounding vehicle has a security risk is determined, and then a driving security prompt is sent. In this way, driving security can be improved, and a more convenient and safer vehicle driving environment can be constructed.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The concept of Internet of Vehicles is derived from the Internet of Things (Internet of Things), and definitions of the Internet of Vehicles are different according to different industry backgrounds. A conventional definition of the Internet of Vehicles is: a system in which an electronic label loaded onto a vehicle uses an identification technology such as radio frequency to extract and effectively utilize, on an information network platform, attribute information and static/dynamic information of all vehicles, effectively monitor and manage operating statuses of all the vehicles according to different functional requirements, and provide comprehensive services.

With development of technologies and industries of the Internet of Vehicles, a development trend of the Internet of Vehicles is to become a big system network in which wireless communication and information exchange are performed between vehicle and X (X: vehicle, road, pedestrian, the Internet, and the like) based on an intra-vehicle network, an inter-vehicle network, and an in-vehicle mobile Internet according to an agreed communications protocol and data interaction standard. The big system network is an integrated network that can implement intelligent traffic management, intelligent dynamic information serving, and intelligent vehicle control, and is a typical application of the technologies of the Internet of Things in a traffic system field.

In addition, event data recorders or cameras are mounted on more vehicles to photograph road condition information including videos or images in driving processes. The road condition information in the embodiments of the present invention may be intelligently transmitted and shared by using the Internet of Vehicles, and then may be intelligently analyzed and processed by a backend to generate useful information, so as to construct a more intelligent, harmonious, and smooth traffic driving environment in an era of the Internet of Vehicles.

Figure 1:
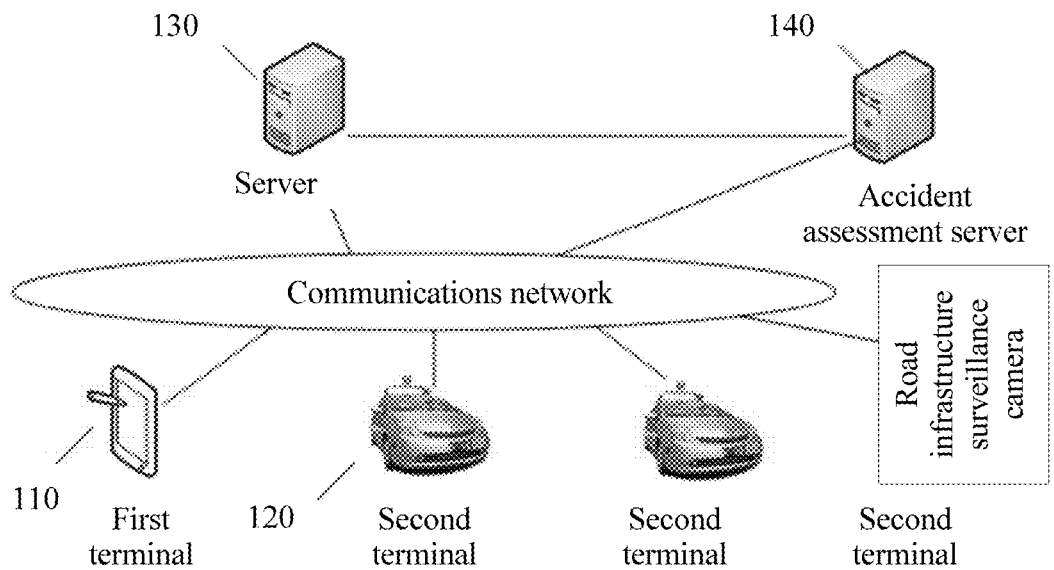
FIG. 1 is a schematic architecture diagram of a scenario of the Internet of Vehicles according to an embodiment of the present invention.

FIG. 1 shows an architecture of a typical scenario of the Internet of Vehicles in an embodiment of the present invention. The architecture includes a first terminal 110, multiple second terminals 120, and a server 130, and optionally, may further include an accident assessment server 140. All the foregoing node devices of the Internet of Vehicles can transmit and exchange data and signaling by using a communications network. The communications network includes a network base station, a data exchange device, and other network node devices.

The first terminal 110 may be a user terminal, such as a smart phone, a tablet computer, an intelligent wearable device, an e-reader, or an in-vehicle terminal. In an optional embodiment, the first terminal 110 may have a road condition recording capability. In some embodiments of the present invention, the first terminal 110 may serve as a road accident condition reporting device, a road condition reporting initiation device, a road condition information displaying device, or a road condition information prompting device.

The second terminal 120 has a road condition recording capability, is a terminal device that can photograph and record road condition information by using a camera or a driving recording apparatus, and may be disposed on a vehicle or worn by a pedestrian; or may be a road infrastructure surveillance camera, for example, a monitor installed at an intersection or a speed testing monitor. In an optional embodiment, a positioning apparatus, such as a GPS (Global Positioning System, Global Positioning System) base station positioning apparatus or a WiFi positioning apparatus, may be built in the second terminal 120. The second terminal 120 reports, to a server, position information obtained by using the built-in positioning apparatus, so that the server can learn of a position of the second terminal. The road condition information recorded by the second terminal 120 in this embodiment of the present invention may be a photographed road condition image or road condition video, and may further include road environment condition information such as noise, weather, and road visibility. In this embodiment of the present invention, when photographing the road condition information, the second terminal 120 may further record a photographing position and a photographing time corresponding to the photographed road condition information.

The server 130 can manage device information of the second terminals 120 including current geographical positions, and manage road condition information photographed by the second terminals 120, including information analysis, collection, forwarding and sharing, and the like. In an optional embodiment, the server 130 may serve as a road condition reporting initiation device in the following embodiment.

The accident assessment server 140 is configured to perform accident assessment according to road condition information submitted by the first terminal 110, the second terminal 120, or the server 130, and provide an accident assessment result to a backend insurance system. The backend insurance system delivers an accident assessment report and an electronic insurance book to the first terminal according to the accident assessment result provided by the accident assessment server.

The following describes, with reference to the accompanying drawings by using embodiments, a specific process of using the foregoing node devices of the Internet of Vehicles to implement the present invention.

Figure 2:
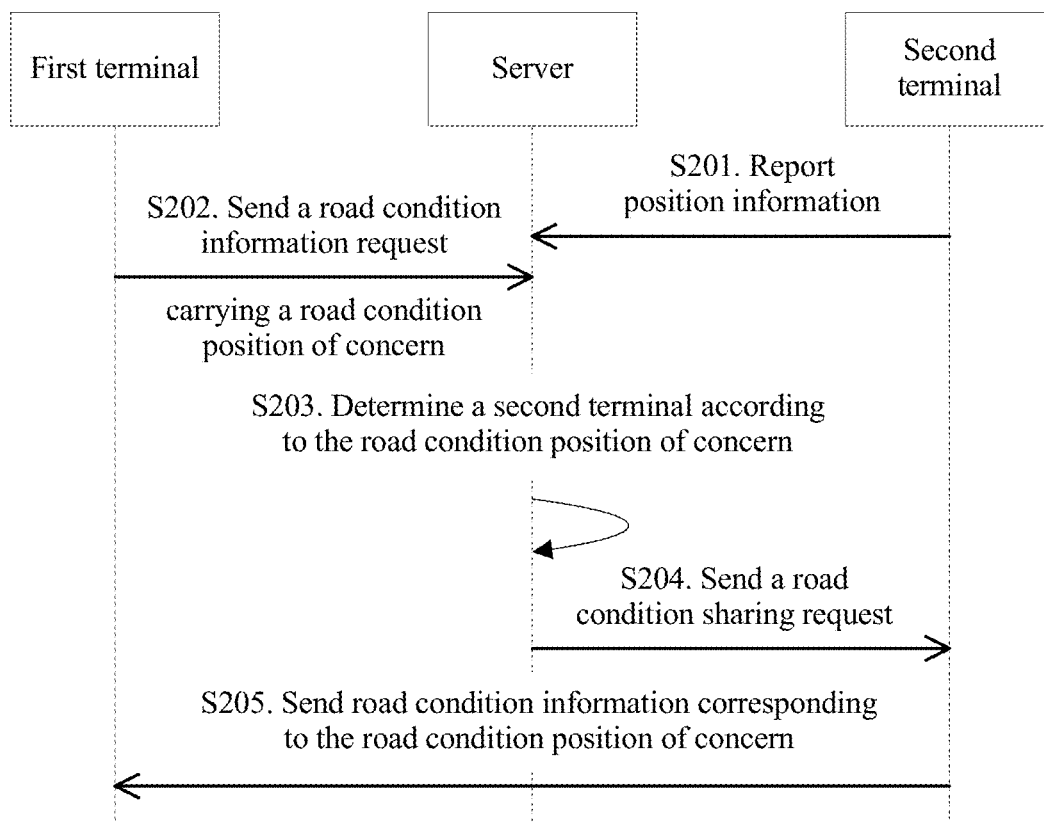
FIG. 2 is a schematic flowchart of a road condition information sharing method according to an embodiment of the present invention.

FIG. 2 is a flowchart for implementing a road condition information sharing method according to an embodiment of the present invention. As shown in the figure, the road condition information sharing method in this embodiment includes the following procedure.

S201. Second terminals report position information of the second terminals to a server.

In a specific implementation, a positioning apparatus may be built in the second terminal, and the second terminal reports position information obtained by using the built-in positioning apparatus to the server at a specific time interval, so that the server can learn of a current position of the second terminal or a position of the second terminal at a specific time point.

It should be noted that this step is an optional step. For example, if the second terminal is a road infrastructure surveillance camera whose position is relatively fixed, the position of the second terminal may be registered with the server in advance.

S202. A first terminal sends a road condition information request to the server, where the road condition information request carries a road condition position of concern.

Specifically, the road condition position of concern may include a geographical position or a road section that is specified by the first terminal. The first terminal may set the road condition position of concern in the following optional implementation manners:

(21) The first terminal receives a road condition position of concern that is selected by a user on an electronic map;

(22) The first terminal sets a position on which the first terminal is currently located to the road condition position of concern;

(23) The first terminal sets, according to a road on which the first terminal is currently located, a position ahead of a current position on the road by a specified distance (for example, 500 meters) to the road condition position of concern.

(24) The first terminal sets, according to a current navigation route, a position ahead of a current position on the navigation route by a specified distance (for example, 500 meters) to the road condition position of concern.

In an optional embodiment, the road condition information request sent by the first terminal to the server may further carry a time point of concern. The time point of concern may be an instant time at which the first terminal sends the road condition information request (that the time point of concern is the instant time may be indicated by carrying the time for sending the road condition information request, or by using an instant time identifier, or by default), or may be any previous time point that is specified by the first terminal according to a requirement (for example, the specified time point is a time point of 5 minutes earlier, or the specified time point is 14:25:00 on that day).

S203. The server determines a second terminal according to the road condition position of concern, where the second terminal has a road condition recording capability, and a distance between the second terminal and the road condition position of concern is less than a preset threshold.

The second terminal corresponding to the road condition position of concern may be a second terminal that is currently located near the road condition position of concern, or a second terminal that arrived near the road condition position of concern. Specifically, after receiving the road condition information request sent by the first terminal, the server obtains the second terminal near the road condition position of concern according to the road condition position of concern carried in the road condition information request, for example, searches, according to the position information that is reported by the second terminals and obtained in advance, for a second terminal that is currently located in a preset area around the road condition position of concern or located on a road section on which the road condition position of concern is located. In a specific implementation, a second terminal in a geometric geographical region that is determined according to the road condition position of concern may be used as the second terminal. The geometric geographical region may be circular or rectangular, for example, may be a circular region that uses the road condition position of concern as a center and has a specified radius or a rectangular region that is of a specified size and uses the road condition position of concern as a center; or a strip-shaped region determined according to a road direction, for example, a strip-shaped region that is of a specified length and starts from the road condition position of concern in a direction of a road on which the road condition position of concern is located.

In an optional embodiment, if the road condition information request carries the time point of concern, the server may obtain a second terminal that is located near the road condition position of concern at the time point of concern. In a specific implementation, the server may search, according to the position information reported by the second terminals and corresponding reporting time points that are obtained in advance, for a second terminal that is located in a preset area around the specified geographical position or located on the specified road section at the time point of concern.

In an optional embodiment, the server first screens the reported position information according to the position information that is reported by all the terminals and obtained in advance, to determine third terminals, where distances between the third terminals and the road condition position of concern are less than a preset distance, then obtains road condition recording capabilities of the third terminals, and determines a third terminal whose road condition recording capability meets a preset criterion as the second terminal. The road condition recording capability is determined according to a spatial relationship between a road condition recording position of each terminal and the road condition position of concern, hardware information or credit information of the terminal. For example, when a road condition recording position of the third terminal is closer to the road condition position of concern, or a road condition recording position of the third terminal at the time point of concern is closer to the road condition position of concern, a road condition recording capability of the third terminal is higher; or better hardware performance of the third terminal, for example, a larger quantity of pixels or higher photographing definition of a camera, indicates a higher road condition recording capability of the third terminal. The credit information of the third terminal may be obtained according to a record of using or adopting road condition information collected by the third terminal and a record of receiving complaints and reporting errors. For example, the credit information includes a credit value or a credit level, and a larger quantity of times of using or adopting the road condition information collected by the third terminal indicates a larger credit value or a higher credit level of the third terminal, and accordingly indicates a higher road condition recording capability of the third terminal; on the contrary, a larger quantity of times of complaining about the road condition information collected by the third terminal or a larger quantity of times that the road condition information collected by the third terminal is incorrect indicates a smaller credit value or a lower credit level of the third terminal, and accordingly indicates a lower road condition recording capability of the third terminal. When finding multiple third terminals that are located near the road condition position of concern, the server may preferably select a third terminal with a higher road condition recording capability as the second terminal.

S204. The server sends a road condition sharing request to the second terminal, where the road condition sharing request carries a terminal identifier of the first terminal.

The terminal identifier of the first terminal may be a communication identifier that is used to identify the first terminal and used to send data to the first terminal, for example, may be information that uniquely identifies the first terminal, such as an international mobile subscriber identity (IMSI:) or a mobile subscriber international ISDN/PSTN number (MSISDN, Mobile Subscriber International ISDN/PSTN number, where ISDN is an acronym for integrated services digital network, and PSTN is an acronym for public switched telephone network (public switched telephone network)).

In an optional embodiment, the road condition sharing request may carry the road condition position of concern or the time point of concern, so as to instruct the second terminal to send road condition information corresponding to the road condition position of concern to the first terminal or send road condition information corresponding to the road condition position of concern at the time point of concern to the first terminal.

S205. The second terminal sends road condition information corresponding to the road condition position of concern to the first terminal.

Specifically, after receiving the road condition sharing request sent by the server, the second terminal may send the road condition information corresponding to the road condition position of concern to the first terminal according to the terminal identifier of the first terminal. The road condition information corresponding to the road condition position of concern may be road condition information that is of the road condition position of concern and photographed by the second terminal, or may be road condition information photographed by the second terminal near the road condition position of concern, for example, road condition information photographed by the second terminal in a preset area around a specified geographical position or on a specified road section. Specifically, the second terminal may obtain the photographed road condition information of the road condition position of concern according to a photographing position and a photographing angle. The second terminal may obtain the road condition information photographed in the preset area around the specified geographical position or on the specified road section according to a photographing position of the road condition information.

In an optional embodiment, if the road condition sharing request does not carry the road condition position of concern, the second terminal may send road condition information that is obtained at a current moment or road condition information that is obtained within a recent time period (for example, last 10 seconds, 30 seconds, or one minute) to the first terminal. Because the server determines that the second terminal is located near the road condition position of concern, the road condition information obtained by the second terminal at the current moment or within the recent time period is road condition information corresponding to the road condition position of concern.

In another embodiment, if the road condition sharing request carries the road condition position of concern, the second terminal may select, from recorded road condition information, road condition information corresponding to the road condition position of concern, and send the road condition information corresponding to the road condition position of concern to the first terminal.

In another embodiment, if the road condition sharing request carries the road condition position of concern and the time point of concern, a target recording terminal may determine whether road condition information corresponding to the time point of concern in recorded road condition information is corresponding to the road condition position of concern, for example, whether a distance between a photographing position of road condition information photographed at the time point of concern and the road condition position of concern is less than a preset distance threshold, or whether a photographing position of road condition information photographed at the time point of concern is on a road section on which the road condition position of concern is located; and if the road condition information corresponding to the time point of concern is corresponding to the road condition position of concern, send the road condition information corresponding to the road condition position of concern to the first terminal.

Further, in an optional embodiment, the road condition information corresponding to the road condition position of concern includes a road condition photographing position. The second terminal may identify a driving accident image from the road condition information corresponding to the road condition position of concern, and if a photographing position corresponding to the driving accident image matches the road condition position of concern, the second terminal sends road condition information corresponding to the driving accident image to the first terminal according to the terminal identifier of the first terminal. A manner for identifying the driving accident image is not a focus of the present invention, and any accident image identification technology may be used. After receiving the road condition sharing request that carries the road condition position of concern and is sent by the server, the second terminal may search, according to photographing positions of driving accident images, for a driving accident image that matches the road condition position of concern, and send road condition information corresponding to the driving accident image that matches the road condition position of concern to the first terminal. The road condition information corresponding to the driving accident image may include only the driving accident image, or may be road condition information obtained in a preset duration before or after a photographing time point of the driving accident image, or may be road condition information that is photographed in a preset area around a photographing position of the driving accident image or photographed on a road section on which a photographing position of the driving accident image is located.

Further, if the road condition sharing request further carries the time point of concern, when searching for the driving accident image that matches the road condition position of concern, the second terminal may further determine whether a photographing time corresponding to the driving accident image matches the time point of concern, and if the photographing position corresponding to the driving accident image matches the road condition position of concern and the photographing time corresponding to the driving accident image matches the time point of concern, the second terminal sends the road condition information corresponding to the driving accident image to the first terminal according to the terminal identifier of the first terminal.

Further, optionally, the road condition sharing request that carries the road condition position of concern and is sent by the server may further carry a road accident condition identifier that is used to instruct the second terminal to send only the road condition information corresponding to the driving accident image that matches the road condition position of concern.

After receiving the road condition information sent by the second terminal, the first terminal may display the received road condition information on a terminal display screen, may send a road condition prompt to a user of the first terminal according to the received road condition information, and may further report the road condition information corresponding to the road condition position of concern to an accident assessment server.

In an optional embodiment, after receiving road condition information that is corresponding to the road condition position of concern and submitted by at least one second terminal, the first terminal may perform, according to a spatial relationship of road condition recording positions of second terminals, image compositing on the road condition information that is corresponding to the road condition position of concern and submitted by the second terminal, and display the road condition information that is corresponding to the road condition position of concern and on which image compositing is performed.

Further, in an optional embodiment, when sharing a road condition according to the road condition position of concern, the second terminal further shares the road condition recording capability of the second terminal. That is, the road condition information that is corresponding to the road condition position of concern and sent by the second terminal to the first terminal may carry the road condition recording capability of the second terminal, and the road condition recording capability is determined according to a spatial relationship between a road condition recording position of the second terminal and the road condition position of concern, and hardware information or credit information of the second terminal. After receiving the road condition information that is corresponding to the road condition position of concern and sent by the second terminal, the first terminal may display the road condition information corresponding to the road condition position of concern according to the road condition recording capability of the second terminal, for example, preferably display road condition information sent by a second terminal with a higher road condition recording capability.

In an optional embodiment, the road condition information corresponding to the road condition position of concern is real-time road condition information that is currently recorded by the second terminal. After receiving the real-time road condition information that is currently recorded by the second terminal, the first terminal may send a driving security prompt according to the real-time road condition information sent by the second terminal. Specifically, the real-time road condition information may include static information or driving state information of a surrounding vehicle that is photographed by the second terminal in real time. The first terminal may determine, according to the static information or the driving state information of the surrounding vehicle of the second terminal, whether the surrounding vehicle has a security risk; and if determining that the surrounding vehicle has a security risk, send the driving security prompt according to the surrounding vehicle that has a security risk.

In an optional embodiment, after receiving the road condition information sent by the second terminal, the first terminal may report, to the accident assessment server, the road condition information that is corresponding to the road condition position of concern and sent by the second terminal, so that the accident assessment server performs accident assessment according to the road condition information corresponding to the second terminal in the road condition position of concern. Further, optionally, when reporting, to the accident assessment server, road condition information that is corresponding to the accident occurrence time point and sent by the second terminal, the first terminal reports road condition information corresponding to the first terminal at the accident occurrence time point to the accident assessment server, so that the accident assessment server performs accident assessment according to the road condition information corresponding to the first terminal and the second terminal at the accident occurrence time point.

In this embodiment, a first terminal sends a road condition information request to a server, and the server sends a road condition sharing request to a second terminal corresponding to a road condition position of concern of the first terminal, so that the first terminal can obtain road condition information corresponding to the road condition position of concern from the second terminal. In this way, road condition information recorded by another second terminal can be obtained, and a user can obtain more comprehensive road condition information.

Figure 3:
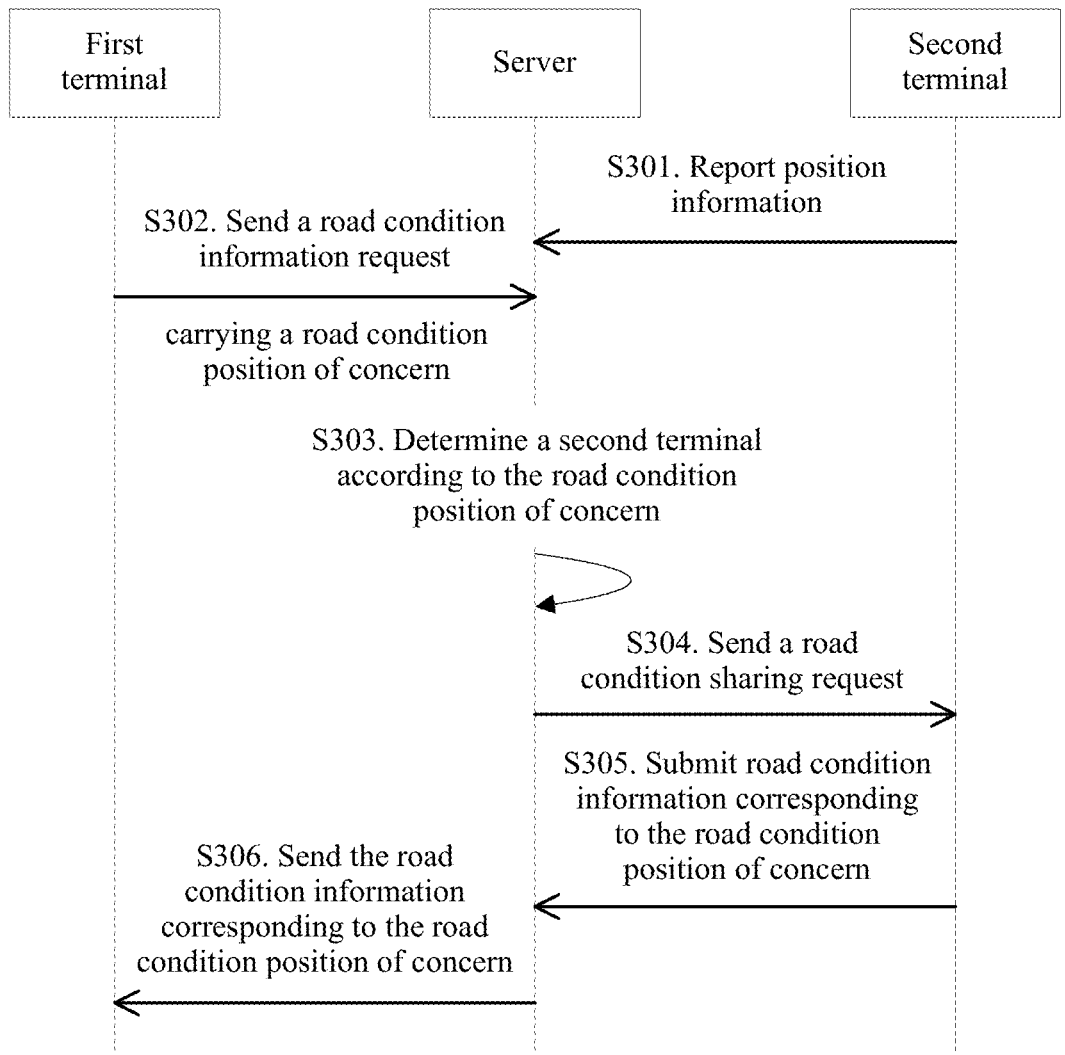
FIG. 3 is a schematic flowchart of a road condition information sharing method according to another embodiment of the present invention.

FIG. 3 is a flowchart for implementing a road condition information sharing method according to another embodiment of the present invention. As shown in the figure, the road condition information sharing method in this embodiment includes the following procedure.

S301. Second terminals report position information of the second terminals to a server.

In a specific implementation, a positioning apparatus may be built in the second terminal, and the second terminal reports position information obtained by using the built-in positioning apparatus to the server at a specific time interval, so that the server can learn of a current position of the second terminal or a position of the second terminal at a specific time point.

It should be noted that this step is an optional step. For example, if the second terminal is a road infrastructure surveillance camera whose position is relatively fixed, the position of the second terminal may be registered with the server in advance.

S302. A first terminal sends a road condition information request to the server, where the road condition information request carries a road condition position of concern.

In an optional embodiment, the road condition information request sent by the first terminal to the server may further carry a time point of concern.

S303. The server determines a second terminal according to the road condition position of concern, where the second terminal has a road condition recording capability, and a distance between the second terminal and the road condition position of concern is less than a preset threshold.

The second terminal corresponding to the road condition position of concern may be a second terminal that is currently located near the road condition position of concern, or a second terminal that arrived near the road condition position of concern. For a specific searching manner, refer to S203 in the foregoing embodiment, and details are not described in this embodiment again.

In an optional embodiment, if the road condition information request carries the time point of concern, the server may obtain a second terminal that is located near the road condition position of concern at the time point of concern.

S304. The server sends a road condition sharing request to the second terminal.

In an optional embodiment, the road condition sharing request may carry the road condition position of concern, and may further carry the time point of concern, so as to instruct the second terminal to send road condition information corresponding to the road condition position of concern to the server or send road condition information corresponding to the road condition position of concern at the time point of concern to the server.

S305. The second terminal submits road condition information corresponding to the road condition position of concern to the server.

Specifically, after receiving the road condition sharing request sent by the server, the second terminal may send the road condition information corresponding to the road condition position of concern to the server according to the road condition sharing request. The road condition information corresponding to the road condition position of concern may be road condition information that is of the road condition position of concern and photographed by the second terminal, or may be road condition information that is photographed by the second terminal near the road condition position of concern.

In an optional embodiment, if the road condition sharing request does not carry the road condition position of concern, the second terminal may send road condition information that is obtained at a current moment or road condition information that is obtained within a recent time period (for example, last 10 seconds, 30 seconds, or one minute) to the server. Because the server determines that the second terminal is located near the road condition position of concern, the road condition information obtained by the second terminal at the current moment or within the recent time period is road condition information corresponding to the road condition position of concern.

In another embodiment, if the road condition sharing request carries the road condition position of concern, the second terminal may select, from recorded road condition information, road condition information corresponding to the road condition position of concern, and send the road condition information corresponding to the road condition position of concern to the server.

In another embodiment, if the road condition sharing request carries the road condition position of concern and the time point of concern, a target recording terminal may determine whether road condition information corresponding to the time point of concern in recorded road condition information is corresponding to the road condition position of concern, for example, whether a distance between a photographing position of road condition information photographed at the time point of concern and the road condition position of concern is less than a preset distance threshold, or whether a photographing position of road condition information photographed at the time point of concern is on a road section on which the road condition position of concern is located; and if the road condition information corresponding to the time point of concern is corresponding to the road condition position of concern, send the road condition information corresponding to the road condition position of concern to the server.

Further, in an optional embodiment, the road condition information corresponding to the road condition position of concern includes a road condition photographing position. The second terminal may identify a driving accident image from the road condition information corresponding to the road condition position of concern, and if a photographing position corresponding to the driving accident image matches the road condition position of concern, the second terminal submits road condition information corresponding to the driving accident image to the server. The road condition information corresponding to the driving accident image may include only the driving accident image, or may be road condition information obtained in a preset duration before or after a photographing time point of the driving accident image, or may be road condition information that is photographed in a preset area around the photographing position of the driving accident image or photographed on a road section on which the photographing position of the driving accident image is located.

Further, if the road condition information request further carries the time point of concern, correspondingly, the road condition sharing request may carry the time point of concern. When searching for the driving accident image that matches the road condition position of concern, the second terminal may further determine whether a photographing time corresponding to the driving accident image matches the time point of concern, and if the photographing position corresponding to the driving accident image matches the road condition position of concern and the photographing time corresponding to the driving accident image matches the time point of concern, the second terminal submits the road condition information corresponding to the driving accident image to the server.

Further, optionally, the road condition sharing request that carries the road condition position of concern and is sent by the server may further carry a road accident condition identifier that is used to instruct the second terminal to send only the road condition information corresponding to the driving accident image that matches the road condition position of concern.

S306. The server sends the road condition information corresponding to the road condition position of concern to the first terminal.

In this embodiment, after collecting the road condition information that is corresponding to the road condition position of concern and sent by the second terminal, the server sends the road condition information corresponding to the road condition position of concern to the first terminal. After receiving the road condition information sent by the second terminal, the first terminal may display the received road condition information on a terminal display screen, may send a road condition prompt according to the received road condition information, and may further report the road condition information corresponding to the road condition position of concern to an accident assessment server.

In an optional embodiment, after collecting road condition information that is corresponding to the road condition position of concern and submitted by at least one second terminal, the server identifies a driving accident image from the road condition information corresponding to the road condition position of concern, and if a photographing position corresponding to the driving accident image matches the road condition position of concern, the server sends road condition information corresponding to the driving accident image to the first terminal, that is, sends, to the first terminal, only the road condition information corresponding to the driving accident image that matches the road condition position of concern. The road condition information corresponding to the driving accident image may include only the driving accident image, or may be road condition information obtained in a preset duration before or after a photographing time point of the driving accident image, or may be road condition information that is photographed in a preset area around the photographing position of the driving accident image or photographed on a road section on which the photographing position of the driving accident image is located.

Further, if the road condition information request further carries the time point of concern, correspondingly, the road condition sharing request may carry the time point of concern. When obtaining the driving accident image that matches the road condition position of concern, the server may further determine whether a photographing time corresponding to the driving accident image matches the time point of concern, and if the photographing position corresponding to the driving accident image matches the road condition position of concern and the photographing time corresponding to the driving accident image matches the time point of concern, the server sends the road condition information corresponding to the driving accident image to the first terminal.

In an optional embodiment, after collecting road condition information that is corresponding to the road condition position of concern and submitted by at least one second terminal, the server may perform, according to a spatial relationship of road condition recording positions of second terminals, image compositing on the road condition information that is corresponding to the road condition position of concern and submitted by the second terminal, and send the road condition information that is corresponding to the road condition position of concern and on which image compositing is performed.

In this embodiment, a first terminal sends a road condition information request to a server, and the server obtains road condition information corresponding to a road condition position of concern from a second terminal corresponding to the road condition position of concern, and sends the road condition information corresponding to the road condition position of concern to the first terminal. In this way, the first terminal obtains road condition information recorded by another second terminal, and a user can obtain more comprehensive road condition information.

Figure 4:
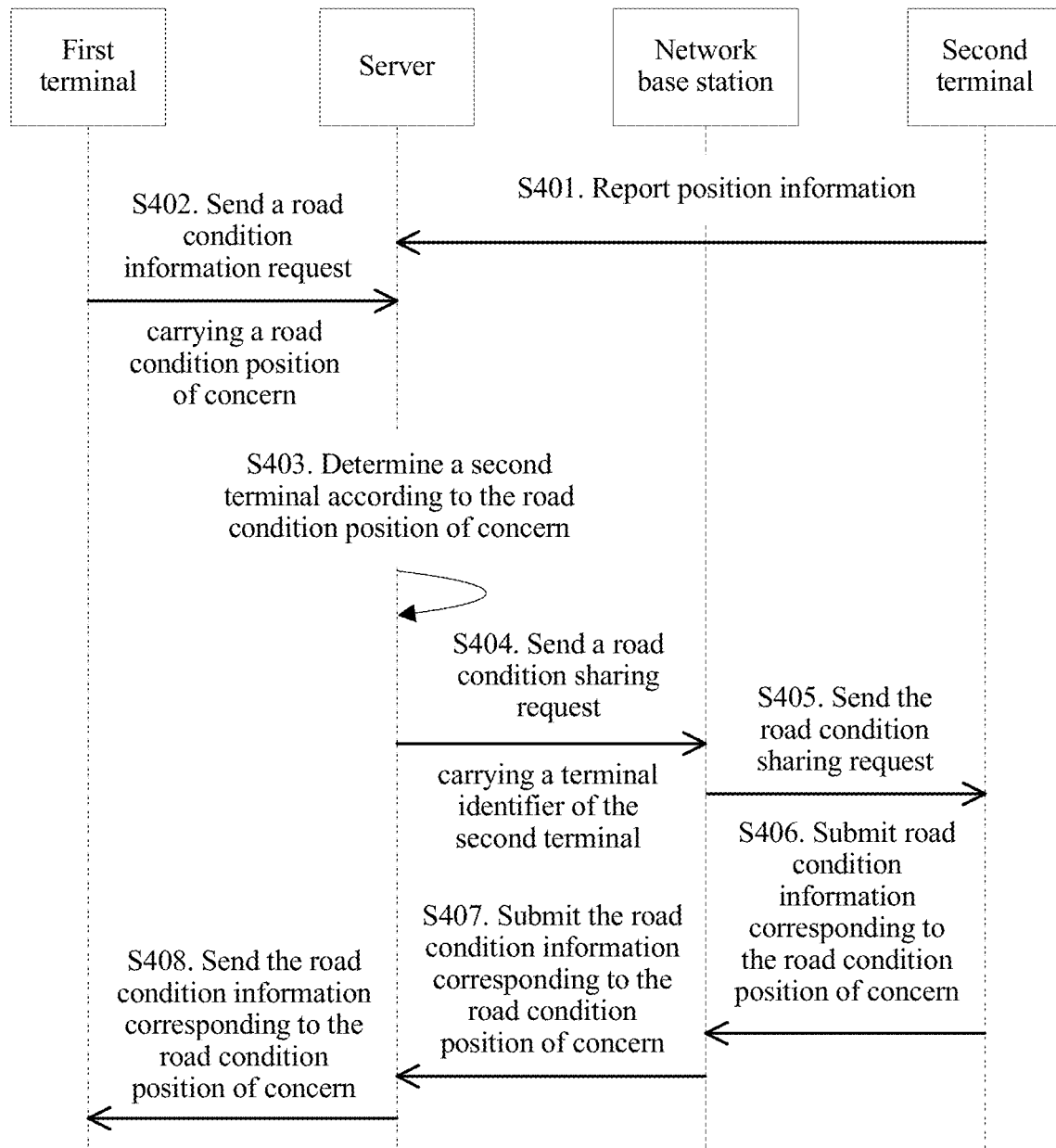
FIG. 4 is a schematic flowchart of a road condition information sharing method according to another embodiment of the present invention.

FIG. 4 is a flowchart for implementing a road condition information sharing method according to another embodiment of the present invention. As shown in the figure, the road condition information sharing method in this embodiment includes the following procedure.

S401. Second terminals report position information of the second terminals to a server.

In a specific implementation, a positioning apparatus may be built in the second terminal, and the second terminal reports position information obtained by using the built-in positioning apparatus to the server at a specific time interval, so that the server can learn of a current position of the second terminal or a position of the second terminal at a specific time point.

It should be noted that this step is an optional step. For example, if the second terminal is a road infrastructure surveillance camera whose position is relatively fixed, the position of the second terminal may be registered with the server in advance.

S402. A first terminal sends a road condition information request to the server, where the road condition information request carries a road condition position of concern.

In an optional embodiment, the road condition information request sent by the first terminal to the server may further carry a time point of concern.

S403. The server determines a second terminal according to the road condition position of concern, where the second terminal has a road condition recording capability, and a distance between the second terminal and the road condition position of concern is less than a preset threshold.

The second terminal corresponding to the road condition position of concern may be a second terminal that is currently located near the road condition position of concern, or a second terminal that arrived near the road condition position of concern. For a specific searching manner, refer to S203 in the foregoing embodiment, and details are not described in this embodiment again.

In an optional embodiment, if the road condition information request carries the time point of concern, the server may obtain a second terminal that is located near the road condition position of concern at the time point of concern.

S404. The server submits a road condition sharing request to a network base station, where the road condition sharing request carries a terminal identifier of the second terminal.

The network base station may be a communications base station in a communications cell to which the server belongs, or may be a communications base station in a communications cell to which the second terminal belongs. In an optional embodiment, the server submits the road condition sharing request to the communications base station in the communications cell to which the server belongs; the communications base station in the communications cell to which the server belongs may route, according to the terminal identifier of the second terminal, the road condition sharing request to the communications base station in the communications cell to which the second terminal belongs; and then the road condition sharing request is sent to the second terminal by using the communications base station in the communications cell to which the second terminal belongs. In another optional embodiment, the server submits the road condition sharing request and the terminal identifier of the second terminal to a communications network; the communications network finds, in the network according to the terminal identifier of the second terminal, the communications base station in the communications cell to which the second terminal currently belongs, and transmits the road condition sharing request to the communications base station; and then the road condition sharing request is sent to the second terminal by using the communications base station in the communications cell to which the second terminal belongs. The terminal identifier of the second terminal may be a communication identifier that is used to identify the second terminal and used to send data to the second terminal, for example, information that uniquely identifies the second terminal, such as an IMSI or an MSISDN. In this embodiment, the server submits, to the network base station, the road condition sharing request that carries the terminal identifier of the second terminal, and the network base station is responsible for routing the road condition sharing request to the second terminal.

In an optional embodiment, the road condition sharing request may carry the road condition position of concern, and may further carry the time point of concern, so as to instruct the second terminal to send road condition information corresponding to the road condition position of concern to the first terminal or send road condition information corresponding to the road condition position of concern at the time point of concern to the first terminal.

S405. The network base station sends the road condition sharing request to the second terminal.

The network base station in this embodiment of the present invention may send the road condition sharing request to the second terminal according to the terminal identifier of the second terminal.

S406. The second terminal submits road condition information corresponding to the road condition position of concern to the network base station according to the road condition sharing request.

Specifically, after receiving the road condition sharing request sent by the network base station, the second terminal may send the road condition information corresponding to the road condition position of concern to the network base station according to the road condition sharing request. The road condition information corresponding to the road condition position of concern may be road condition information that is of the road condition position of concern and photographed by the second terminal, or may be road condition information that is photographed by the second terminal near the road condition position of concern.

In an optional embodiment, if the road condition sharing request does not carry the road condition position of concern, the second terminal may send road condition information that is obtained at a current moment or road condition information that is obtained within a recent time period (for example, last 10 seconds, 30 seconds, or one minute) to the network base station. Because the server determines that the second terminal is located near the road condition position of concern, the road condition information obtained by the second terminal at the current moment or within the recent time period is road condition information corresponding to the road condition position of concern.

In another embodiment, if the road condition sharing request carries the road condition position of concern, the second terminal may select, from recorded road condition information, road condition information corresponding to the road condition position of concern, and send the road condition information corresponding to the road condition position of concern to the network base station.

In another embodiment, if the road condition sharing request carries the road condition position of concern and the time point of concern, a target recording terminal may determine whether road condition information corresponding to the time point of concern in recorded road condition information is corresponding to the road condition position of concern, for example, whether a distance between a photographing position of road condition information photographed at the time point of concern and the road condition position of concern is less than a preset distance threshold, or whether a photographing position of road condition information photographed at the time point of concern is on a road section on which the road condition position of concern is located; and if the road condition information corresponding to the time point of concern is corresponding to the road condition position of concern, send the road condition information corresponding to the road condition position of concern to the network base station.

Further, in an optional embodiment, the road condition information corresponding to the road condition position of concern includes a road condition photographing position. The second terminal may identify a driving accident image from the road condition information corresponding to the road condition position of concern, and if a photographing position corresponding to the driving accident image matches the road condition position of concern, the second terminal sends road condition information corresponding to the driving accident image to the network base station according to a terminal identifier of the first terminal. After receiving the road condition sharing request that carries the road condition position of concern and is sent by the network base station, the second terminal may search, according to photographing positions of driving accident images, for a driving accident image that matches the road condition position of concern, and send road condition information corresponding to the driving accident image that matches the road condition position of concern to the network base station. The road condition information corresponding to the driving accident image may include only the driving accident image, or may be road condition information obtained in a preset duration before or after a photographing time point of the driving accident image, or may be road condition information that is photographed in a preset area around a photographing position of the driving accident image or photographed on a road section on which a photographing position of the driving accident image is located.

Further, if the road condition sharing request further carries the time point of concern, when searching for the driving accident image that matches the road condition position of concern, the second terminal may further determine whether a photographing time corresponding to the driving accident image matches the time point of concern, and if the photographing position corresponding to the driving accident image matches the road condition position of concern and the photographing time corresponding to the driving accident image matches the time point of concern, the second terminal sends the road condition information corresponding to the driving accident image to the network base station.

Further, optionally, the road condition sharing request that carries the road condition position of concern and is sent by the network base station may further carry a road accident condition identifier that is used to instruct the second terminal to send only the road condition information corresponding to the driving accident image that matches the road condition position of concern.

S407. The network base station sends the road condition information corresponding to the road condition position of concern to the server.

That is, the network base station may send the road condition information that is corresponding to the road condition position of concern and obtained by the second terminal to the server according to a reverse route of a route on which the server submits the road condition sharing request to the network base station in S404.

S408. The server sends the road condition information corresponding to the road condition position of concern to the first terminal.

In this embodiment, after collecting the road condition information that is corresponding to the road condition position of concern and sent by the second terminal, the server sends the road condition information corresponding to the road condition position of concern to the first terminal. After receiving the road condition information sent by the second terminal, the first terminal may display the received road condition information on a terminal display screen, may send a road condition prompt according to the received road condition information, and may further report the road condition information corresponding to the road condition position of concern to an accident assessment server.

In an optional embodiment, after collecting road condition information that is corresponding to the road condition position of concern and submitted by at least one second terminal, the server may perform accident image identification on the road condition information corresponding to the road condition position of concern, to obtain a driving accident image corresponding to the road condition position of concern, and send, to the first terminal, only road condition information corresponding to the driving accident image that matches the road condition position of concern. The road condition information corresponding to the driving accident image may include only the driving accident image, or may be road condition information obtained in a preset duration before or after a photographing time point of the driving accident image, or may be road condition information that is photographed in a preset area around a photographing position of the driving accident image or photographed on a road section on which a photographing position of the driving accident image is located.

In an optional embodiment, after collecting road condition information that is corresponding to the road condition position of concern and submitted by at least one second terminal, the server may perform, according to a spatial relationship of road condition recording positions of second terminals, image compositing on the road condition information that is corresponding to the road condition position of concern and submitted by the second terminal, and send the road condition information that is corresponding to the road condition position of concern and on which image compositing is performed.

In this embodiment, a first terminal sends a road condition information request to a server, and the server obtains, by using a network base station, road condition information corresponding to a road condition position of concern from a second terminal corresponding to the road condition position of concern, and sends the road condition information corresponding to the road condition position of concern to the first terminal. In this way, the first terminal obtains road condition information recorded by another second terminal, and a user can obtain more comprehensive road condition information.

Figure 5:
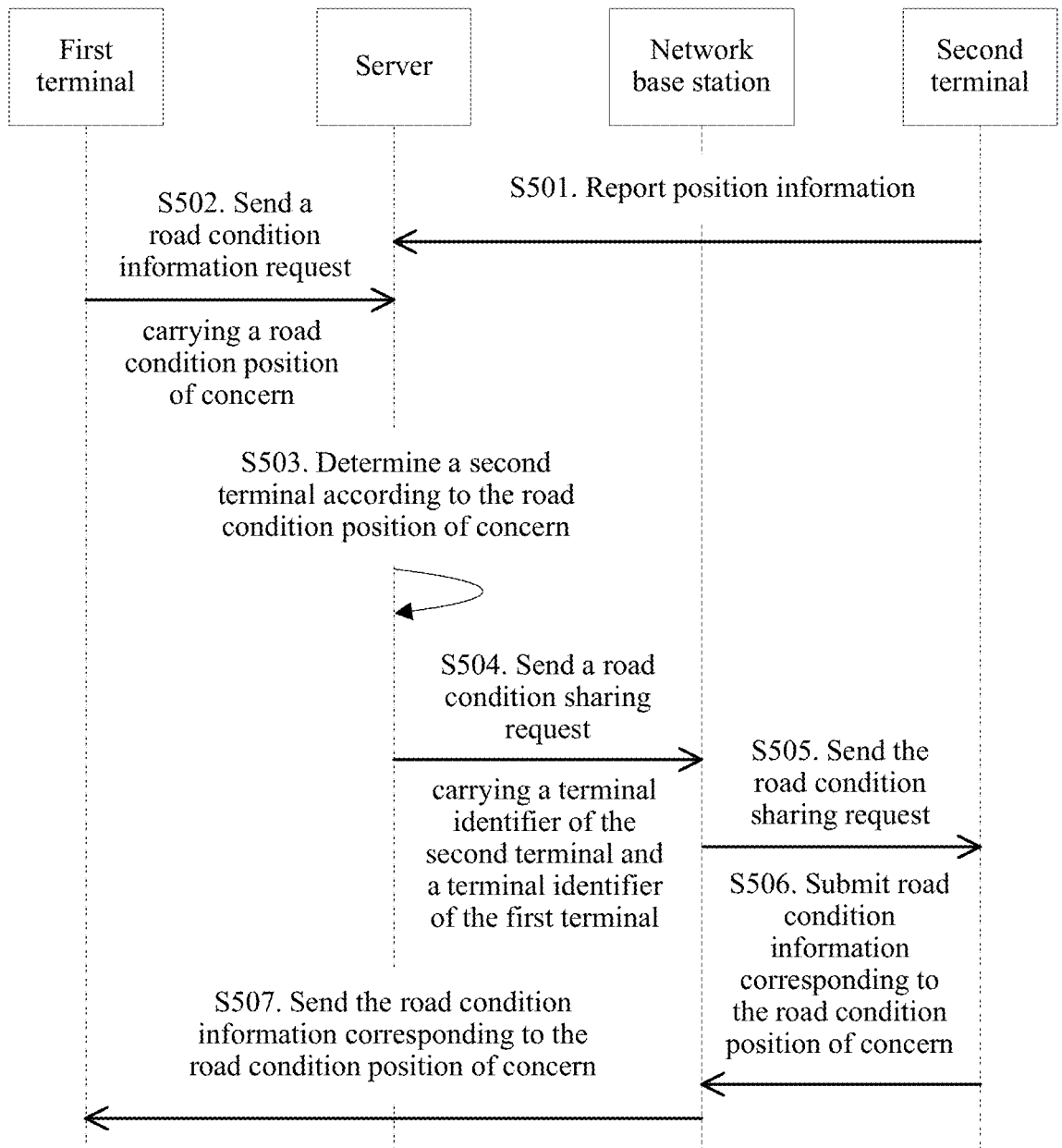
FIG. 5 is a schematic flowchart of a road condition information sharing method according to another embodiment of the present invention.

FIG. 5 is a flowchart for implementing a road condition information sharing method according to another embodiment of the present invention. As shown in the figure, the road condition information sharing method in this embodiment includes the following procedure.

S501. Second terminals report position information of the second terminals to a server.

In a specific implementation, a positioning apparatus may be built in the second terminal, and the second terminal reports position information obtained by using the built-in positioning apparatus to the server at a specific time interval, so that the server can learn of a current position of the second terminal or a position of the second terminal at a specific time point.

It should be noted that this step is an optional step. For example, if the second terminal is a road infrastructure surveillance camera whose position is relatively fixed, the position of the second terminal may be registered with the server in advance.

S502. A first terminal sends a road condition information request to the server, where the road condition information request carries a road condition position of concern.

In an optional embodiment, the road condition information request sent by the first terminal to the server may further carry a time point of concern.

S503. The server determines a second terminal according to the road condition position of concern, where the second terminal has a road condition recording capability, and a distance between the second terminal and the road condition position of concern is less than a preset threshold.

The second terminal corresponding to the road condition position of concern may be a second terminal that is currently located near the road condition position of concern, or a second terminal that arrived near the road condition position of concern. For a specific searching manner, refer to S203 in the foregoing embodiment, and details are not described in this embodiment again.

In an optional embodiment, if the road condition information request carries the time point of concern, the server may obtain a second terminal that is located near the road condition position of concern at the time point of concern.

S504. The server submits a road condition sharing request to a network base station, where the road condition sharing request carries a terminal identifier of the second terminal and a terminal identifier of the first terminal.

The network base station may be a communications base station in a communications cell to which the server belongs, or may be a communications base station in a communications cell to which the second terminal belongs. In an optional embodiment, the server submits the road condition sharing request to the communications base station in the communications cell to which the server belongs; and the communications base station in the communications cell to which the server belongs may find, in a communications network according to the terminal identifier of the second terminal, the communications base station in the communications cell to which the second terminal currently belongs, and route the road condition sharing request to the communications base station in the communications cell to which the second terminal belongs. In another optional embodiment, the server submits the road condition sharing request and the terminal identifier of the second terminal to a communications network; and the communications network finds, in the network according to the terminal identifier of the second terminal, the communications base station in the communications cell to which the second terminal currently belongs, and then transmits the road condition sharing request to the communications base station in the communications cell to which the second terminal currently belongs.

S505. The network base station sends the road condition sharing request to the second terminal.

The network base station in this embodiment of the present invention may send the road condition sharing request to the second terminal according to the terminal identifier of the second terminal.

S506. The second terminal submits road condition information corresponding to the road condition position of concern to the network base station according to the road condition sharing request.

Specifically, after receiving the road condition sharing request sent by the network base station, the second terminal may send the road condition information corresponding to the road condition position of concern to the network base station according to the road condition sharing request. The road condition information corresponding to the road condition position of concern may be road condition information that is of the road condition position of concern and photographed by the second terminal, or may be road condition information that is photographed by the second terminal near the road condition position of concern.

In an optional embodiment, if the road condition sharing request does not carry the road condition position of concern, the second terminal may send road condition information that is obtained at a current moment or road condition information that is obtained within a recent time period (for example, last 10 seconds, 30 seconds, or one minute) to the network base station. Because the server determines that the second terminal is located near the road condition position of concern, the road condition information obtained by the second terminal at the current moment or within the recent time period is road condition information corresponding to the road condition position of concern.

In another embodiment, if the road condition sharing request carries the road condition position of concern, the second terminal may select, from recorded road condition information, road condition information corresponding to the road condition position of concern, and send the road condition information corresponding to the road condition position of concern to the network base station.

In another embodiment, if the road condition sharing request carries the road condition position of concern and the time point of concern, a target recording terminal may determine whether road condition information corresponding to the time point of concern in recorded road condition information is corresponding to the road condition position of concern, for example, whether a distance between a photographing position of road condition information photographed at the time point of concern and the road condition position of concern is less than a preset distance threshold, or whether a photographing position of road condition information photographed at the time point of concern is on a road section on which the road condition position of concern is located; and if the road condition information corresponding to the time point of concern is corresponding to the road condition position of concern, send the road condition information corresponding to the road condition position of concern to the network base station.

Further, in an optional embodiment, the road condition information corresponding to the road condition position of concern includes a road condition photographing position.

The second terminal may identify a driving accident image from the road condition information corresponding to the road condition position of concern, and if a photographing position corresponding to the driving accident image matches the road condition position of concern, the second terminal sends road condition information corresponding to the driving accident image to the network base station according to the terminal identifier of the first terminal. After receiving the road condition sharing request that carries the road condition position of concern and is sent by the network base station, the second terminal may search, according to photographing positions of driving accident images, for a driving accident image that matches the road condition position of concern, and send road condition information corresponding to the driving accident image that matches the road condition position of concern to the network base station. The road condition information corresponding to the driving accident image may include only the driving accident image, or may be road condition information obtained in a preset duration before or after a photographing time point of the driving accident image, or may be road condition information that is photographed in a preset area around a photographing position of the driving accident image or on a road section on which a photographing position of the driving accident image is located.

Further, if the road condition sharing request further carries the time point of concern, when searching for the driving accident image that matches the road condition position of concern, the second terminal may further determine whether a photographing time corresponding to the driving accident image matches the time point of concern, and if the photographing position corresponding to the driving accident image matches the road condition position of concern and the photographing time corresponding to the driving accident image matches the time point of concern, the second terminal sends the road condition information corresponding to the driving accident image to the network base station.

Further, optionally, the road condition sharing request that carries the road condition position of concern and is sent by the network base station may further carry a road accident condition identifier that is used to instruct the second terminal to send only the road condition information corresponding to the driving accident image that matches the road condition position of concern.

S507. The network base station sends the road condition information corresponding to the road condition position of concern to the first terminal.

The network base station in this embodiment of the present invention may send the road condition information corresponding to the road condition position of concern to the first terminal according to the terminal identifier of the first terminal that is carried in the road condition sharing request. That is, forwarding by the server is no longer needed. Therefore, efficiency of sending the road condition information can be improved, and resource overheads of the server can be reduced. In an optional embodiment, the network base station in S507 may determine, according to the terminal identifier of the first terminal, whether the first terminal is currently located in a local cell; and directly send the road condition information corresponding to the road condition position of concern to the first terminal if the first terminal is located in the local cell; or if the first terminal is not located in the local cell currently, route, according to the terminal identifier of the first terminal, the road condition information corresponding to the road condition position of concern to the communications base station in the communications cell to which the second terminal belongs, so as to send the road condition information corresponding to the road condition position of concern to the first terminal by using the communications base station in the communications cell to which the second terminal belongs.

After receiving the road condition information sent by the second terminal, the first terminal may display the received road condition information on a terminal display screen, may send a road condition prompt according to the received road condition information, and may further report the road condition information corresponding to the road condition position of concern to an accident assessment server.

In this embodiment, a first terminal sends a road condition information request to a server; the server finds a second terminal corresponding to a road condition position of concern, and requests a network base station to obtain road condition information corresponding to the road condition position of concern from the second terminal corresponding to the road condition position of concern; and the network base station sends the obtained road condition information corresponding to the road condition position of concern to the first terminal. In this way, the first terminal obtains road condition information recorded by another second terminal, and a user can obtain more comprehensive road condition information.

Figure 6:
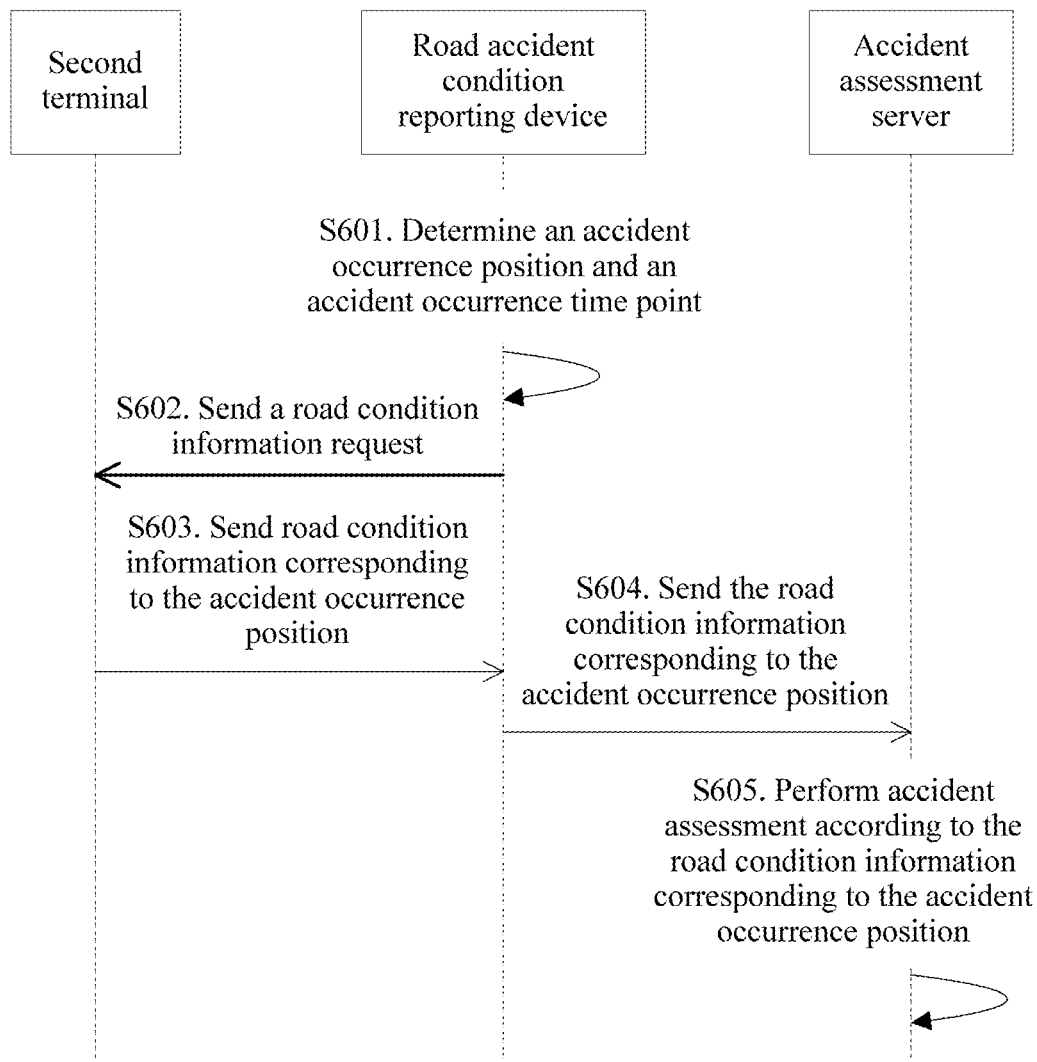
FIG. 6 is a schematic flowchart of a road condition information obtaining method according to another embodiment of the present invention.

FIG. 6 is a schematic flowchart of a road condition information obtaining method according to another embodiment of the present invention. As shown in the figure, the road condition information obtaining method in this embodiment includes the following procedure.

S601. A road accident condition reporting device determines an accident occurrence position and an accident occurrence time point.

The road accident condition reporting device in this embodiment of the present invention may be a user terminal, such as a smart phone, a tablet computer, an intelligent wearable device, an e-reader, an in-vehicle terminal, or a road condition recording terminal. In an optional embodiment, the road accident condition reporting device may also be a server.

Specifically, the road accident condition reporting device may determine the accident occurrence position in the following optional implementation manners:

(61) The road accident condition reporting device determines, as the accident occurrence position, a position that is selected by a user on an electronic map;

(62) The road accident condition reporting device determines a position in which the road accident condition reporting device is currently located as the accident occurrence position;

(63) The road accident condition reporting device determines, according to a road on which the road accident condition reporting device is currently located, a position ahead of a current position on the road by a specified distance (for example, 500 meters) as the accident occurrence position.

The accident occurrence time point may be a current instant time determined by the road accident condition reporting device, or may be any previous time point that is specified by the road accident condition reporting device according to a requirement (for example, the specified time point is a time point of 5 minutes earlier than a current time, or the specified time point is 14:25:00 on that day).

In an optional embodiment, the road accident condition reporting device may further obtain, by means of identification, a driving accident image in road condition information of the road accident condition reporting device, extract a photographing position and a photographing time corresponding to the driving accident image obtained by means of identification, and use the photographing position and the photographing time as the accident occurrence position and the accident occurrence time point respectively.

S602. The road accident condition reporting device sends a road condition information request to a second terminal, where the second terminal has a road condition recording capability, and a distance between the accident occurrence position and the second terminal at the accident occurrence time point is less than a preset threshold.

The road condition information request may carry the accident occurrence time point or the accident occurrence position. If both the accident occurrence time point and the accident occurrence position are omitted by default, it may indicate that road condition information that is obtained currently or recently is requested. Specifically, the road accident condition reporting device may establish a communication connection to the second terminal that is located in a preset area around the accident occurrence position at the accident occurrence time point, and then send the road condition information request to the second terminal. The communication connection may be established by using one or more of the following: a cellular network (GSM, Global System for Mobile Communications; UMTS, Universal Mobile Telecommunications System; LTE, Long Term Evolution; CDMA, Code Division Multiple Access; or the like), a wireless local area network (WLAN), near field communication (NFC), or Bluetooth. For example, if the road accident condition reporting device is currently located in the accident occurrence position, the road accident condition reporting device may send the road condition information request to a second terminal in a preset surrounding area.

In an optional embodiment, if the accident occurrence time point is a current instant time determined by the road accident condition reporting device, that is, a current time point, the road accident condition reporting device may establish a communication connection to a second terminal that is currently in a preset area around the accident occurrence position. If the accident occurrence time point is an instant time determined by the road accident condition reporting device, and the accident occurrence position is a position in which the road accident condition reporting device is currently located, the road accident condition reporting device may establish a communication connection to a second terminal that is in a preset area around the current position of the road accident condition reporting device, for example, may broadcast a communication connection request to the preset area around the position of the road accident condition reporting device, so as to establish the communication connection to the second terminal.

In another optional embodiment, if the accident occurrence time point is not a current instant time, or the accident occurrence position is not a position in which the road accident condition reporting device is currently located, the road accident condition reporting device may submit the accident occurrence position and the accident occurrence time point to a server, so that the server searches, according to the accident occurrence position and the accident occurrence time point, for a second terminal that is located in a preset area around the accident occurrence position at the accident occurrence time point, and the road accident condition reporting device may establish, according to a searching result of the server, a communication connection to the second terminal that is located in the preset area around the accident occurrence position at the accident occurrence time point. For example, the road accident condition reporting device receives communication connection information of the second terminal that is sent by the server, and establishes the communication connection to the second terminal according to the communication connection information of the second terminal. The communication connection information may be network information required for establishing the communication connection to the second terminal, for example, a MAC (Media Access Control, Media Access Control) hardware address, an IP (Internet Protocol, Internet Protocol) address, Bluetooth interconnection information, and an NFC interconnection password.

S603. The road accident condition reporting device receives road condition information that is corresponding to the accident occurrence position and sent by the second terminal.

In a specific implementation, the second terminal may return, according to the road condition information request sent by the road accident condition reporting device, the road condition information corresponding to the accident occurrence position to the road accident condition reporting device, for example, send the road condition information by using the communication connection established between the road accident condition reporting device and the second terminal, or send, according to a terminal identifier of the road accident condition reporting device that is carried in the road condition information request, the road condition information to the road accident condition reporting device after forwarding by a communications network (for example, a communications base station) or a server.

The road condition information corresponding to the accident occurrence position may be road condition information that is of the accident occurrence position and photographed by the second terminal, or may be road condition information photographed by the second terminal near the accident occurrence position, for example, road condition information photographed by the second terminal in a preset area around the accident occurrence position or on a road section on which the accident occurrence position is located. Specifically, the second terminal may obtain the photographed road condition information of the accident occurrence position according to a photographing position and a photographing angle. The second terminal may obtain, according to a photographing position of the road condition information, the road condition information photographed in the preset area around the accident occurrence position or on the road section on which the accident occurrence position is located.

In an optional embodiment, if the road condition information request does not carry the accident occurrence position or the accident occurrence time point, the second terminal may send road condition information that is obtained at a current moment or road condition information that is obtained within a recent time period (for example, last 10 seconds, 30 seconds, or one minute) to the road accident condition reporting device. In this embodiment, the road accident condition reporting device determines that the second terminal is currently located in a preset area around the accident occurrence position. Therefore, the road condition information photographed by the second terminal at the current moment is road condition information corresponding to the accident occurrence position.

In another optional embodiment, if the road condition information request carries the accident occurrence position or the accident occurrence time point, the second terminal may select, in recorded road condition information, road condition information corresponding to the accident occurrence position or road condition information corresponding to the accident occurrence time point, and send the road condition information to the road accident condition reporting device. The road condition information corresponding to the accident occurrence time point may be road condition information photographed by the road accident condition reporting device at the accident occurrence time point, or may be road condition information photographed by the road accident condition reporting device within a time period before or after the accident occurrence time point, for example, road condition information photographed within a time period of one minute, 30 seconds, or 10 seconds before or after the accident occurrence time. Further, optionally, if road condition information photographed by the second terminal at the accident occurrence time point is not road condition information corresponding to the accident occurrence position, it indicates that the second terminal does not photograph road condition information corresponding to the accident occurrence position at the accident occurrence time point, and may not return road condition information to the road accident condition reporting device.

S604. The road accident condition reporting device reports, to an accident assessment server, the road condition information that is corresponding to the accident occurrence position and sent by the second terminal.

Specifically, after collecting road condition information that is corresponding to the accident occurrence position and sent by at least one second terminal, the road accident condition reporting device may report the road condition information corresponding to the accident occurrence position to the accident assessment server. Further, optionally, when reporting, to the accident assessment server, the road condition information that is corresponding to the accident occurrence position and sent by the second terminal, the road accident condition reporting device reports, to the accident assessment server, road condition information that is corresponding to the accident occurrence position and photographed by the road accident condition reporting device, so that the accident assessment server performs accident assessment according to the road condition information corresponding to the accident occurrence position.

S605. The accident assessment server performs accident assessment according to the road condition information corresponding to the accident occurrence position.

The accident assessment server may perform responsibility assessment for a current accident according to the road condition information corresponding to the accident occurrence position, and send an accident assessment result to a vehicle or a terminal related to the accident. In an optional embodiment, the accident assessment server may further send the accident assessment result to an insurance company, and after subsequently completing an electronic insurance book according to the accident assessment result, the insurance company may send the insurance book to the vehicle or the terminal related to the accident.

In this embodiment, a road accident condition reporting device collects road condition information of an accident occurrence position that is obtained by a second terminal located around the accident occurrence position at an accident occurrence time point, and may report the road condition information of the accident occurrence position to an accident assessment server for accident assessment. In this way, accident assessment accuracy can be improved.

Figure 7A:
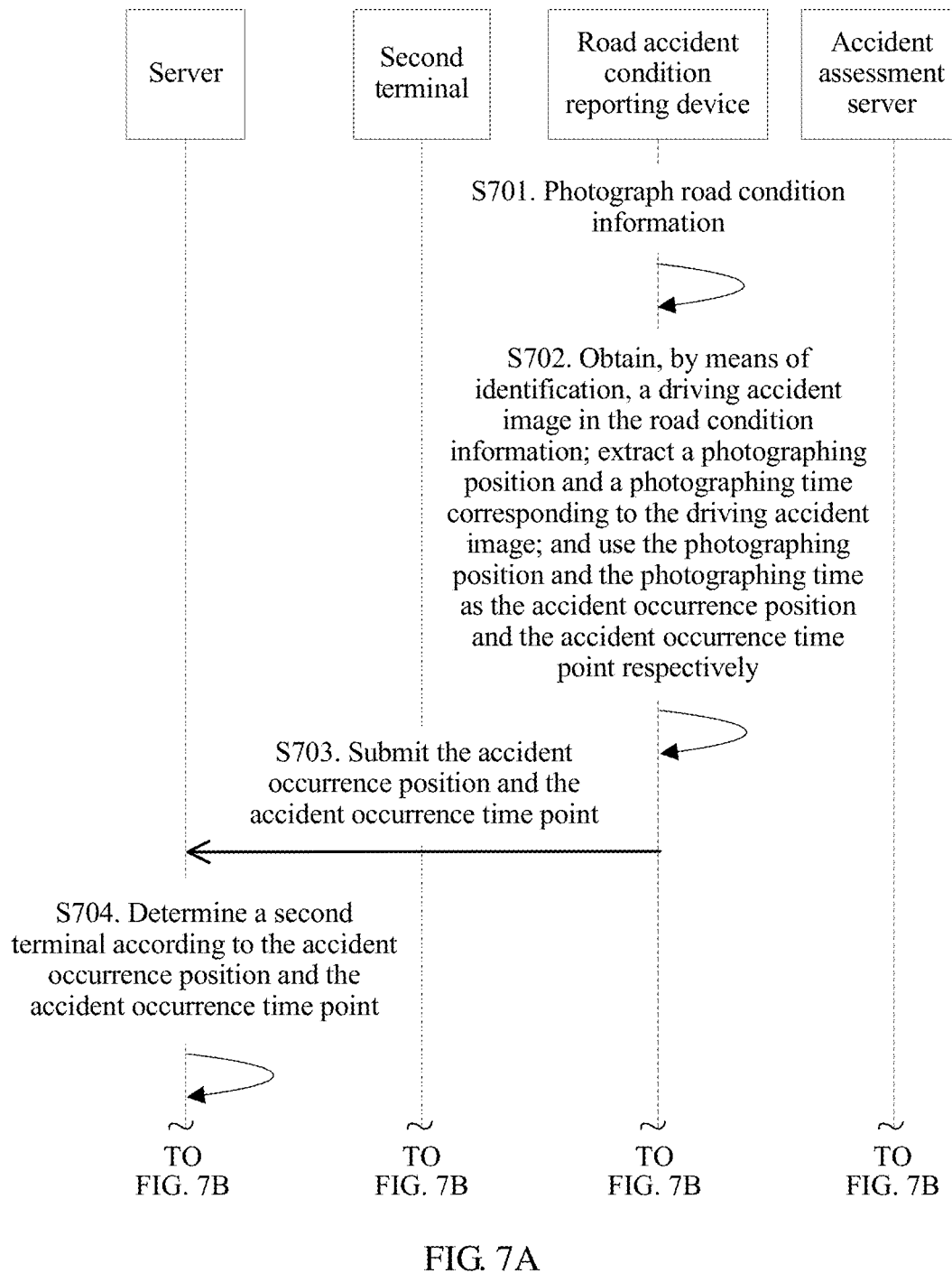
FIG. 7A and FIG. 7B are a schematic flowchart of a road condition information obtaining method according to another embodiment of the present invention.
Figure 7B:
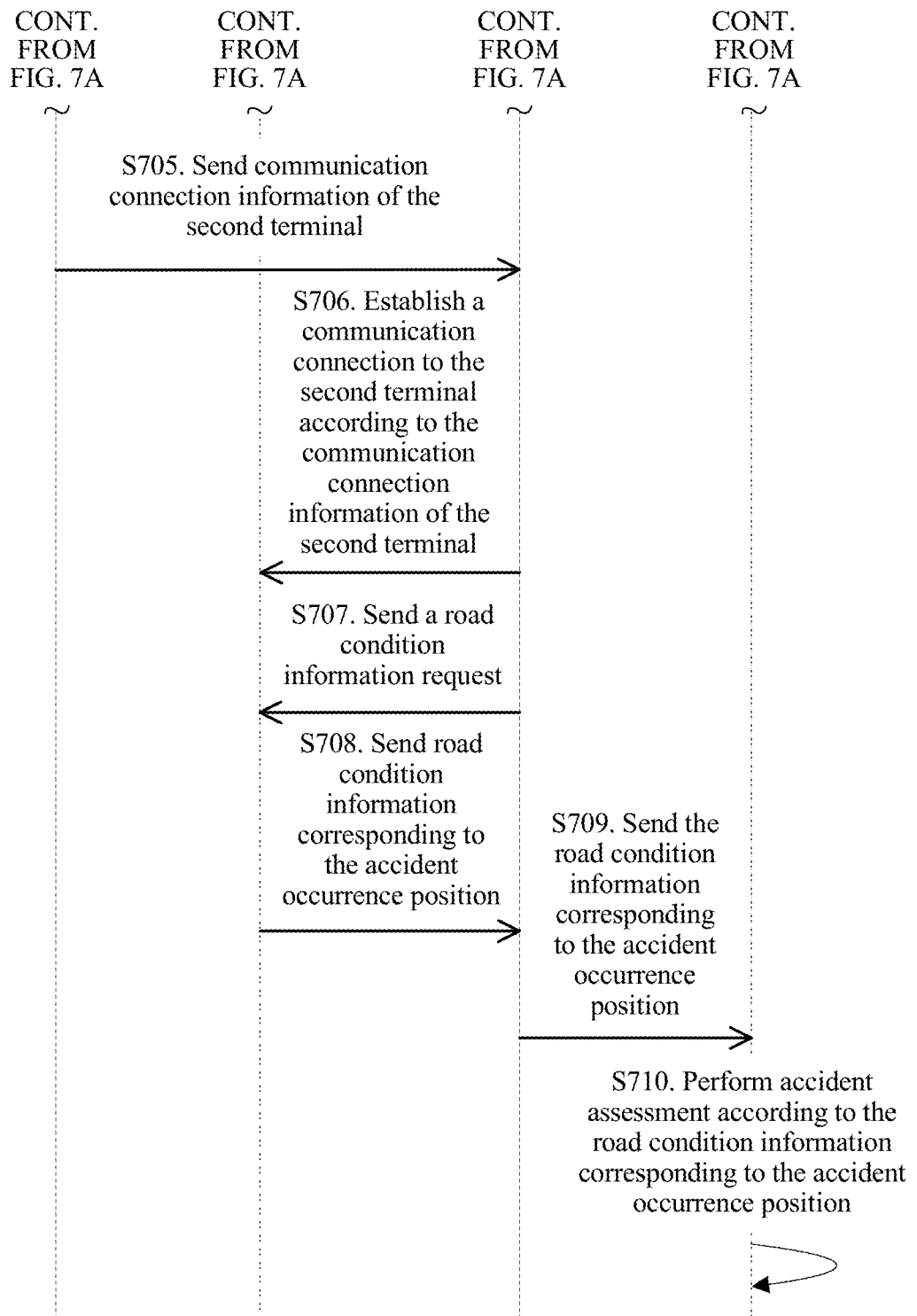

FIG. 7A and FIG. 7B are a schematic flowchart of a road condition information obtaining method according to another embodiment of the present invention. As shown in the figure, the road condition information obtaining method in this embodiment includes the following procedure.

S701. A road accident condition reporting device photographs road condition information.

The road accident condition reporting device in this embodiment may photograph and record road condition information by using a camera or a driving recording apparatus. The road condition information may be a photographed road condition image or road condition video, and may further include road environment condition information such as noise, weather, and road visibility. When photographing the road condition information, the road accident condition reporting device may further record a photographing position and a photographing time corresponding to the photographed road condition information.

S702. The road accident condition reporting device obtains, by means of identification, a driving accident image in the photographed road condition information, extracts a photographing position and a photographing time corresponding to the driving accident image, and uses the photographing position and the photographing time as an accident occurrence position and an accident occurrence time point respectively.

The road accident condition reporting device may perform accident image identification on the road condition information photographed by the road accident condition reporting device, to obtain the driving accident image. An identification manner is not a focus of the present invention, and any accident image identification technology may be used.

S703. The road accident condition reporting device submits the accident occurrence position and the accident occurrence time point to a server.

S704. The server determines a second terminal according to the accident occurrence position and the accident occurrence time point, where the second terminal has a road condition recording capability, and a distance between the accident occurrence position and the second terminal at the accident occurrence time point is less than a preset threshold.

Specifically, after receiving the accident occurrence position and the accident occurrence time point that are submitted by the road accident condition reporting device, the server may obtain the second terminal that is located near the accident occurrence position at the accident occurrence time point. In a specific implementation, the server may search, according to position information reported by second terminals and corresponding reporting time points that are obtained in advance, for a second terminal that is located in a preset area around the accident occurrence position at the accident occurrence time point. In a specific implementation, the server may search, according to position information reported by second terminals and corresponding reporting time points that are obtained in advance, for a second terminal that is located, at the accident occurrence time point, in a preset area around the accident occurrence position or on a road section on which the accident occurrence position is located.

In an optional embodiment, the server may first screen the reported position information according to the position information that is reported by all the terminals and obtained in advance, to determine third terminals, where distances between the third terminals and the accident occurrence position are less than a preset distance, then obtain road condition recording capabilities of the third terminals, and determine a third terminal whose road condition recording capability meets a preset criterion as the second terminal. The road condition recording capability is determined according to a spatial relationship between a road condition recording position of each terminal and the accident occurrence position, and hardware information or credit information of the terminal. For example, when a road condition recording position of the third terminal is closer to the accident occurrence position, or a road condition recording position of the third terminal at the time point of concern is closer to the accident occurrence position, a road condition recording capability of the third terminal is higher; or better hardware performance of the third terminal, for example, a larger quantity of pixels or higher photographing definition of a camera, indicates a higher road condition recording capability of the third terminal. The credit information of the third terminal may be obtained according to a record of using or adopting road condition information collected by the third terminal and a record of receiving complaints and reporting errors. For example, the credit information includes a credit value or a credit level, and a larger quantity of times of using or adopting the road condition information collected by the third terminal indicates a larger credit value or a higher credit level of the third terminal, and accordingly indicates a higher road condition recording capability of the third terminal; on the contrary, a larger quantity of times of complaining about the road condition information collected by the third terminal or a larger quantity of times that the road condition information collected by the third terminal is incorrect indicates a smaller credit value or a lower credit level of the third terminal, and accordingly indicates a lower road condition recording capability of the third terminal. When finding multiple third terminals that are located near the accident occurrence position, the server may preferably select a third terminal with a higher road condition recording capability as the second terminal.

S705. The server sends communication connection information of the second terminal to the road accident condition reporting device.

The communication connection information may be network information required for establishing a communication connection to the second terminal, for example, an IMSI, MSISDN, or MAC hardware address, an IP address, Bluetooth interconnection information, and an NFC interconnection password.

S706. The road accident condition reporting device establishes a communication connection to the second terminal according to the communication connection information of the second terminal.

The communication connection may be established by using one or more of the following: a cellular network (GSM, Global System for Mobile Communication; UMTS, Universal Mobile Telecommunications System; LTE, Long Term Evolution; CDMA, Code Division Multiple Access; or the like), a wireless local area network (WLAN, Wireless Local Area Networks), near field communication (NFC, Near Field Communication), or Bluetooth.

S707. The road accident condition reporting device sends a road condition information request to the second terminal.

The road condition information request may carry the accident occurrence time point or the accident occurrence position. If both the accident occurrence time point and the accident occurrence position are omitted by default, it may indicate that road condition information that is obtained currently or recently is requested.

S708. The second terminal sends road condition information corresponding to the accident occurrence position to the road accident condition reporting device.

In a specific implementation, the second terminal may return, according to the road condition information request sent by the road accident condition reporting device, the road condition information corresponding to the accident occurrence position to the road accident condition reporting device, for example, send the road condition information by using the communication connection established between the road accident condition reporting device and the second terminal, or send, according to a terminal identifier of the road accident condition reporting device that is carried in the road condition information request, the road condition information to the road accident condition reporting device after forwarding by a communications network (for example, a communications base station) or a server. The road condition information corresponding to the accident occurrence position may be road condition information that is of the accident occurrence position and photographed by the second terminal, or may be road condition information photographed by the second terminal near the accident occurrence position, for example, road condition information photographed by the second terminal in a preset area around the accident occurrence position or on a road section on which the accident occurrence position is located. Specifically, the second terminal may obtain the photographed road condition information of the accident occurrence position according to a photographing position and a photographing angle. The second terminal may obtain, according to a photographing position of the road condition information, the road condition information photographed in the preset area around the accident occurrence position or on the road section on which the accident occurrence position is located.

S709. The road accident condition reporting device sends the road condition information corresponding to the accident occurrence position to an accident assessment server.

In this embodiment, when reporting, to the accident assessment server, the road condition information that is corresponding to the accident occurrence position and sent by the second terminal, the road accident condition reporting device reports, to the accident assessment server, road condition information that is corresponding to the accident occurrence position and photographed by the road accident condition reporting device, so that the accident assessment server performs accident assessment according to the road condition information corresponding to the accident occurrence position.

S710. The accident assessment server performs accident assessment according to the road condition information corresponding to the accident occurrence position.

The accident assessment server may perform responsibility assessment for a current accident according to the road condition information corresponding to the accident occurrence position, and send an accident assessment result to a vehicle or a terminal related to the accident. In an optional embodiment, the accident assessment server may further send the accident assessment result to an insurance company, and after subsequently completing an electronic insurance book according to the accident assessment result, the insurance company may send the insurance book to the vehicle or the terminal related to the accident.

In this embodiment, a road accident condition reporting device obtains, by means of identification, an accident occurrence position and an accident occurrence time point in road condition information photographed by the road accident condition reporting device; then with the help of a server, finds a second terminal that is located in a preset area around the accident occurrence position at the accident occurrence time point, and establishes a communication connection to the second terminal; collects road condition information of the accident occurrence position that is obtained by the second terminal; and reports, to an accident assessment server for accident assessment, the road condition information that is corresponding to the accident occurrence position and obtained by the second terminal and the road accident condition reporting device. In this way, accident assessment accuracy can be improved.

Figure 8:
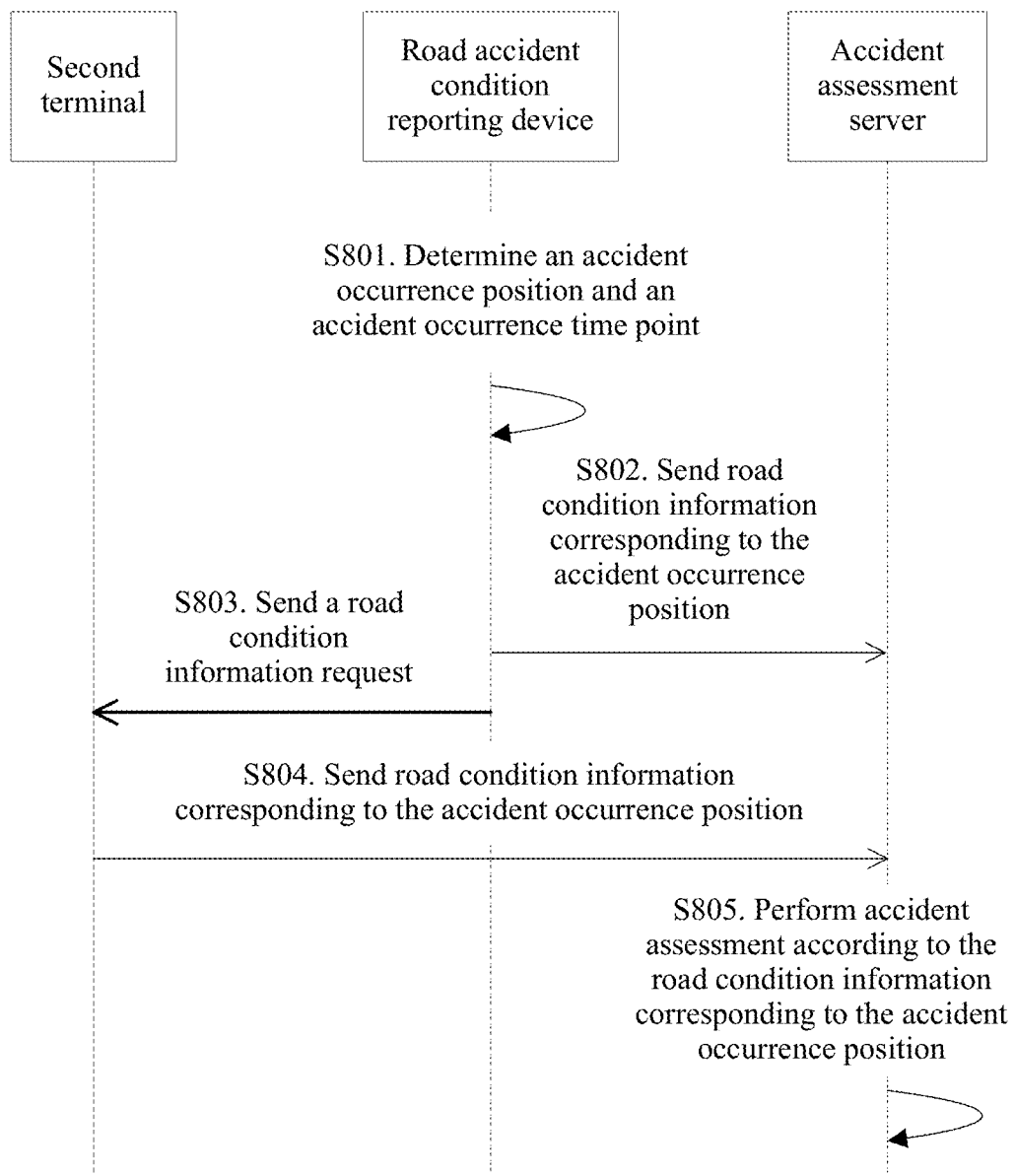
FIG. 8 is a schematic flowchart of a road condition information obtaining method according to another embodiment of the present invention.

FIG. 8 is a schematic flowchart of a road condition information obtaining method according to another embodiment of the present invention. As shown in the figure, the road condition information obtaining method in this embodiment includes the following procedure.

S801. A road accident condition reporting device determines an accident occurrence position and an accident occurrence time point.

For specific description, refer to S601 in the foregoing embodiment, and details are not described in this embodiment again.

The road accident condition reporting device in this embodiment of the present invention may be a user terminal, such as a smart phone, a tablet computer, an intelligent wearable device, an e-reader, an in-vehicle terminal, or a second terminal. In an optional embodiment, the road accident condition reporting device may also be a server.

S802. The road accident condition reporting device sends road condition information corresponding to the accident occurrence position to an accident assessment server.

In this embodiment, the road accident condition reporting device sends, to the accident assessment server, only the road condition information that is corresponding to the accident occurrence position and photographed by the road accident condition reporting device.

S803. The road accident condition reporting device sends a road condition information request to a second terminal that is located in a preset area around the accident occurrence position at the accident occurrence time point.

Specifically, for how does the road accident condition reporting device find the second terminal that is located in the preset area around the accident occurrence position at the accident occurrence time point and how to send the road condition information request, refer to S602 in the foregoing embodiment, and details are not described in this embodiment again. The road condition information request in this embodiment of the present invention does not request the second terminal to return road condition information, but requests the second terminal to directly send the road condition information to the accident assessment server.

S804. The second terminal sends road condition information corresponding to the accident occurrence position to the accident assessment server.

For a manner of obtaining, by the second terminal, the road condition information corresponding to the accident occurrence position, refer to S603 in the foregoing embodiment, and details are not described in this embodiment again.

Different from the foregoing embodiment, the second terminal in this embodiment directly submits the road condition information corresponding to the accident occurrence position to the accident assessment server according to the road condition information request. That is, the road accident condition reporting device in this embodiment does not collect road condition information obtained by another second terminal near the accident occurrence position, but requests the another second terminal to submit the road condition information corresponding to the accident occurrence position to the accident assessment server.

S805. The accident assessment server performs accident assessment according to the road condition information corresponding to the accident occurrence position.

The accident assessment server may perform responsibility assessment for a current accident according to the road condition information corresponding to the accident occurrence position, and send an accident assessment result to a vehicle or a terminal related to the accident. In an optional embodiment, the accident assessment server may further send the accident assessment result to an insurance company, and after subsequently completing an electronic insurance book according to the accident assessment result, the insurance company may send the insurance book to the vehicle or the terminal related to the accident.

In this embodiment, when sending, to an accident assessment server, road condition information of an accident occurrence position that is photographed by a road accident condition reporting device, the road accident condition reporting device requests a second terminal located around the accident occurrence position at an accident occurrence time point to report road condition information of the accident occurrence position to the accident assessment server for accident assessment. In this way, accident assessment accuracy can be improved.

Figure 9:
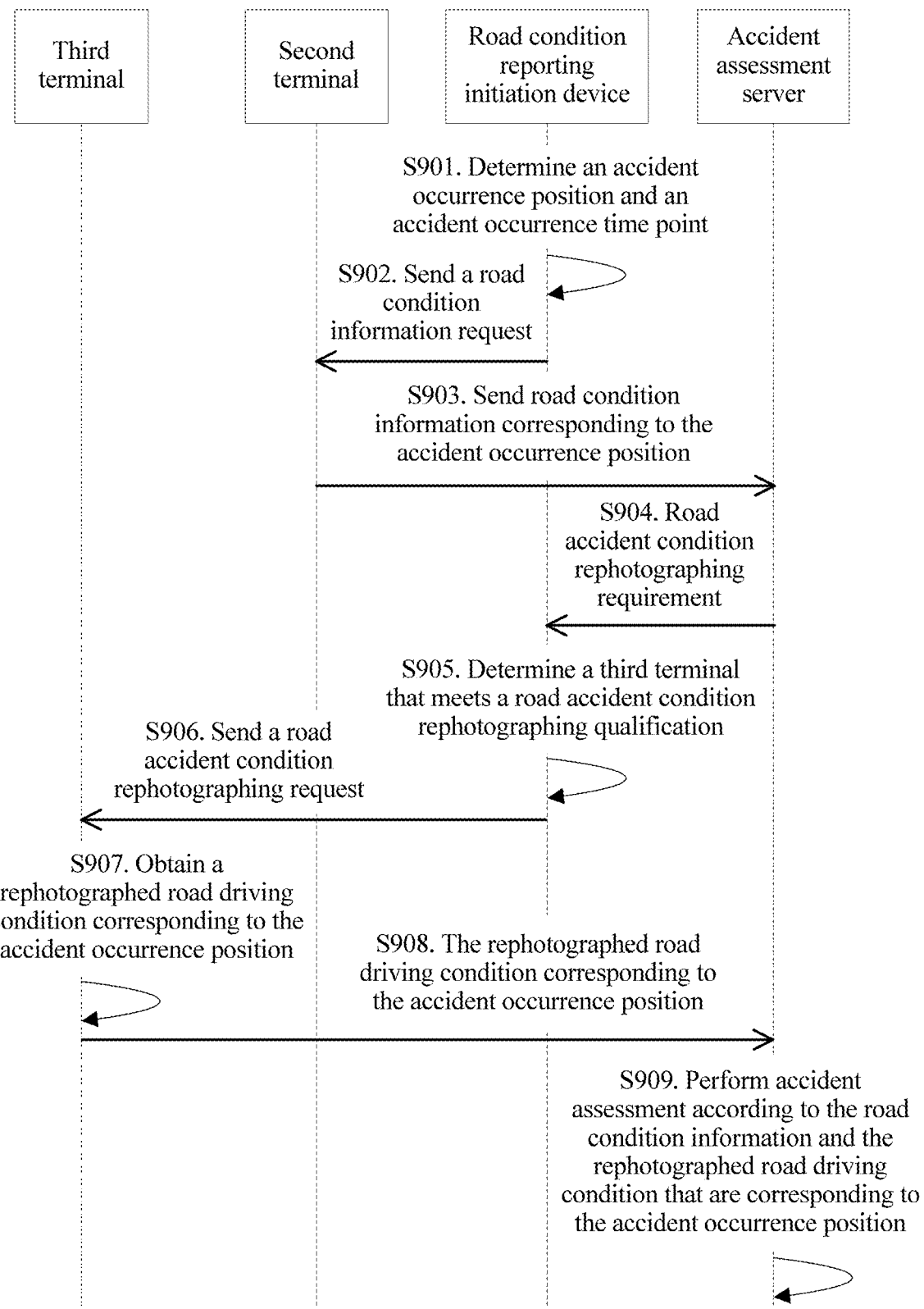
FIG. 9 is a schematic flowchart of a road condition information obtaining method according to another embodiment of the present invention.

FIG. 9 is a schematic flowchart of a road condition information obtaining method according to another embodiment of the present invention. As shown in the figure, the road condition information obtaining method in this embodiment includes the following procedure.

S901. A road condition reporting initiation device determines an accident occurrence position and an accident occurrence time point.

Specifically, the road condition reporting initiation device in this embodiment may be a server, and determines the accident occurrence position and the accident occurrence time point according to an accident reporting message that is submitted by a first terminal or another user terminal or accident information that is input by a manager of the road condition reporting initiation device.

S902. The road condition reporting initiation device sends a road condition information request to a second terminal, where the second terminal has a road condition recording capability, and a distance between the accident occurrence position and the second terminal is less than a preset threshold.

Specifically, after determining the accident occurrence position and the accident occurrence time point, the road condition reporting initiation device may search, according to position information reported by second terminals and corresponding reporting time points that are obtained in advance, for a second terminal that is located near the accident occurrence position at the accident occurrence time point, for example, a second terminal that is located, at the accident occurrence time point, in a preset area around the accident occurrence position or on a road section on which the accident occurrence position is located. Specifically, for how does the road condition reporting initiation device find the second terminal that is located in the preset area around the accident occurrence position at the accident occurrence time point and how to send the road condition information request, refer to S602 in the foregoing embodiment, and details are not described in this embodiment again. Further, the road condition reporting initiation device sends the road condition information request to the second terminal that is located near the accident occurrence position at the accident occurrence time point. The road condition information request may carry the accident occurrence time point or the accident occurrence position. If both the accident occurrence time point and the accident occurrence position are omitted by default, it may indicate that road condition information that is obtained currently or recently is requested.

S903. The second terminal sends road condition information corresponding to the accident occurrence position to an accident assessment server.

The road condition information corresponding to the accident occurrence position may be road condition information that is of the accident occurrence position and photographed by the second terminal, or may be road condition information photographed by the second terminal near the accident occurrence position, for example, road condition information photographed by the second terminal in a preset area around the accident occurrence position or on a road section on which the accident occurrence position is located. Specifically, the second terminal may obtain the photographed road condition information of the accident occurrence position according to a photographing position and a photographing angle. The second terminal may obtain, according to a photographing position of the road condition information, the road condition information photographed in the preset area around the accident occurrence position or on the road section on which the accident occurrence position is located.

In an optional embodiment, the second terminal may prestore a communication address of the accident assessment server, or the road condition information request sent by the road condition reporting initiation device carries a communication address of the accident assessment server, so that the second terminal sends the road condition information corresponding to the accident occurrence position to the accident assessment server. Further, in an optional embodiment, the second terminal may also send the road condition information corresponding to the accident occurrence position to the road condition reporting initiation device, and the road condition reporting initiation device receives the road condition information corresponding to the accident occurrence position and sends the collected road condition information corresponding to the accident occurrence position to the accident assessment server.

S904. The accident assessment server sends a road accident condition rephotographing requirement to the road condition reporting initiation device.

In this embodiment, the accident assessment server may determine whether the currently received road condition information corresponding to the accident occurrence position meets an accident assessment requirement, for example, whether a vehicle license plate number of an involved vehicle is obtained, or whether an image of a collision position of an involved vehicle is clear. If the currently obtained road condition information corresponding to the accident occurrence position cannot meet the accident assessment requirement, the accident assessment server sends the road accident condition rephotographing requirement to the road condition reporting initiation device. The road accident condition rephotographing requirement may carry required target photographing information, for example, the accident occurrence position, a vehicle license plate of an involved vehicle that needs to be photographed, or a specified photographing position and/or photographing angle.

S905. The road condition reporting initiation device determines a third terminal that meets a road accident condition rephotographing qualification.

The third terminal that meets the road accident condition rephotographing qualification may be a terminal device that uses a camera or a driving recording apparatus to photograph and record road condition information, for example, a second terminal disposed on a vehicle or worn by a pedestrian, or a road infrastructure surveillance photographing device. The road accident condition rephotographing qualification is: being able to obtain road condition information of the accident occurrence position currently or shortly, for example, the third terminal is currently located in the accident occurrence position, or the accident occurrence position is located ahead of a driving route of the third terminal, that is, the third terminal is currently located or is about to arrive at the accident occurrence position. The road accident condition rephotographing qualification may further be determined according to the road accident condition rephotographing requirement sent by the accident assessment server. For example, if the road accident condition rephotographing requirement includes a photographing pixel requirement, a photographing definition requirement, or a photographing angle requirement, the road accident condition rephotographing qualification correspondingly may further include: being able to meet the foregoing requirement.

The road condition reporting initiation device may determine the third terminal that meets the road accident condition rephotographing qualification in the following two manners:

Manner 1:

The road accident condition rephotographing qualification is broadcast to a road condition recording terminal in an area to which the accident occurrence position belongs, so that the road condition recording terminal in the area to which the accident occurrence position belongs detects whether the road condition recording terminal meets the road accident condition rephotographing qualification; and the third terminal that meets the road accident condition rephotographing qualification is determined according to a rephotographing qualification acknowledgement message returned by the road condition recording terminal in the area to which the accident occurrence position belongs.

The area to which the accident occurrence position belongs may be a geographical administrative region to which the accident occurrence position belongs, for example, a city, county, or road to which the accident occurrence position belongs, or a geometric area of a specified shape and range that uses the accident occurrence position as a center. The road condition reporting initiation device may search, according to obtained position information that is reported by road condition recording terminals, the road condition recording terminal that is currently located in the area to which the accident occurrence position belongs, and then broadcast the road accident condition rephotographing qualification to the road condition recording terminal in the area to which the accident occurrence position belongs. The road condition recording terminal in the area to which the accident occurrence position belongs detects whether the road condition recording terminal meets the road accident condition rephotographing qualification. If the road condition recording terminal meets the road accident condition rephotographing qualification, the road condition recording terminal returns the rephotographing qualification acknowledgement message to the road condition reporting initiation device; or if the road condition recording terminal does not meet the road accident condition rephotographing qualification, the road condition recording terminal may discard the road accident condition rephotographing qualification, or returns a rephotographing qualification inconformity message to the road condition reporting initiation device.

Manner 2:

Driving state information of a road condition recording terminal in an area to which the accident occurrence position belongs is obtained; whether the driving state information of the road condition recording terminal in the area to which the accident occurrence position belongs meets the road accident condition rephotographing qualification is determined; and a road condition recording terminal whose driving state information meets the road accident condition rephotographing qualification is determined as the third terminal.

In this manner, the road condition reporting initiation device may collect driving state information of a road condition recording terminal in an area to which the accident occurrence position belongs. The driving state information includes a current position and a navigation route, and correspondingly may further include a photographing pixel or definition, a supported photographing angle range, and the like according to the road accident condition rephotographing qualification. Then, the road condition reporting initiation device compares the driving state information of the road condition recording terminal with the road accident condition rephotographing qualification, determines whether the driving state information of the road condition recording terminal in the area to which the accident occurrence position belongs meets the road accident condition rephotographing qualification, and determines a road condition recording terminal whose driving state information meets the road accident condition rephotographing qualification as the third terminal.

S906. The road condition reporting initiation device sends a road accident condition rephotographing request to the third terminal.

The road accident condition rephotographing request may carry target photographing information, for example, the accident occurrence position, a vehicle license plate of an involved vehicle that needs to be photographed, or a specified photographing position and/or photographing angle.

S907. The third terminal obtains a rephotographed road driving condition corresponding to the accident occurrence position.

Specifically, the third terminal may set a driving state and a road driving condition photographing parameter according to the road accident condition rephotographing request, for example, arriving at a target photographing position, stopping or decelerating when arriving at the accident occurrence position, and adjusting a photographing angle and a photographing pixel or definition for photographing a road driving condition, to meet corresponding requirements in the road accident condition rephotographing request, so as to obtain the rephotographed road driving condition corresponding to the accident occurrence position. In an optional embodiment, the third terminal may further detect whether key information such as a vehicle license plate of an involved vehicle is photographed.

S908. The third terminal sends the rephotographed road driving condition corresponding to the accident occurrence position to the accident assessment server.

In an optional embodiment, the third terminal may also send road condition information corresponding to the accident occurrence position to the road condition reporting initiation device, and the road condition reporting initiation device receives the road condition information corresponding to the accident occurrence position and sends the collected road condition information corresponding to the accident occurrence position to the accident assessment server.

S909. The accident assessment server performs accident assessment according to the road condition information and the rephotographed road driving condition that are corresponding to the accident occurrence position.

In this embodiment, an accident assessment server performs accident assessment according to road condition information corresponding to an accident occurrence position that is sent by a second terminal in S903 and a rephotographed road driving condition corresponding to the accident occurrence position that is sent by a third terminal in S908. In this way, road condition rephotographing can be performed when road condition information is insufficient in a process of collecting a road driving accident condition, so as to improve accident assessment fairness and accuracy.

Figure 10:
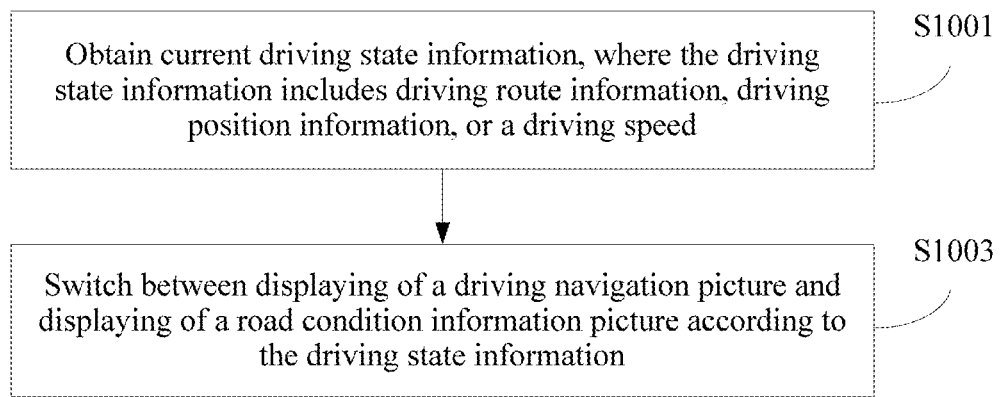
FIG. 10 is a schematic flowchart of a road condition information displaying method according to an embodiment of the present invention.

FIG. 10 is a schematic flowchart of a road condition information displaying method according to an embodiment of the present invention. The road condition information displaying method in this embodiment of the present invention may be executed by a road condition information displaying device. As shown in the figure, the road condition information displaying method in this embodiment may include the following steps.

S1001. Obtain current driving state information, where the driving state information includes driving route information, driving position information, or a driving speed.

In an optional embodiment, the road condition information displaying device in the present invention may be a mobile terminal or an in-vehicle terminal in which a navigation module that provides a navigation picture is built, and may obtain a road condition information image from a road driving condition recording apparatus. In another embodiment, the road condition information displaying device may be a road driving condition recording apparatus, and can display currently photographed road condition information in real time; a navigation module that provides a navigation picture may be built in the road condition information displaying device, or the road condition information displaying device may be connected to a mobile terminal or an in-vehicle terminal that provides a navigation picture. The road condition information displaying device may also be a mobile terminal, a tablet computer, or any other user equipment, and may obtain a navigation picture from an in-vehicle terminal and obtain a road condition information picture from a road driving condition recording apparatus. The driving route information may be provided by the navigation module that provides a navigation picture, or may be obtained by using a GPS or another sensor that is built in the road condition information displaying device.

S1003. Switch between displaying of a driving navigation picture and displaying of a road condition information picture according to the driving state information.

Specifically, that the road condition information displaying device switches between displaying of the driving navigation picture and displaying of the road condition information picture according to the driving state information may include any one or more of the following cases:

(101) A length of a route to be passed along a current road is calculated according to the driving route information and the driving position information, and the road condition information picture is displayed if the length of the route to be passed along the current road is greater than a preset distance threshold.

In a specific implementation, the road condition information displaying device may obtain the current road according to the driving position information, and then obtain a remaining distance ahead along the current road according to the driving route information. The remaining distance is the length of the route to be passed along the current road. For example, a current driving position is a point on a road A, a length of a route from the current driving position to a position ahead in which a corresponding vehicle departs from the road A is 400 meters by means of calculation according to the driving route information, and if the preset distance threshold is 200 meters, the length of the route to be passed along the current road is greater than the preset distance threshold. This indicates that there is still a relatively long distance to be passed along the current road, and a requirement for displaying the navigation picture may be relatively low. In this case, if the road condition information displaying device currently displays the road condition information picture, it remains unchanged; if the road condition information displaying device currently displays the navigation picture, the road condition information displaying device switches to displaying of the road condition information picture.

(102) If it is determined, according to the driving position information, that a corresponding vehicle is currently located in a road junction area, the driving navigation picture is displayed.

In a specific implementation, if the road condition information displaying device determines, according to the driving position information and a preset road map, that a distance between a current driving position and a nearest road junction position is less than a preset threshold, for example, 100 meters or 200 meters, it is determined that the vehicle is currently located in the road junction area; or the road condition information displaying device may determine, according to the driving route information and the driving position information, whether the vehicle is about to arrive at a road junction, and if the vehicle is about to arrive at the road junction, for example, the road junction is ahead of the vehicle by 100 meters or 200 meters, it is determined that the vehicle is located in the road junction area. When a vehicle is in a road junction area, a requirement for displaying the navigation picture is generally high, and if the road condition information displaying device currently displays the navigation picture, it remains unchanged; or if the road condition information displaying device currently displays the road condition information picture, the road condition information displaying device switches to displaying the navigation picture.

(103) If it is determined, according to the driving speed and the currently photographed road condition information, that a corresponding road is currently in a road congestion state, the road condition information picture is displayed.

In a specific implementation, if the current driving speed is less than a preset threshold, for example, 5 km/h, and there is a large quantity of vehicles in the currently photographed road condition information picture, it may be considered that the road is currently in a road congestion state. Because the road congestion state is often associated with a traffic incident such as rear-ending or a collision, a requirement for displaying the road condition information picture may be higher. Therefore, if the road condition information displaying device currently displays the road condition information picture, it remains unchanged; or if the road condition information displaying device currently displays the navigation picture, the road condition information displaying device switches to displaying of the road condition information picture.

(104) If the current driving speed is less than a preset speed threshold, the driving navigation picture is displayed.

In an optional embodiment, if the current driving speed is less than the preset speed threshold, it indicates that a corresponding vehicle is currently in a low-speed driving state, and in this case, a requirement for displaying the road condition information picture may be higher. Therefore, if the road condition information displaying device currently displays the road condition information picture, it remains unchanged; or if the road condition information displaying device currently displays the navigation picture, the road condition information displaying device switches to displaying of the road condition information picture.

The road condition information displaying device in this embodiment can automatically switch between displaying of a navigation picture and displaying of a road condition information picture according to current driving state information, so as to automatically switch, in a same display area according to a requirement, between displaying of the navigation picture and displaying of the road condition information picture, and avoid a security risk caused because a user watches two display areas or manually switches between displayed pictures in a driving process.

Figure 11:
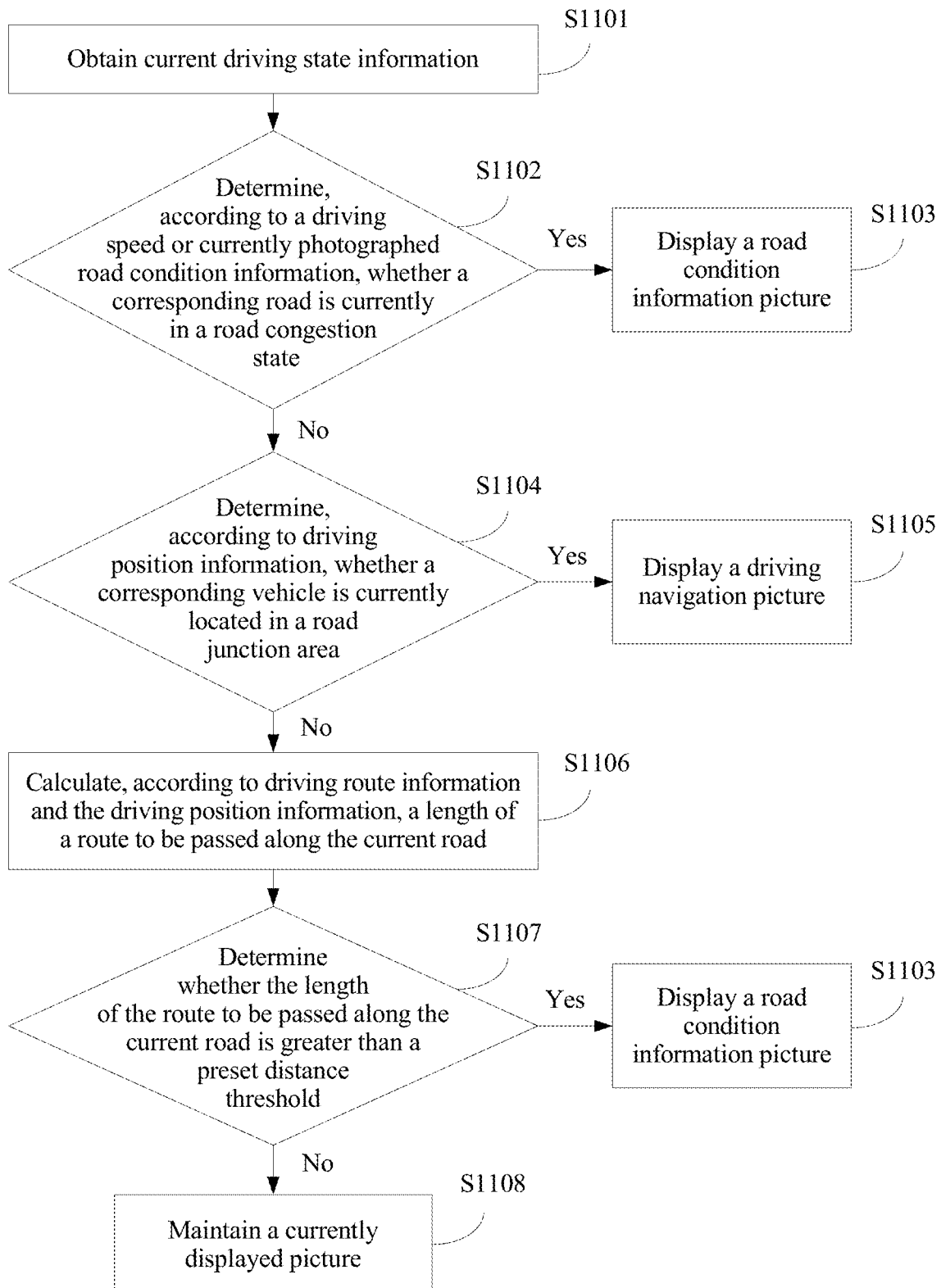
FIG. 11 is a schematic flowchart of a road condition information displaying method according to another embodiment of the present invention.

FIG. 11 is a schematic flowchart of a road condition information displaying method according to another embodiment of the present invention. The road condition information displaying method in this embodiment of the present invention may be executed by a road condition information displaying device. As shown in the figure, the road condition information displaying method in this embodiment may include the following steps.

S1101. Obtain current driving state information, where the driving state information includes driving route information, driving position information, or a driving speed.

S1102. Determine, according to the driving speed or currently photographed road condition information, whether a corresponding road is currently in a road congestion state.

If it is determined that the road is currently in a road congestion state, S1103 is executed; or if the road is not in the road congestion state currently, S1104 is executed.

S1103. Display a road condition information picture.

Specifically, it may be detected whether the road condition information picture is currently displayed, and if the road condition information picture is currently displayed, the current picture is maintained; or if the road condition information picture is not displayed currently, the road condition information displaying device switches to displaying of the road condition information picture.

S1104. Determine, according to the driving position information, whether a corresponding vehicle is currently located in a road junction area, and if it is determined that the vehicle is currently located in the road junction area, S1105 is executed; or if the vehicle is not located in the road junction area currently, S1103 is executed.

S1105. Display a driving navigation picture.

Specifically, it may be detected whether the navigation picture is currently displayed, and if the navigation picture is currently displayed, the current picture is maintained; or if the navigation picture is not displayed currently, the road condition information displaying device switches to displaying of the navigation picture.

S1106. Calculate, according to the driving route information and the driving position information, a length of a route to be passed along the current road.

S1107. Determine whether the length of the route to be passed along the current road is greater than a preset distance threshold, and if the length of the route to be passed along the current road is greater than the preset distance threshold, S1103 is executed; or if the length of the route to be passed along the current road is less than or equal to the preset distance threshold, S1108 is executed.

S1108. Maintain a currently displayed picture.

The road condition information displaying device in this embodiment can automatically switch between displaying of a navigation picture and displaying of a road condition information picture according to current driving state information, so as to automatically switch, in a same display area according to a requirement, between displaying of the navigation picture and displaying of the road condition information picture, and avoid a security risk caused because a user watches two display areas or manually switches between displayed pictures in a driving process.

Figure 12:
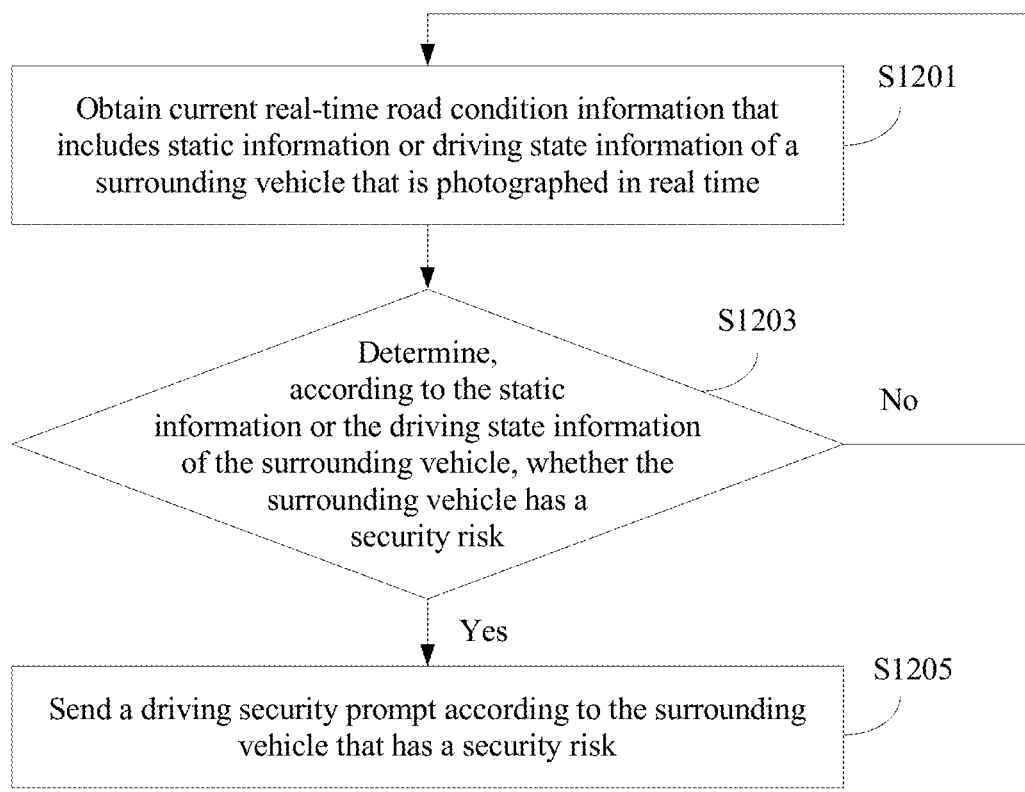
FIG. 12 is a schematic flowchart of a road condition information prompting method according to an embodiment of the present invention.

FIG. 12 is a schematic flowchart of a road condition information prompting method according to an embodiment of the present invention. The method is executed by a road condition information prompting device in this embodiment. The road condition information prompting device may be specifically user equipment such as a smart phone, a tablet computer, an in-vehicle terminal, or a driving recording apparatus. As shown in the figure, the road condition information prompting method in this embodiment includes the following procedure.

S1201. Obtain current real-time road condition information that includes static information or driving state information of a surrounding vehicle that is photographed in real time.

Specifically, the road condition information prompting device in this embodiment photographs the real-time road condition information by using a camera, and may extract, from the photographed road condition information, the static information and the driving state information of the surrounding vehicle. The static information of the surrounding vehicle may include vehicle license plate information or a vehicle model identity, and may further include static information of a driver or a passenger. The vehicle model identity may include a vehicle brand and model. The driving state information may include a speed or a driving path of the corresponding vehicle, and may further include a driver's behavior and the like.

S1203. Determine, according to the static information or the driving state information of the surrounding vehicle, whether the surrounding vehicle has a security risk.

For example, when the road condition information prompting device identifies, in the photographed road condition information, that a quantity of drivers and passengers in a surrounding vehicle obviously exceeds a limit for the vehicle, for example, if there are eight persons (including a driver and passengers) in a hatchback with four or five seats, it may be considered that the vehicle has a security risk. For another example, when the road condition information prompting device identifies, in the photographed road condition information, that a driver in a surrounding vehicle takes both hands off the steering wheel and is operating a phone or is lighting a cigarette or the like, it may be considered that the vehicle has a security risk. In an optional embodiment, the road condition information prompting device may determine, according to a speed or a driving path of the surrounding vehicle, whether a driver in the surrounding vehicle is in an abnormal state, and if the driver in the surrounding vehicle is in an abnormal state, it may be considered that the surrounding vehicle has a security risk. For example, when the road condition information prompting device identifies, in the photographed road condition information, that a driving path of a surrounding vehicle is of an "S" shape, or hard braking or overspeed driving occurs, or a vehicle gives out black smokes or shudders, or the like, it may be considered that the vehicle has a security risk.

S1205. Send a driving security prompt according to the surrounding vehicle that has a security risk.

In a specific implementation, the road condition information prompting device may prompt a user that a vehicle having a security risk exists around the user, and may further give a driving security suggestion, for example, which vehicles are dangerous vehicles, and the user should keep away from them or overtake them quickly.

In an optional embodiment, if determining that the surrounding vehicle has a security risk, the road condition information prompting device may send a driving security alarm to a server or a nearby user.

The road condition information prompting device in this embodiment can determine, according to static information or driving state information of a surrounding vehicle in photographed road condition information, whether the surrounding vehicle has a security risk, so as to send a driving security prompt according to the surrounding vehicle that has a security risk, and improve driving security. In addition, a more convenient and safer vehicle driving environment can be constructed.

Figure 13:
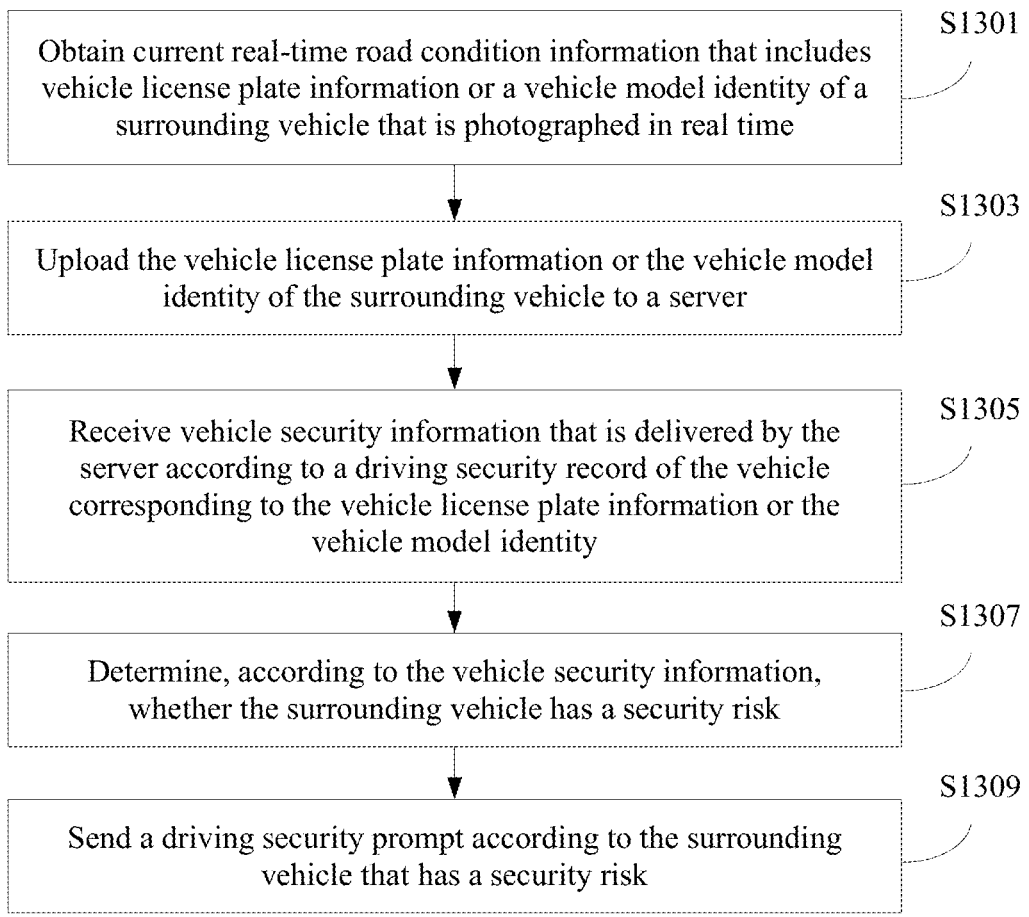
FIG. 13 is a schematic flowchart of a road condition information prompting method according to an embodiment of the present invention.

FIG. 13 is a schematic flowchart of a road condition information prompting method according to an embodiment of the present invention. The method is executed by a road condition information prompting device in this embodiment. The road condition information prompting device may be specifically user equipment such as a smart phone, a tablet computer, an in-vehicle terminal, or a driving recording apparatus. As shown in the figure, the road condition information prompting method in this embodiment includes the following procedure.

S1301. The road condition information prompting device obtains current real-time road condition information that includes vehicle license plate information or a vehicle model identity of a surrounding vehicle that is photographed in real time, and optionally may further include other static information or driving state information of the surrounding vehicle.

S1303. The road condition information prompting device uploads the vehicle license plate information or the vehicle model identity of the surrounding vehicle to a server.

S1305. The road condition information prompting device receives vehicle security information that is delivered by the server according to a driving security record of the vehicle corresponding to the vehicle license plate information or the vehicle model identity.

Specifically, the server may query the driving security record of the vehicle corresponding to the vehicle license plate information or the vehicle model identity. The driving security record may include historical violation information, and historical accident occurrence information or vehicle servicing information of the corresponding vehicle, and may further include a vehicle performance defect, an accident occurrence rate, a potential trouble of design, and the like of a corresponding model. Specifically, the server may obtain the historical violation information, and the historical accident occurrence information or the vehicle servicing information of the corresponding vehicle according to the vehicle license plate information of the surrounding vehicle that is uploaded by the road condition information prompting device; the server may further obtain, according to the vehicle model identity of the surrounding vehicle that is uploaded by the road condition information prompting device, the vehicle performance defect, the accident occurrence rate, the potential trouble of design, and the like of this type of vehicle by using big data in a vehicle information database.

If the server queries, according to the driving security record of the vehicle corresponding to the vehicle license plate information or the vehicle model identity of the surrounding vehicle that is uploaded by the road condition information prompting device, that there is a security risk, for example, a quantity of violation times of a vehicle during the last year exceeds five times, a quantity of traffic accident occurrence times exceeds four times, or a vehicle has not been maintained for two years, it may be considered that the vehicle has a security risk, and the server may send vehicle security information of the vehicle to the road condition information prompting device. For another example, if the server queries that the vehicle corresponding to the vehicle model identity of the surrounding vehicle that is uploaded by the road condition information prompting device has a vehicle performance defect, a high accident occurrence rate, and a potential trouble of design, it may also be considered that the vehicle has a security risk, and the server may send vehicle security information of the vehicle to the road condition information prompting device. The vehicle security information may include description information of the foregoing security risks, and may further include security prompt information set by the server for corresponding security risk types.

S1307. The road condition information prompting device determines, according to the vehicle security information, whether the surrounding vehicle has a security risk.

S1309. The road condition information prompting device sends a driving security prompt according to the surrounding vehicle that has a security risk.

In a specific implementation, the road condition information prompting device may prompt a user that a vehicle having a security risk exists around the user, and may further give a driving security suggestion, for example, which vehicles are dangerous vehicles, and the user should keep away from them or overtake them quickly.

The road condition information prompting device in this embodiment can extract vehicle license plate information or a vehicle model identity of a surrounding vehicle according to photographed road condition information, then upload the vehicle license plate information or the vehicle model identity to a server, and obtain, from the server, vehicle security information of a corresponding vehicle or a corresponding model, so as to determine whether the surrounding vehicle has a security risk, and send a driving security prompt according to the surrounding vehicle that has a security risk, thereby improving driving security. In addition, a more convenient and safer vehicle driving environment can be constructed.

Figure 14:
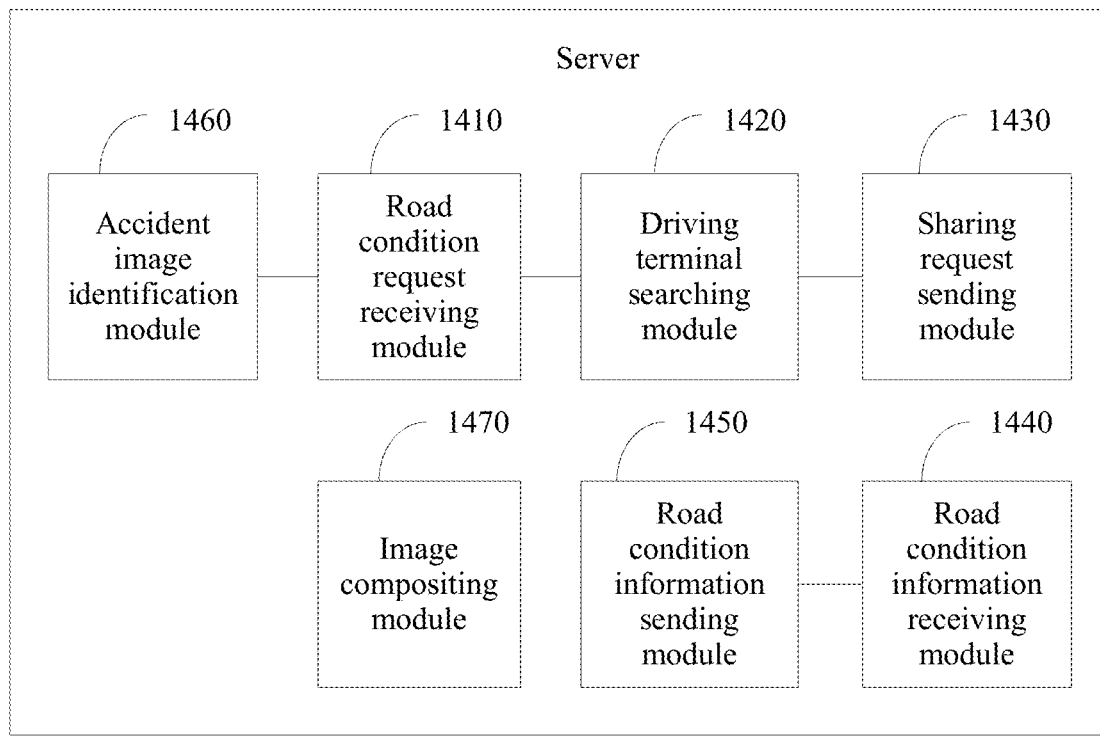
FIG. 14 is a schematic structural diagram of a server according to an embodiment of the present invention.

FIG. 14 is a schematic structural diagram of a server according to an embodiment of the present invention. As shown in the figure, the server in the present invention may include at least a road condition request receiving module 1410, a driving terminal searching module 1420, and a sharing request sending module 1430.

The road condition request receiving module 1410 is configured to receive a road condition information request sent by a first terminal, where the road condition information request carries a road condition position of concern.

Specifically, the road condition position of concern may include a geographical position or a road section that is specified by the first terminal. In an optional embodiment, the road condition information request sent by the first terminal to the server may further carry a time point of concern. The time point of concern may be an instant time at which the first terminal sends the road condition information request (that the time point of concern is the instant time may be indicated by carrying the time for sending the road condition information request, or by using an instant time identifier, or by default), or may be any previous time point that is specified by the first terminal according to a requirement (for example, the specified time point is a time point of 5 minutes earlier, or the specified time point is 14:25:00 on that day).

The driving terminal searching module 1420 is configured to determine a second terminal according to the road condition position of concern, where the second terminal has a road condition recording capability, and a distance between the second terminal and the road condition position of concern is less than a preset threshold.

The second terminal corresponding to the road condition position of concern may be a second terminal that is currently located near the road condition position of concern, or a second terminal that arrived near the road condition position of concern. Specifically, after the server receives the road condition information request sent by the first terminal, the driving terminal searching module 1420 obtains the second terminal near the road condition position of concern according to the road condition position of concern carried in the road condition information request, for example, searches, according to the position information that is reported by second terminals and obtained in advance, for a second terminal that is currently located in a preset area around the road condition position of concern or located on a road section on which the road condition position of concern is located. In a specific implementation, the driving terminal searching module 1420 may use a second terminal in a geometric geographical region that is determined according to the road condition position of concern as the second terminal. The geometric geographical region may be circular or rectangular, for example, may be a circular region that uses the road condition position of concern as a center and has a specified radius or a rectangular region that is of a specified size and uses the road condition position of concern as a center; or a strip-shaped region determined according to a road direction, for example, a strip-shaped region that is of a specified length and starts from the road condition position of concern in a direction of a road on which the road condition position of concern is located.

In an optional embodiment, if the road condition information request carries the time point of concern, the driving terminal searching module 1420 may obtain a second terminal that is located near the road condition position of concern at the time point of concern. In a specific implementation, the driving terminal searching module 1420 may search, according to the position information reported by the second terminals and corresponding reporting time points that are obtained in advance, for a second terminal that is located in a preset area around the specified geographical position or located on the specified road section at the time point of concern.

Figure 15:
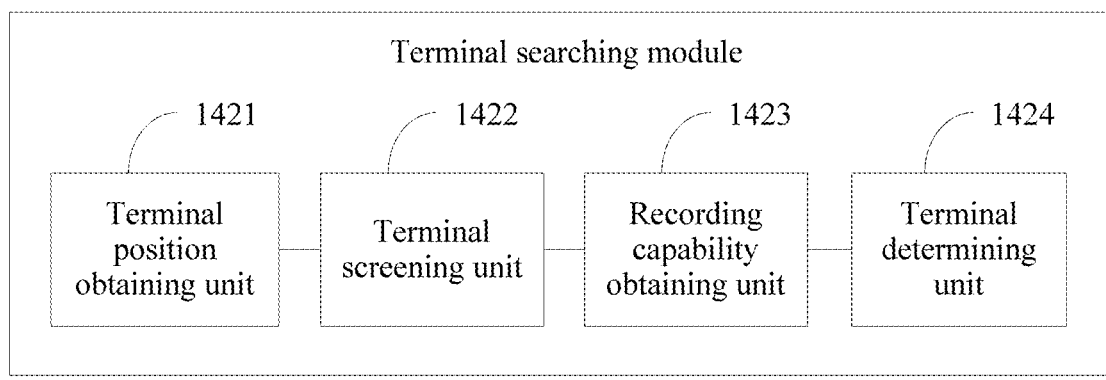
FIG. 15 is a schematic structural diagram of a driving terminal searching module in a server according to an embodiment of the present invention.

In an optional embodiment, as shown in FIG. 15, the driving terminal searching module 1420 may further include a terminal position searching unit 1421, a confidence obtaining unit 1422, and a target terminal determining unit 1423.

The terminal position obtaining unit 1421 is configured to obtain position information reported by all terminals within a preset time period.

The preset time period may be a time period of a preset duration before a current time point, for example, 5 to 30 minutes. Alternatively, a time period before or after, or before and after the time point of concern may be determined according to the time point of concern that is carried in the road condition information request. For example, the time point of concern is 17:00, and the preset time period may be 16:55 to 17:05. The terminal position obtaining unit 1421 may obtain, according to reporting time points for reporting the position information by all the terminals, the position information reported by all the terminals within the preset time period.

The terminal screening unit 1422 is configured to screen the reported position information to determine third terminals, where distances between the third terminals and the road condition position of concern are less than a preset distance. The position information of all the terminals that report positions is compared with the road condition position of concern, and if a distance between a terminal and the road condition position of concern is less than the preset distance, the terminal is determined as a third terminal, and the third terminal has a road condition recording capability.

The recording capability obtaining unit 1423 is configured to determine road condition recording capabilities of the third terminals.

The road condition recording capability is determined according to a spatial relationship between a road condition recording position of each terminal and the road condition position of concern, and hardware information or credit information of the terminal. For example, when a road condition recording position of the third terminal is closer to the road condition position of concern, or a road condition recording position of the third terminal at the time point of concern is closer to the road condition position of concern, a road condition recording capability of the third terminal is higher; or better hardware performance of the third terminal, for example, a larger quantity of pixels or higher photographing definition of a camera, indicates a higher road condition recording capability of the third terminal. The credit information of the third terminal may be obtained according to a record of using or adopting road condition information collected by the third terminal and a record of receiving complaints and reporting errors. For example, the credit information includes a credit value or a credit level, and a larger quantity of times of using or adopting the road condition information collected by the third terminal indicates a larger credit value or a higher credit level of the third terminal, and accordingly indicates a higher road condition recording capability of the third terminal; on the contrary, a larger quantity of times of complaining about the road condition information collected by the third terminal or a larger quantity of times that the road condition information collected by the third terminal is incorrect indicates a smaller credit value or a lower credit level of the third terminal, and accordingly indicates a lower road condition recording capability of the third terminal.

The terminal determining unit 1424 is configured to determine a third terminal whose road condition recording capability meets a preset criterion as the second terminal. In an optional embodiment, the terminal determining unit 1424 may further determine a third terminal with a higher road condition recording capability as the second terminal.

The sharing request sending module 1430 is configured to send a road condition sharing request to the second terminal, so that the second terminal sends road condition information corresponding to the road condition position of concern to the first terminal.

In an optional embodiment, the road condition sharing request sent by the sharing request sending module 1430 to the second terminal may carry the road condition position of concern or the time point of concern, so as to instruct the second terminal to send road condition information corresponding to the road condition position of concern to the first terminal or send road condition information corresponding to the road condition position of concern at the time point of concern to the first terminal. If the road condition sharing request does not carry the road condition position of concern or the time point of concern, the road condition sharing request may instruct the second terminal to send road condition information that is obtained at a current moment or road condition information that is obtained within a recent time period (for example, last 10 seconds, 30 seconds, or one minute) to the first terminal. Because the server may determine that the second terminal is located near the road condition position of concern, the road condition information obtained by the second terminal at the current moment or within the recent time period is road condition information corresponding to the road condition position of concern.

In an optional embodiment, the road condition sharing request sent by the sharing request sending module 1430 to the second terminal may carry a terminal identifier of the first terminal. The terminal identifier of the first terminal may be a communication identifier that is used to identify the first terminal and used to send data to the first terminal, so that the second terminal sends the road condition information corresponding to the road condition position of concern to the first terminal according to the terminal identifier of the first terminal.

Further, the sharing request sending module 1430 is specifically configured to submit the road condition sharing request to a network base station, where the road condition sharing request carries a terminal identifier of the second terminal and the terminal identifier of the first terminal, so that the network base station sends the road condition sharing request to the second terminal, and the network base station obtains the road condition information that is corresponding to the road condition position of concern and submitted by the second terminal according to the road condition sharing request, and sends, to the first terminal, the road condition information that is corresponding to the road condition position of concern and submitted by the second terminal. That is, both communication between the server and the second terminal and communication between the second terminal and the first terminal may be completed after forwarding by the network base station. The network base station may be a communications base station in a communications cell to which the server belongs, or may be a communications base station in a communications cell to which the second terminal belongs.

In another optional embodiment, the server may further include:

a road condition information receiving module 1440, configured to receive the road condition information that is corresponding to the road condition position of concern and submitted by the second terminal; and a road condition information sending module 1450, configured to send the road condition information corresponding to the road condition position of concern to the first terminal.

Further, in an optional embodiment, if the road condition information corresponding to the road condition position of concern includes a road condition photographing position, the server may further include:

an accident image identification module 1460, configured to identify a driving accident image from the road condition information corresponding to the road condition position of concern.

The road condition information sending module 1450 is configured to send road condition information corresponding to the driving accident image to the first terminal when a photographing position corresponding to the driving accident image matches the road condition position of concern.

The road condition information corresponding to the driving accident image may include only the driving accident image, or may be road condition information obtained in a preset duration before or after a photographing time point of the driving accident image, or may be road condition information that is photographed in a preset area around a photographing position of the driving accident image or photographed on a road section on which a photographing position of the driving accident image is located.

Further, optionally, the road condition information request may further carry the time point of concern, and the road condition information corresponding to the road condition position of concern further includes a road condition photographing time.

The road condition information sending module 1450 is configured to send the road condition information corresponding to the driving accident image to the first terminal when the photographing position corresponding to the driving accident image matches the road condition position of concern and a photographing time corresponding to the driving accident image matches the time point of concern.

Further, in an optional embodiment, the server may further include:

an image compositing module 1470, configured to perform, according to a spatial relationship of road condition recording positions of the second terminals, image compositing on road condition information that is corresponding to the road condition position of concern and submitted by at least one second terminal.

The road condition information sending module 1450 is configured to send, to the first terminal, the road condition information that is corresponding to the road condition position of concern and on which image compositing is performed.

Further, in an optional embodiment, the sharing request sending module 1430 is configured to:

submit the road condition sharing request to a network base station, where the road condition sharing request carries a terminal identifier of the second terminal, so that the network base station sends the road condition sharing request to the second terminal.

Further, in an optional embodiment, the road condition information receiving module 1440 is configured to:

obtain, from the network base station, the road condition information that is corresponding to the road condition position of concern and submitted by the second terminal.

That is, communication between the server and the second terminal may be completed after forwarding by the network base station. The network base station may be a communications base station in a communications cell to which the server belongs, or may be a communications base station in a communications cell to which the second terminal belongs.

In this embodiment of the present invention, a server may send a road condition sharing request to a second terminal corresponding to a road condition position of concern according to a road condition information request of a first terminal, so that the first terminal can obtain road condition information corresponding to the road condition position of concern from the second terminal. In this way, a user can obtain road condition information recorded by another second terminal, and the user can obtain more comprehensive road condition information.

Figure 16:
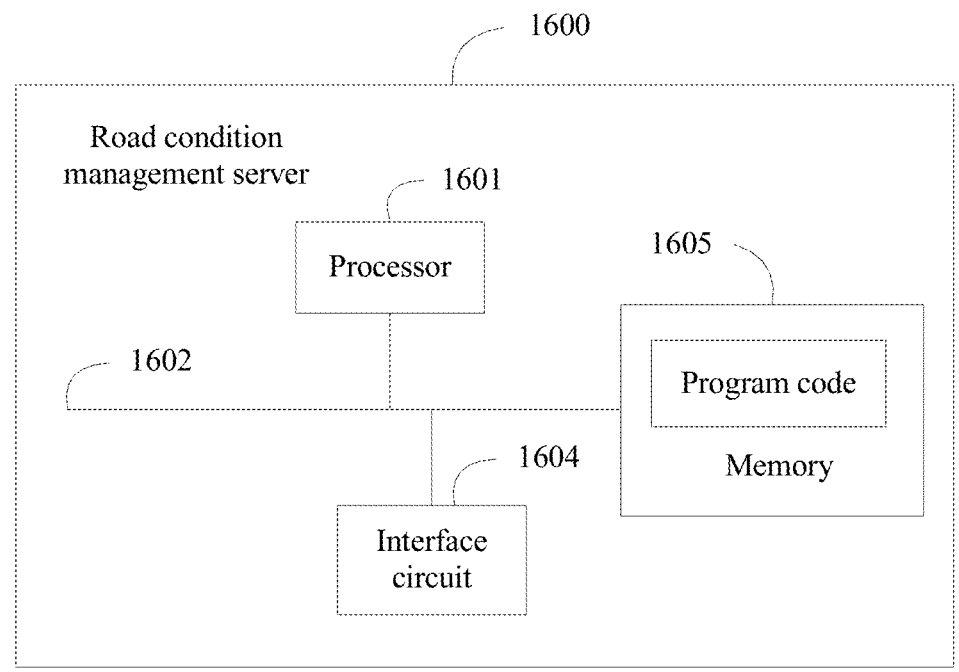
FIG. 16 is a schematic structural diagram of a server according to another embodiment of the present invention.

FIG. 16 is a schematic structural diagram of a server according to another embodiment of the present invention. As shown in FIG. 16, the server 1600 in this embodiment may include: a processor 1601 and an interface circuit 1604. FIG. 16 further shows a memory 1605 and a bus 1602. The processor 1601, the interface circuit 1604, and the memory 1605 are connected and communicate with each other by using the bus 1602.

It should be noted that the processor 1601 herein may be one processing element or may be a collective term of multiple processing elements. For example, the processing element may be a central processing unit (Central Processing Unit, CPU), or an application specific integrated circuit (Application Specific Integrated Circuit, ASIC), or may be configured as one or more integrated circuits implementing this embodiment of the present invention, for example, one or more microprocessors (digital signal processors, DSPs) or one or more field programmable gate arrays (Field Programmable Gate Arrays, FPGAs).

The interface circuit 1604 may include a wireless transmitter/receiver, or may include a wired interface unit such as an optical fiber or cable interface. The interface circuit 1604 of the server in this embodiment is configured to communicate with or connect to a first terminal and a second terminal, and may be further configured to communicate with a network base station.

The memory 1605 may be one storage apparatus or may be a collective term of multiple storage elements, and is configured to store executable program code or a parameter, data, and the like that are required for running an access network management device. In addition, the memory 1605 may include a random access memory (RAM), and may further include a non-volatile memory, for example, a disk memory and a flash memory (Flash).

The bus 1602 may be an industry standard architecture (ISA) bus, a peripheral component interconnect PCI) bus, or an extended industry standard architecture (EISA) bus, or the like. The bus 1602 may be categorized into an address bus, a data bus, a control bus, and the like. For ease of representation, only one line is used in FIG. 16 for representation, but it does not mean that there is only one bus or one type of bus.

Optionally, the server may further include an input/output apparatus. The input/output apparatus is connected to the bus 1602, so as to connect to another component such as the processor 1601 by using the bus 1602. The input/output apparatus may provide an input interface for an operation staff, so that the operation staff enters an instruction by using the input interface. In addition, the input/output apparatus may further provide an output interface to display related information or an operation result to the operation staff.

The processor 1601 may be configured to invoke the program code in the memory 1605 to perform the following operations:

receiving, by using the interface circuit 1604, a road condition information request sent by the first terminal, where the road condition information request carries a road condition position of concern;

determining a second terminal according to the road condition position of concern, where the second terminal has a road condition recording capability, and a distance between the second terminal and the road condition position of concern is less than a preset threshold; and sending a road condition sharing request to the second terminal by using the interface circuit 1604, so that the second terminal shares a road condition according to the road condition position of concern.

Optionally, after sending the road condition sharing request to the second terminal by using the interface circuit 1604, the processor 1601 may further invoke the program code in the memory 1605 to perform the following operations:

receiving, by using the interface circuit 1604, road condition information that is corresponding to the road condition position of concern and submitted by the second terminal; and sending the road condition information corresponding to the road condition position of concern to the first terminal by using the interface circuit 1604.

Optionally, the road condition information corresponding to the road condition position of concern includes a road condition photographing position.

After receiving, by using the interface circuit 1604, the road condition information that is corresponding to the road condition position of concern and submitted by the second terminal according to the road condition sharing request, the processor 1601 may further invoke the program code in the memory 1605 to perform the following operations:

identifying a driving accident image from the road condition information corresponding to the road condition position of concern; and sending, by using the interface circuit 1604, road condition information corresponding to the driving accident image to the first terminal if a photographing position corresponding to the driving accident image matches the road condition position of concern.

Further, optionally, the road condition information request further carries a time point of concern;

the road condition information corresponding to the road condition position of concern further includes a road condition photographing time; and after identifying the driving accident image from the road condition information corresponding to the road condition position of concern, the processor 1601 may further invoke the program code in the memory 1605 to perform the following operation:

sending, by using the interface circuit 1604, the road condition information corresponding to the driving accident image to the first terminal if the photographing position corresponding to the driving accident image matches the road condition position of concern and a photographing time corresponding to the driving accident image matches the time point of concern.

In an optional embodiment, the determining a second terminal according to the road condition position of concern may specifically include:

obtaining position information reported by all terminals within a preset time period;

screening the reported position information to determine third terminals, where distances between the third terminals and the road condition position of concern are less than a preset distance;

determining road condition recording capabilities of the third terminals; and determining a third terminal whose road condition recording capability meets a preset criterion as the second terminal.

Further, optionally, before sending the road condition information corresponding to the road condition position of concern to the first terminal by using the interface circuit 1604, the processor 1601 may further invoke the program code in the memory 1605 to perform the following operation:

performing, according to a spatial relationship of road condition recording positions of second terminals, image compositing on road condition information that is corresponding to the road condition position of concern and submitted by at least one second terminal; and the sending the road condition information corresponding to the road condition position of concern to the first terminal by using the interface circuit 1604 includes: sending, to the first terminal, the road condition information that is corresponding to the road condition position of concern and on which image compositing is performed.

In this embodiment of the present invention, a server may send a road condition sharing request to a second terminal corresponding to a road condition position of concern according to a road condition information request of a first terminal, so that the first terminal can obtain road condition information corresponding to the road condition position of concern from the second terminal. In this way, a user can obtain road condition information recorded by another second terminal, and the user can obtain more comprehensive road condition information.

Figure 17:
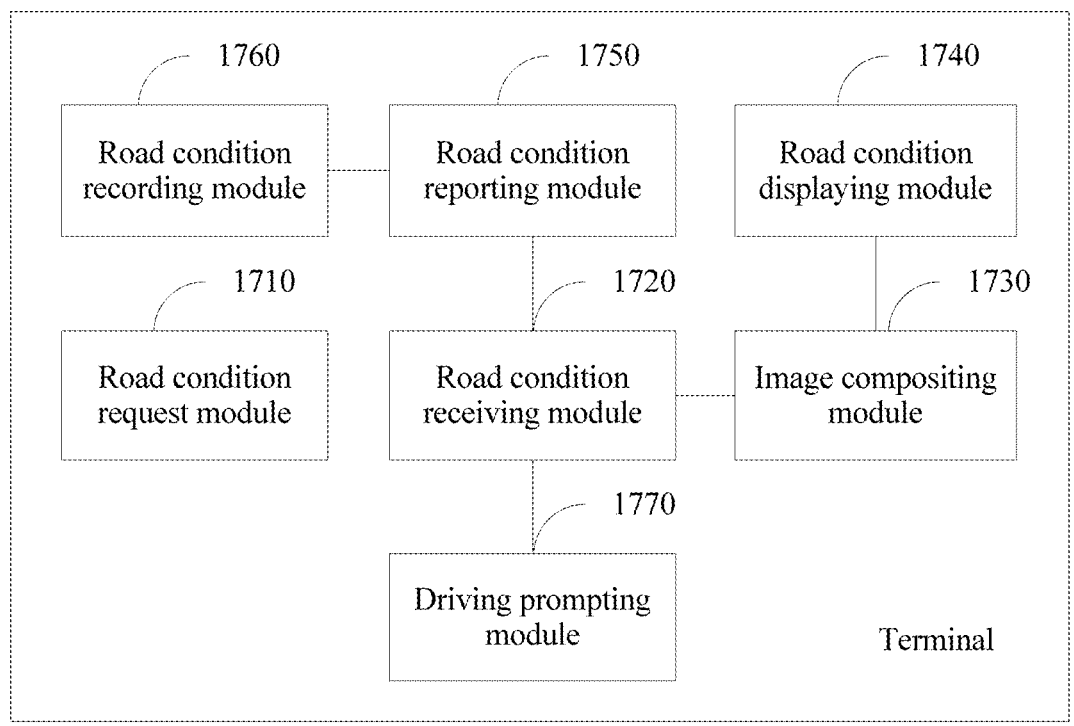
FIG. 17 is a schematic structural diagram of a terminal (a first terminal) according to an embodiment of the present invention.

FIG. 17 is a schematic structural diagram of a terminal according to an embodiment of the present invention. The terminal in this embodiment may be the first terminal mentioned in the foregoing embodiment, for example, a smart phone, a tablet computer, an intelligent wearable device, an e-reader, or an in-vehicle terminal. In an optional embodiment, the terminal may be a road condition recording terminal having a road condition recording capability. As shown in the figure, the terminal in this embodiment of the present invention may include a road condition request module 1710 and a road condition receiving module 1720.

The road condition request module 1710 is configured to send a road condition information request to a server, where the road condition information request carries a road condition position of concern, so that the server determines a second terminal according to the road condition position of concern, and sends a road condition sharing request to the second terminal, where the second terminal has a road condition recording capability, and a distance between the second terminal and the road condition position of concern is less than a preset threshold.

Specifically, the road condition position of concern may include a geographical position or a road section that is specified by the first terminal. The first terminal may set the road condition position of concern in the optional implementation manners mentioned in S202 in the foregoing embodiment, and details are not described herein. In an optional embodiment, the road condition information request sent by the first terminal to the server may further carry a time point of concern.

The road condition receiving module 1720 is configured to receive road condition information that is corresponding to the road condition position of concern and sent by the second terminal according to the road condition sharing request.

In an optional embodiment, the road condition information corresponding to the road condition position of concern may be directly sent by the second terminal to the first terminal according to a terminal identifier of the first terminal.

In another optional embodiment, the road condition receiving module 1720 is specifically configured to:

receive the road condition information that is corresponding to the second terminal in the road condition position of concern and sent by the server, where the road condition information corresponding to the road condition position of concern is submitted by the second terminal to the server according to the road condition sharing request.

In another optional embodiment, the road condition receiving module 1720 is specifically configured to:

receive the road condition information that is corresponding to the second terminal in the road condition position of concern and sent by a network base station, where the road condition information corresponding to the road condition position of concern is submitted by the second terminal to the network base station according to the road condition sharing request.

Optionally, the terminal in this embodiment of the present invention further includes:

an image compositing module 1730, configured to perform, according to a spatial relationship of road condition recording positions of second terminals, image compositing on road condition information that is corresponding to the road condition position of concern and sent by at least one second terminal; and a road condition displaying module 1740, configured to display the road condition information that is corresponding to the road condition position of concern and on which image compositing is performed.

Further, optionally, the road condition information that is corresponding to the road condition position of concern and sent by the second terminal carries the road condition recording capability of the second terminal, and the road condition recording capability is determined according to a spatial relationship between a road condition recording position of the second terminal and the road condition position of concern, and hardware information or credit information of the second terminal.

The road condition displaying module 1740 is specifically configured to display the road condition information corresponding to the road condition position of concern according to the road condition recording capability of the second terminal. For example, road condition information obtained by a second terminal with a higher road condition recording capability is preferably displayed.

Optionally, the terminal in this embodiment of the present invention further includes:

a road condition reporting module 1750, configured to report, to an accident assessment server, the road condition information that is corresponding to the road condition position of concern and sent by the second terminal, so that the accident assessment server performs accident assessment according to the road condition information corresponding to the second terminal in the road condition position of concern.

Further, optionally, the terminal in this embodiment of the present invention further includes:

a road condition recording module 1760, configured to photograph road condition information.

The road condition reporting module 1750 is specifically configured to report, to the accident assessment server, the road condition information that is corresponding to the road condition position of concern and sent by the second terminal and the road condition information that is photographed by the road condition recording module in the road condition position of concern, so that the accident assessment server performs accident assessment according to the road condition information that is corresponding to the terminal and the second terminal in the road condition position of concern.

Optionally, the road condition information corresponding to the road condition position of concern is real-time road condition information that is currently recorded by the second terminal.

The terminal may further include:

a driving prompting module 1770, configured to send a driving security prompt according to the real-time road condition information sent by the second terminal.

Specifically, the real-time road condition information includes static information or driving state information of a surrounding vehicle that is photographed by the second terminal in real time.

The driving prompting module 1770 is specifically configured to:

determine, according to the static information or the driving state information of the surrounding vehicle that is photographed by the second terminal, whether the surrounding vehicle has a security risk; and if the surrounding vehicle has a security risk, send the driving security prompt according to the surrounding vehicle that has a security risk.

In this embodiment, a terminal sends a road condition information request to a server, and the server sends a road condition sharing request to a second terminal corresponding to a road condition position of concern of the terminal, so that the terminal can obtain road condition information corresponding to the road condition position of concern from the second terminal. In this way, road condition information recorded by another second terminal can be obtained, and a user can obtain more comprehensive road condition information.

Figure 18:
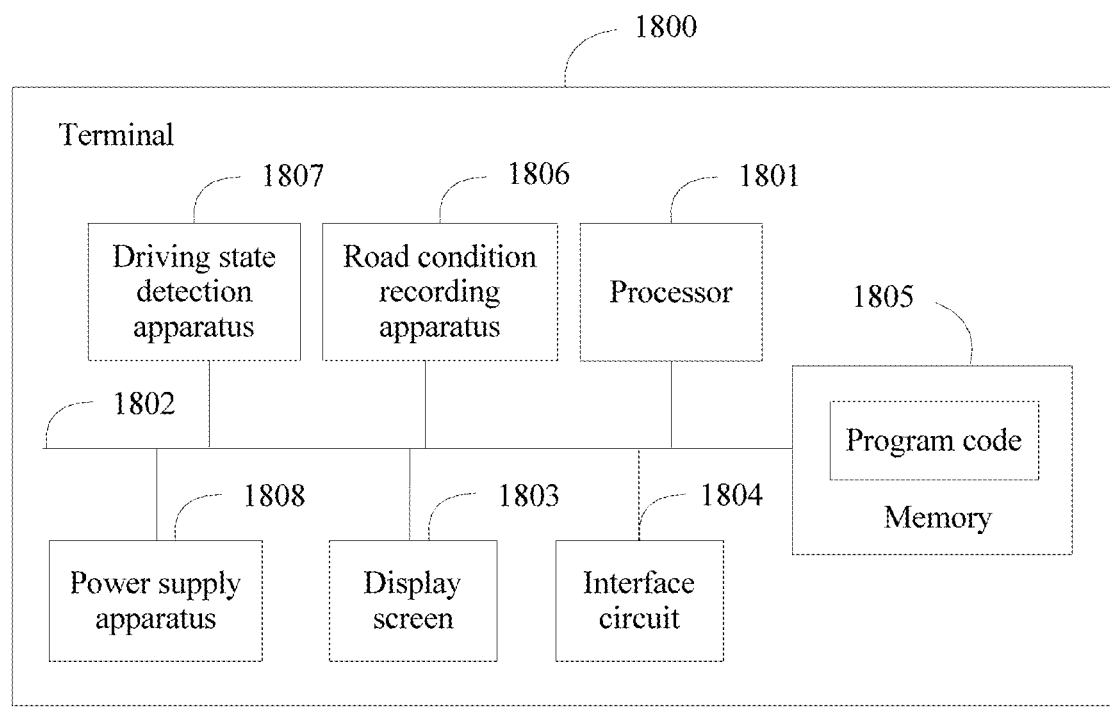
FIG. 18 is a schematic structural diagram of a terminal (a first terminal) according to another embodiment of the present invention.

FIG. 18 is a schematic structural diagram of a terminal according to another embodiment of the present invention. As shown in FIG. 18, the terminal 1800 in this embodiment may include: a processor 1801 and an interface circuit 1804. FIG. 18 further shows a memory 1805 and a bus 1802. The processor 1801, the interface circuit 1804, and the memory 1805 are connected and communicate with each other by using the bus 1802.

It should be noted that the processor 1801 herein may be one processing element or may be a collective term of multiple processing elements. For example, the processing element may be a central processing unit, or an application specific integrated circuit, or may be configured as one or more integrated circuits implementing this embodiment of the present invention, for example, one or more microprocessors or one or more field programmable gate arrays.

The interface circuit 1804 may include a wireless transmitter/receiver, or may include a wired interface unit such as an optical fiber or cable interface. The interface circuit 1804 of the terminal 1800 in this embodiment is configured to communicate with or connect to a second terminal and a server, and may be further configured to communicate with a network base station.

The memory 1805 may be one storage apparatus or may be a collective term of multiple storage elements, and is configured to store executable program code or a parameter, data, and the like that are required for running an access network management device. The memory 1805 may include a random access memory, and may further include a non-volatile memory, for example, a disk memory and a flash memory.

The bus 1802 may be an industry standard architecture bus, a peripheral component interconnect bus, or an extended industry standard architecture bus, or the like. The bus 1802 may be categorized into an address bus, a data bus, a control bus, and the like. For ease of representation, only one line is used in FIG. 18 for representation, but it does not mean that there is only one bus or one type of bus.

Optionally, the terminal 1800 in this embodiment of the present invention may further include:

a display screen 1803, configured to display road condition information corresponding to a road condition position of concern that is obtained from the second terminal;

a road condition recording apparatus 1806, configured to photograph and record road condition information, where in an optional embodiment, the road condition recording apparatus 1806 may further be connected to an in-vehicle second terminal, to obtain road condition information photographed by the in-vehicle second terminal;

a driving state detection apparatus 1807, including, for example, a speed sensor, a GPS positioning module, and configured to obtain a driving state such as a driving speed and a driving position in real time;

a power supply apparatus 1808, connected to the bus 1802 and configured to supply power to the foregoing components by using the bus.

Optionally, the terminal 1800 may further include an input/output apparatus. The input/output apparatus is connected to the bus 1802, so as to connect to another component such as the processor 1801 by using the bus 1802. In an example, a GUI operation/display panel may be provided to display a vehicle operation state, a device state, an environment in which a self-driving car is located, a user operation interface, and an operation result. The panel may be a touchscreen that is configured to receive a user touch operation and convert the user touch operation into a user operation instruction.

The processor 1801 may be configured to invoke the program code in the memory 1805 to perform the following operations:

sending a road condition information request to the server by using the interface circuit 1804, where the road condition information request carries a road condition position of concern, so that the server determines a second terminal according to the road condition position of concern, and sends a road condition sharing request to the second terminal, where the second terminal has a road condition recording capability, and a distance between the second terminal and the road condition position of concern is less than a preset threshold; and receiving, by using the interface circuit 1804, road condition information that is corresponding to the road condition position of concern and sent by the second terminal according to the road condition sharing request.

Optionally, the receiving, by using the interface circuit 1804, road condition information that is corresponding to the road condition position of concern and sent by the second terminal according to the road condition sharing request includes:

receiving, by using the interface circuit 1804, the road condition information that is corresponding to the second terminal in the road condition position of concern and sent by the server, where the road condition information corresponding to the road condition position of concern is submitted by the second terminal to the server according to the road condition sharing request.

In another optional manner, the receiving, by using the interface circuit 1804, road condition information that is corresponding to the road condition position of concern and sent by the second terminal according to the road condition sharing request includes:

receiving, by using the interface circuit 1804, the road condition information that is corresponding to the second terminal in the road condition position of concern and sent by the network base station, where the road condition information corresponding to the road condition position of concern is submitted by the second terminal to the network base station according to the road condition sharing request.

Optionally, the processor 1801 may further invoke the program code in the memory 1805 to perform the following operations:

performing, according to a spatial relationship of road condition recording positions of second terminals, image compositing on road condition information that is corresponding to the road condition position of concern and sent by at least one second terminal; and displaying, by using the display screen 1803, the road condition information that is corresponding to the road condition position of concern and on which image compositing is performed.

Optionally, the road condition information that is corresponding to the road condition position of concern and sent by the second terminal carries the road condition recording capability of the second terminal, and the road condition recording capability is determined according to a spatial relationship between a road condition recording position of the second terminal and the road condition position of concern, and hardware information or credit information of the second terminal.

The processor 1801 may further invoke the program code in the memory 1805 to perform the following operation:

displaying the road condition information corresponding to the road condition position of concern according to the road condition recording capability of the second terminal by using the display screen 1803.

Optionally, the processor 1801 may further invoke the program code in the memory 1805 to perform the following operations:

reporting, to an accident assessment server by using the interface circuit 1804, the road condition information that is corresponding to the road condition position of concern and sent by the second terminal, so that the accident assessment server performs accident assessment according to the road condition information corresponding to the second terminal in the road condition position of concern; and when reporting, to the accident assessment server by using the interface circuit 1804, the road condition information that is corresponding to the accident occurrence position and sent by the second terminal, reporting, to the accident assessment server by using the interface circuit 1804, road condition information that is photographed by the terminal 1800 in the road condition position of concern, so that the accident assessment server performs accident assessment according to the road condition information that is corresponding to the terminal 1800 and the second terminal in the road condition position of concern.

Optionally, the road condition information corresponding to the road condition position of concern is real-time road condition information that is currently recorded by the second terminal.

After the receiving, by using the interface circuit 1804, road condition information that is corresponding to the road condition position of concern and sent by the second terminal according to the road condition sharing request, the following operation is included:

sending a driving security prompt according to the real-time road condition information sent by the second terminal.

Specifically, the real-time road condition information includes static information or driving state information of a surrounding vehicle that is photographed by the second terminal in real time.

The sending a driving security prompt according to the real-time road condition information sent by the second terminal includes:

determining, according to the static information or the driving state information of the surrounding vehicle that is photographed by the second terminal, whether the surrounding vehicle has a security risk; and if the surrounding vehicle has a security risk, sending the driving security prompt according to the surrounding vehicle that has a security risk.

In this embodiment, a terminal sends a road condition information request to a server, and the server sends a road condition sharing request to a second terminal corresponding to a road condition position of concern of the terminal, so that the terminal can obtain road condition information corresponding to the road condition position of concern from the second terminal. In this way, road condition information recorded by another second terminal can be obtained, and a user can obtain more comprehensive road condition information.

Figure 19:
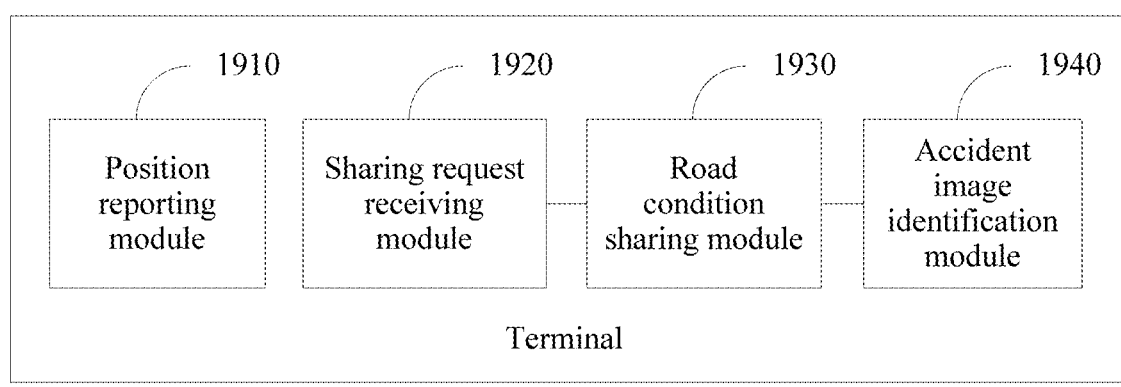
FIG. 19 is a schematic structural diagram of a terminal (a second terminal) according to an embodiment of the present invention.

FIG. 19 is a schematic structural diagram of a terminal according to an embodiment of the present invention. The terminal in this embodiment may be the second terminal mentioned in the foregoing embodiment, and has a road condition recording capability; may be a terminal device that can photograph and record road condition information by using a camera or a driving recording apparatus, and may be disposed on a vehicle or worn by a pedestrian; or may be a road infrastructure surveillance camera, for example, a monitor installed at an intersection or a speed testing monitor. The terminal in this embodiment is directly referred to as a second terminal in the following description. As shown in the figure, the second terminal in this embodiment may include a position reporting module 1910, a sharing request receiving module 1920, and a road condition sharing module 1930.

The position reporting module 1910 is configured to report position information to a server.

In this embodiment, a positioning apparatus may be built in the second terminal, and the second terminal reports position information obtained by using the built-in positioning apparatus to the server at a specific time interval, so that the server can learn of a current position of the second terminal or a position of the second terminal at a specific time point.

It should be noted that in an optional embodiment, the position reporting module 1910 may be omitted by default. For example, if the second terminal is a road infrastructure surveillance camera whose position is relatively fixed, the position of the second terminal may be registered with the server in advance.

The sharing request receiving module 1920 is configured to receive a road condition sharing request sent by the server according to the position information, where the road condition sharing request carries a specified road condition position of concern, and may further carry a specified time point of concern.

The road condition sharing module 1930 is configured to share a road condition according to the road condition position of concern.

In an optional embodiment, the road condition sharing request further carries a terminal identifier of the first terminal.

The road condition sharing module 1930 is configured to send road condition information corresponding to the road condition position of concern to the first terminal according to the terminal identifier of the first terminal.

Further, in an optional embodiment, the road condition sharing module 1930 is specifically configured to submit a road driving condition corresponding to the position of concern to a network base station, where the road driving condition carries the terminal identifier of the first terminal, so that the network base station sends the road driving condition corresponding to the position of concern to the first terminal.

In an optional embodiment, if the road condition information corresponding to the road condition position of concern includes a road condition photographing position, the terminal further includes:

an accident image identification module 1940, configured to identify a driving accident image from the road condition information corresponding to the road condition position of concern.

The road condition sharing module 1930 is configured to send road condition information corresponding to the driving accident image to the first terminal according to the terminal identifier of the first terminal when a photographing position corresponding to the driving accident image matches the road condition position of concern.

Further, optionally, the road condition sharing request further carries the time point of concern; and The road condition sharing module 1930 is specifically configured to send the road condition information corresponding to the driving accident image to the first terminal according to the terminal identifier of the first terminal when the photographing position corresponding to the driving accident image matches the road condition position of concern and a photographing time corresponding to the driving accident image matches the time point of concern.

In an optional embodiment, when sharing the road condition according to the road condition position of concern, the road condition sharing module 1930 is further configured to share the road condition recording capability of the second terminal.

In this embodiment, a second terminal shares a road condition according to a road condition sharing request sent by a server, so that another terminal can obtain road condition information corresponding to a road condition position of concern from the second terminal. In this way, road condition information recorded by another second terminal can be obtained, and a user can obtain more comprehensive road condition information.

Figure 20:
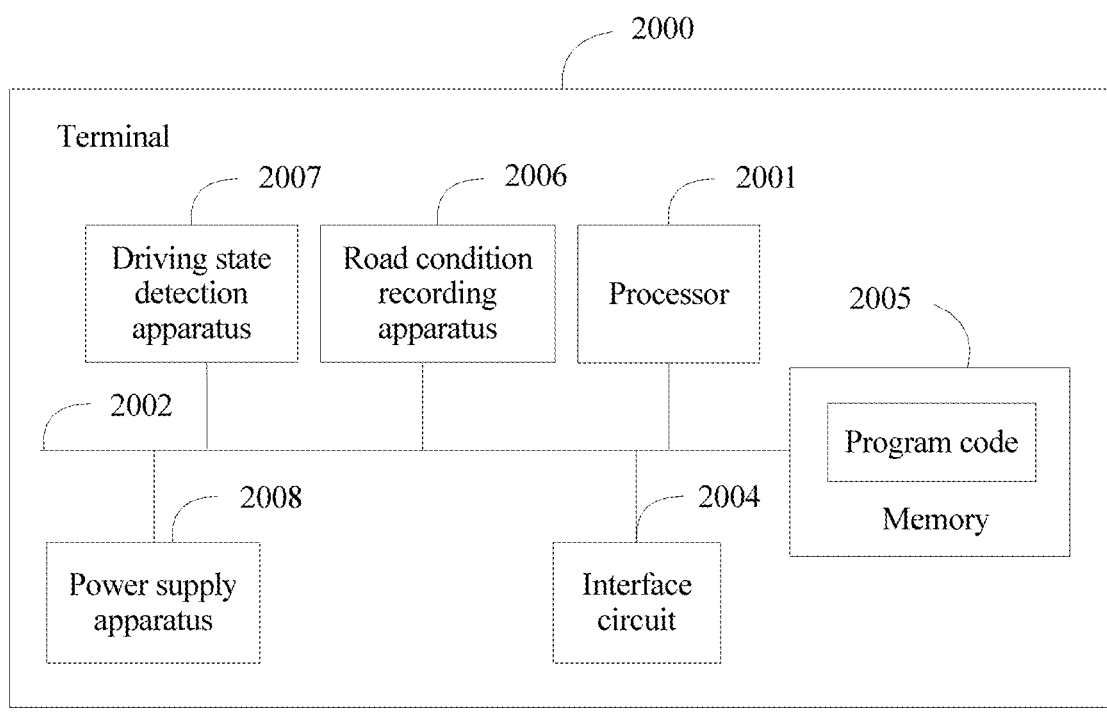
FIG. 20 is a schematic structural diagram of a terminal (a second terminal) according to another embodiment of the present invention.

FIG. 20 is a schematic structural diagram of a terminal according to another embodiment of the present invention. The terminal in this embodiment is also referred to as a second terminal in the following description. As shown in FIG. 20, the terminal 2000 in this embodiment may include: a processor 2001 and an interface circuit 2004. FIG. 18 further shows a memory 2005 and a bus 2002. The processor 2001, the interface circuit 2004, and the memory 2005 are connected and communicate with each other by using the bus 2002.

It should be noted that the processor 2001 herein may be one processing element or may be a collective term of multiple processing elements. For example, the processing element may be a central processing unit, or an application specific integrated circuit, or may be configured as one or more integrated circuits implementing this embodiment of the present invention, for example, one or more microprocessors or one or more field programmable gate arrays.

The interface circuit 2004 may include a wireless transmitter/receiver, or may include a wired interface unit such as an optical fiber or cable interface. The interface circuit 2004 of the terminal 2000 in this embodiment is configured to communicate with or connect to a first terminal and a server, and may be further configured to communicate with a network base station.

The memory 2005 may be one storage apparatus or may be a collective term of multiple storage elements, and is configured to store executable program code or a parameter, data, and the like that are required for running an access network management device. The memory 2005 may include a random access memory, and may further include a non-volatile memory, for example, a disk memory and a flash memory.

The bus 2002 may be an industry standard architecture bus, a peripheral component interconnect bus, or an extended industry standard architecture bus, or the like. The bus 2002 may be categorized into an address bus, a data bus, a control bus, and the like. For ease of representation, only one line is used in FIG. 20 for representation, but it does not mean that there is only one bus or one type of bus.

Optionally, the terminal 2000 in this embodiment of the present invention may further include:

a road condition recording apparatus 2006, configured to photograph and record road condition information, where in an optional embodiment, the road condition recording apparatus 2006 may further be connected to an in-vehicle driving recording terminal, to obtain road condition information photographed by the in-vehicle driving recording terminal;

a driving state detection apparatus 2007, including, for example, a speed sensor, a GPS positioning module, and configured to obtain a driving state such as a driving speed and a driving position in real time;

a power supply apparatus 2008, connected to the bus 2002 and configured to supply power to the foregoing components by using the bus.

Optionally, the terminal 2000 may further include an input/output apparatus. The input/output apparatus is connected to the bus 2002, so as to connect to another component such as the processor 2001 by using the bus 2002. In an example, a GUI operation/display panel may be provided to display a vehicle operation state, a device state, an environment in which a self-driving car is located, a user operation interface, and an operation result. The panel may be a touchscreen that is configured to receive a user touch operation and convert the user touch operation into a user operation instruction.

The processor 2001 may be configured to invoke the program code in the memory 2005 to perform the following operations:

reporting position information to the server by using the interface circuit 2004;

receiving, by using the interface circuit 2004, a road condition sharing request sent by the server according to the position information, where the road condition sharing request carries a specified road condition position of concern; and sharing a road condition according to the road condition position of concern by using the interface circuit 2004.

Optionally, the road condition sharing request further carries a terminal identifier of the first terminal.

The sharing a road condition according to the road condition position of concern by using the interface circuit 2004 includes:

sending road condition information corresponding to the road condition position of concern to the first terminal according to the terminal identifier of the first terminal.

Further, optionally, the sending road condition information corresponding to the road condition position of concern to the first terminal according to the terminal identifier of the first terminal includes:

submitting a road driving condition corresponding to the position of concern to the network base station by using the interface circuit 2004, where the road driving condition carries the terminal identifier of the first terminal, so that the network base station sends the road driving condition corresponding to the position of concern to the first terminal.

Optionally, the road condition information corresponding to the road condition position of concern includes a road condition photographing position.

After receiving, by using the interface circuit 2004, the road condition sharing request sent by the server according to the position information, the processor 2001 may further invoke the program code in the memory 2005 to perform the following operations:

identifying a driving accident image from the road condition information corresponding to the road condition position of concern; and sending, by using the interface circuit 2004, road condition information corresponding to the driving accident image to the first terminal according to the terminal identifier of the first terminal if a photographing position corresponding to the driving accident image matches the road condition position of concern.

Further, optionally, the road condition sharing request further carries a time point of concern.

After receiving, by using the interface circuit 2004, the road condition sharing request sent by the server according to the position information, the processor 2001 may further invoke the program code in the memory 2005 to perform the following operation:

sending, by using the interface circuit 2004, the road condition information corresponding to the driving accident image to the first terminal according to the terminal identifier of the first terminal if the photographing position corresponding to the driving accident image matches the road condition position of concern and a photographing time corresponding to the driving accident image matches the time point of concern.

Further, in an optional embodiment, when sharing a road condition according to the road condition position of concern by using the interface circuit 2004, the second terminal may further share a road condition recording capability of the second terminal.

In this embodiment, a second terminal shares a road condition according to a road condition sharing request sent by a server, so that another terminal can obtain road condition information corresponding to a road condition position of concern from the second terminal. In this way, road condition information recorded by another second terminal can be obtained, and a user can obtain more comprehensive road condition information.

Figure 21:
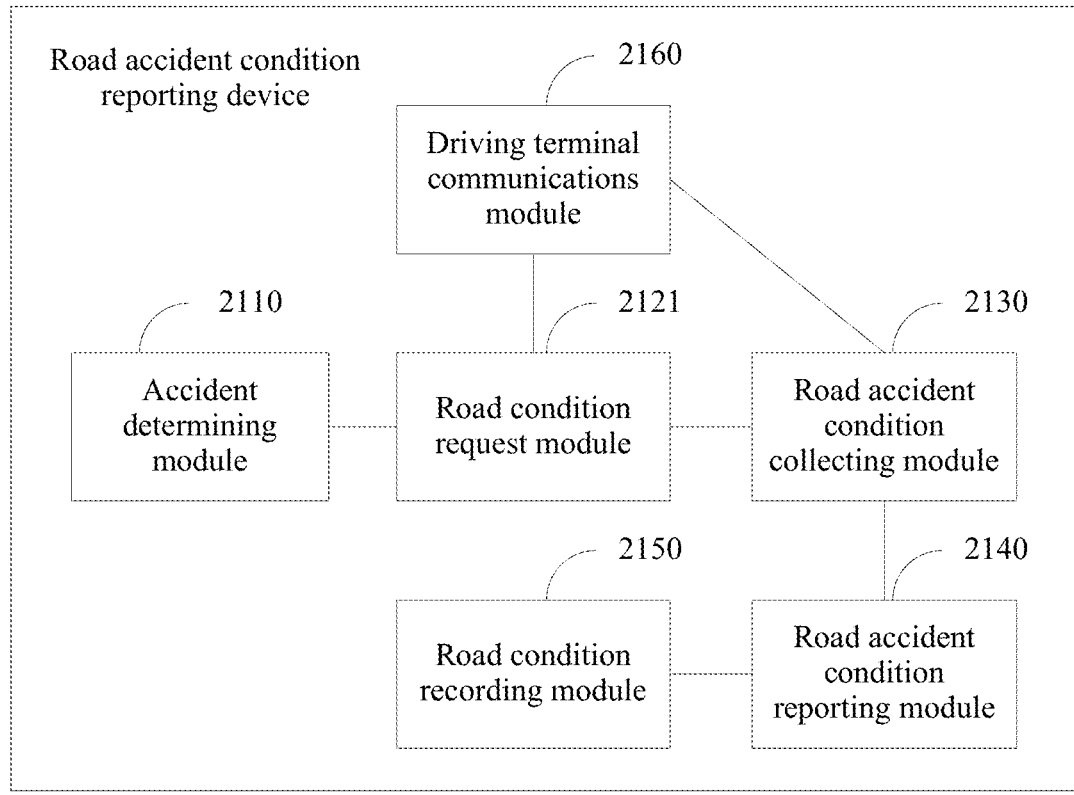
FIG. 21 is a schematic structural diagram of a road accident condition reporting device according to an embodiment of the present invention.

FIG. 21 is a schematic structural diagram of a road accident condition reporting device according to an embodiment of the present invention. The road accident condition reporting device in this embodiment of the present invention may be a user terminal such as a smart phone, a tablet computer, an intelligent wearable device, an e-reader, an in-vehicle terminal, or a second terminal. In an optional embodiment, the road accident condition reporting device may be a server. As shown in FIG. 21, the road accident condition reporting device in this embodiment of the present invention may include an accident determining module 2110, a road condition request module 2121, a road accident condition collecting module 2130, and a road accident condition reporting module 2140.

The accident determining module 2110 is configured to determine an accident occurrence position and an accident occurrence time point.

Specifically, the accident determining module 2110 may determine the accident occurrence position in the following optional implementation manners:

(61) A position that is selected by a user on an electronic map is determined as the accident occurrence position;

(62) A position in which the road accident condition reporting device is currently located is determined as the accident occurrence position;

(63) According to a road on which the road accident condition reporting device is currently located, a position ahead of a current position on the road by a specified distance (for example, 500 meters) is determined as the accident occurrence position.

The accident occurrence time point may be a current instant time determined by a first terminal, or may be any previous time point that is specified by a first terminal according to a requirement (for example, the specified time point is a time point of 5 minutes earlier than a current time, or the specified time point is 14:25:00 on that day).

The road condition request module 2121 is configured to send a road condition information request to a second terminal, where the second terminal has a road condition recording capability, and a distance between the accident occurrence position and the second terminal at the accident occurrence time point is less than a preset threshold.

The road condition information request may carry the accident occurrence time point or the accident occurrence position. If both the accident occurrence time point and the accident occurrence position are omitted by default, it may indicate that road condition information that is obtained currently or recently is requested. Specifically, the road accident condition reporting device may establish a communication connection to the second terminal that is located in a preset area around the accident occurrence position at the accident occurrence time point, and then send the road condition information request to the second terminal. For example, if the road accident condition reporting device is currently located in the accident occurrence position, the road condition request module 2121 may send the road condition information request to a second terminal in a preset surrounding area.

The road accident condition collecting module 2130 is configured to receive road condition information that is corresponding to the accident occurrence position and sent by the second terminal.

In a specific implementation, the second terminal may return, according to the road condition information request sent by the road accident condition reporting device, the road condition information corresponding to the accident occurrence position to the road accident condition reporting device, for example, send the road condition information by using the communication connection established between the road accident condition reporting device and the second terminal, or send, according to a terminal identifier of the road accident condition reporting device that is carried in the road condition information request, the road condition information to the road accident condition reporting device after forwarding by a communications network (for example, a communications base station) or a server.

The road condition information corresponding to the accident occurrence position may be road condition information that is of the accident occurrence position and photographed by the second terminal, or may be road condition information photographed by the second terminal near the accident occurrence position, for example, road condition information photographed by the second terminal in a preset area around the accident occurrence position or on a road section on which the accident occurrence position is located. Specifically, the second terminal may obtain the photographed road condition information of the accident occurrence position according to a photographing position and a photographing angle. The second terminal may obtain, according to a photographing position of the road condition information, the road condition information photographed in the preset area around the accident occurrence position or on the road section on which the accident occurrence position is located.

In an optional embodiment, if the road condition information request does not carry the accident occurrence position or the accident occurrence time point, the second terminal may send road condition information that is obtained at a current moment or road condition information that is obtained within a recent time period (for example, last 10 seconds, 30 seconds, or one minute) to the road accident condition reporting device. In this embodiment, the road accident condition reporting device determines that the second terminal is currently located in a preset area around the accident occurrence position. Therefore, the road condition information photographed by the second terminal at the current moment is road condition information corresponding to the accident occurrence position.

In another optional embodiment, if the road condition information request carries the accident occurrence position or the accident occurrence time point, the second terminal may select, in recorded road condition information, road condition information corresponding to the accident occurrence position or road condition information corresponding to the accident occurrence time point, and send the road condition information to the road accident condition reporting device. The road condition information corresponding to the accident occurrence time point may be road condition information photographed by the road accident condition reporting device at the accident occurrence time point, or may be road condition information photographed by the road accident condition reporting device within a time period before or after the accident occurrence time point, for example, road condition information photographed within a time period of one minute, 30 seconds, or 10 seconds before or after the accident occurrence time. Further, optionally, if road condition information photographed by the second terminal at the accident occurrence time point is not road condition information corresponding to the accident occurrence position, it indicates that the second terminal does not photograph road condition information corresponding to the accident occurrence position at the accident occurrence time point, and may not return road condition information to the road accident condition reporting device.

The road accident condition reporting module 2140 is configured to report, to an accident assessment server, the road condition information that is corresponding to the accident occurrence position and sent by the second terminal, so that the accident assessment server performs accident assessment according to the road condition information corresponding to the accident occurrence position.

The accident assessment server may perform responsibility assessment for a current accident according to the road condition information corresponding to the accident occurrence position, and send an accident assessment result to a vehicle or a terminal related to the accident. In an optional embodiment, the accident assessment server may further send the accident assessment result to an insurance company, and after subsequently completing an electronic insurance book according to the accident assessment result, the insurance company may send the insurance book to the vehicle or the terminal related to the accident.

In an optional embodiment, the road accident condition reporting device may further include:

a road condition recording module 2150, configured to photograph road condition information.

The road accident condition reporting module is configured to report, to the accident assessment server, the road condition information that is corresponding to the accident occurrence position and sent by the second terminal and the road condition information that is corresponding to the accident occurrence position and obtained by the road condition recording module, so that the accident assessment server performs accident assessment according to the road condition information corresponding to the accident occurrence position.

Further, optionally, the accident determining module 2110 is specifically configured to:

obtain, by means of identification, a driving accident image in the road condition information photographed by the road condition recording module 2150; extract a photographing position and a photographing time corresponding to the driving accident image obtained by means of identification; and use the photographing position and the photographing time as the accident occurrence position and the accident occurrence time point respectively.

In an optional embodiment, the road accident condition reporting device may further include:

a driving terminal communications module 2160, configured to establish a communication connection to the second terminal that is located in a preset area around the accident occurrence position at the accident occurrence time point.

Specifically, the driving terminal communications module 2160 may establish the communication connection to the second terminal that is located in the preset area around the accident occurrence position at the accident occurrence time point, and then send the road condition information request to the second terminal. The communication connection may be established by using one or more of the following: a cellular network (GSM, Global System for Mobile Communication; UMTS, Universal Mobile Telecommunications System; LTE, Long Term Evolution; CDMA, Code Division Multiple Access; or the like), a wireless local area network (WLAN, Wireless Local Area Networks), near field communication (NFC, Near Field Communication), or Bluetooth.

In an optional embodiment, if the accident occurrence time point is a current instant time determined by the road accident condition reporting device, that is, a current time point, the driving terminal communications module 2160 may establish a communication connection to a second terminal that is currently in a preset area around the accident occurrence position. If the accident occurrence time point is an instant time determined by the road accident condition reporting device, and the accident occurrence position is a position in which the road accident condition reporting device is currently located, the driving terminal communications module 2160 may establish a communication connection to a second terminal that is in a preset area around the current position of the road accident condition reporting device, for example, may broadcast a communication connection request to the preset area around the position of the road accident condition reporting device, so as to establish the communication connection to the second terminal.

Figure 22:
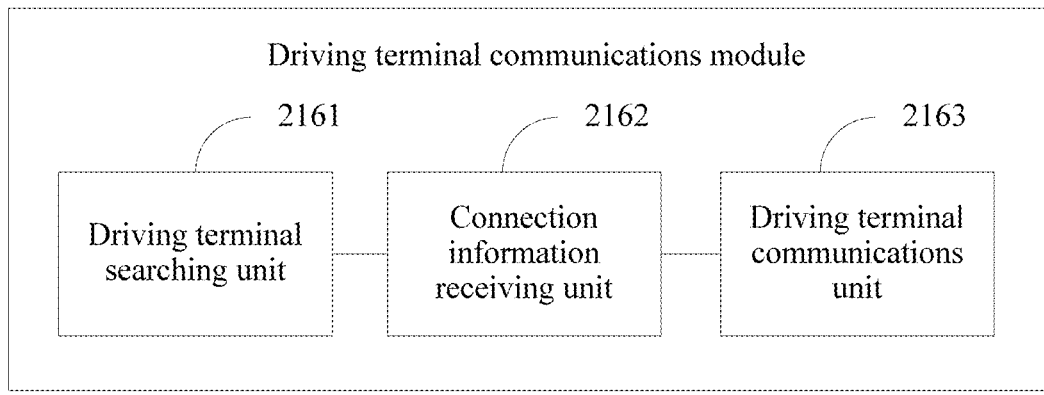
FIG. 22 is a schematic structural diagram of a driving terminal communications module in a road accident condition reporting device according to an embodiment of the present invention.

In another optional embodiment, as shown in FIG. 22, the driving terminal communications module 2160 may further include:

a driving terminal searching unit 2161, configured to submit the accident occurrence position and the accident occurrence time point to the server, so that the server searches, according to the accident occurrence position and the accident occurrence time point, for the second terminal that is located in the preset area around the accident occurrence position at the accident occurrence time point;

a connection information receiving unit 2162, configured to receive communication connection information of the second terminal that is sent by the server, where the communication connection information may be network information required for establishing a communication connection to the second terminal, for example, an IMSI, MSISDN, or MAC hardware address, an IP address, Bluetooth interconnection information, and an NFC interconnection password; and a driving terminal communications unit 2163, configured to establish the communication connection to the second terminal according to the communication connection information of the second terminal.

In this embodiment, a road accident condition reporting device collects road condition information of an accident occurrence position that is obtained by a second terminal located around the accident occurrence position at an accident occurrence time point, and may report the road condition information of the accident occurrence position to an accident assessment server for accident assessment. In this way, accident assessment accuracy can be improved.

Figure 23:
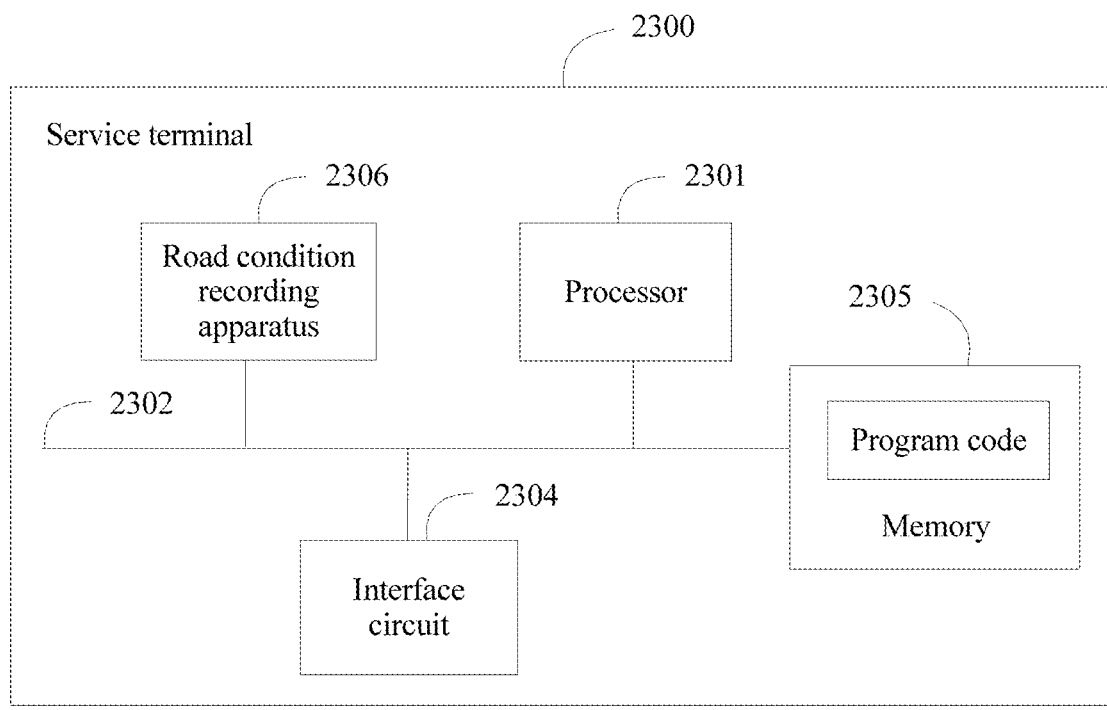
FIG. 23 is a schematic structural diagram of a road accident condition reporting device according to another embodiment of the present invention.

FIG. 23 is a schematic structural diagram of a road accident condition reporting device according to another embodiment of the present invention. As shown in FIG. 23, the road accident condition reporting device 2300 in this embodiment may include a processor 2301 and an interface circuit 2304, and optionally may further include a road condition recording apparatus 2306. FIG. 23 further shows a memory 2305 and a bus 2302. The processor 2301, the interface circuit 2304, the memory 2305, and the road condition recording apparatus 2306 are connected and communicate with each other by using the bus 2302.

It should be noted that the processor 2301 herein may be one processing element or may be a collective term of multiple processing elements. For example, the processing element may be a central processing unit, or an application specific integrated circuit, or may be configured as one or more integrated circuits implementing this embodiment of the present invention, for example, one or more microprocessors or one or more field programmable gate arrays.

The interface circuit 2304 may include a wireless transmitter/receiver, or may include a wired interface unit such as an optical fiber or cable interface. The interface circuit 2304 of the road accident condition reporting device in this embodiment is configured to communicate with or connect to a second terminal and an accident assessment server, and may be further configured to communicate with a server.

The memory 2305 may be one storage apparatus or may be a collective term of multiple storage elements, and is configured to store executable program code or a parameter, data, and the like that are required for running an access network management device. The memory 2303 may include a random access memory, and may further include a non-volatile memory, for example, a disk memory and a flash memory.

The bus 2302 may be an industry standard architecture bus, a peripheral component interconnect bus, or an extended industry standard architecture bus, or the like. The bus 2302 may be categorized into an address bus, a data bus, a control bus, and the like. For ease of representation, only one line is used in FIG. 23 for representation, but it does not mean that there is only one bus or one type of bus.

The road condition recording apparatus 2306 is configured to photograph and record road condition information. In an optional embodiment, the road condition recording apparatus 2006 may further be connected to an in-vehicle driving recording terminal, to obtain road condition information photographed by the in-vehicle driving recording terminal.

Optionally, the road accident condition reporting device 2300 may further include an input/output apparatus. The input/output apparatus is connected to the bus 2302, so as to connect to another component such as the processor 2301 by using the bus 2302. In an example, a GUI operation/display panel may be provided to display a vehicle operation state, a device state, an environment in which a self-driving car is located, a user operation interface, and an operation result. The panel may be a touchscreen that is configured to receive a user touch operation and convert the user touch operation into a user operation instruction.

The processor 2301 in the road accident condition reporting device 2300 may invoke the program code in the memory 2305 to perform the following operations:

determining an accident occurrence position and an accident occurrence time point;

sending a road condition information request to a second terminal by using the interface circuit 2304, where the second terminal has a road condition recording capability, and a distance between the accident occurrence position and the second terminal at the accident occurrence time point is less than a preset threshold;

receiving, by using the interface circuit 2304, road condition information that is corresponding to the accident occurrence position and sent by the second terminal; and reporting, to the accident assessment server by using the interface circuit 2304, the road condition information that is corresponding to the accident occurrence position and sent by the second terminal, so that the accident assessment server performs accident assessment according to the road condition information corresponding to the accident occurrence position.

Optionally, when reporting, to the accident assessment server by using the interface circuit 2304, the road condition information that is corresponding to the accident occurrence position and sent by the second terminal, the road accident condition reporting device reports, to the accident assessment server by using the interface circuit 2304, road condition information that is corresponding to the road accident condition reporting device in the accident occurrence position, so that the accident assessment server performs accident assessment according to the road condition information corresponding to the accident occurrence position.

Before the road condition information request is sent to the second terminal that is located in a preset area around the accident occurrence position at the accident occurrence time point, the following operation is included:

establishing, by using the interface circuit 2304, a communication connection to the second terminal that is located in the preset area around the accident occurrence position at the accident occurrence time point.

Further, the establishing, by using the interface circuit 2304, a communication connection to the second terminal that is located in the preset area around the accident occurrence position at the accident occurrence time point includes:

submitting the accident occurrence position and the accident occurrence time point to the server by using the interface circuit 2304, so that the server searches, according to the accident occurrence position and the accident occurrence time point, for the second terminal that is located in the preset area around the accident occurrence position at the accident occurrence time point;

receiving, by using the interface circuit 2304, communication connection information of the second terminal that is sent by the server; and establishing the communication connection to the second terminal according to the communication connection information of the second terminal by using the interface circuit 2304.

Further, optionally, the determining an accident occurrence position and an accident occurrence time point includes:

obtaining, by means of identification, a driving accident image in the road condition information of the road accident condition reporting device; extracting a photographing position and a photographing time corresponding to the driving accident image obtained by means of identification; and using the photographing position and the photographing time as the accident occurrence position and the accident occurrence time point respectively.

Figure 24:
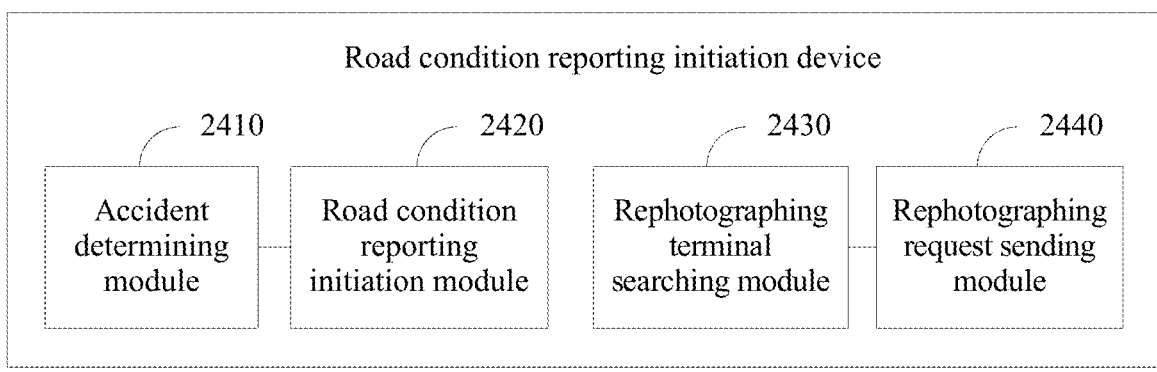
FIG. 24 is a schematic structural diagram of a road condition reporting initiation device according to an embodiment of the present invention.

FIG. 24 is a schematic structural diagram of a road condition reporting initiation device according to an embodiment of the present invention. In this embodiment, the road condition reporting initiation device may include an accident determining module 2410 and a road condition reporting initiation module 2420.

The accident determining module 2410 is configured to determine an accident occurrence position and an accident occurrence time point.

The accident determining module 2410 is the same as the accident determining module 2010 in the foregoing embodiment, and details are not described in this embodiment again.

The road condition reporting initiation module 2420 is configured to send a road condition information request to a second terminal, where the second terminal has a road condition recording capability, and a distance between the accident occurrence position and the second terminal at the accident occurrence time point is less than a preset threshold, so that the second terminal reports road condition information corresponding to the accident occurrence position to an accident assessment server, and the accident assessment server performs accident assessment according to the road condition information corresponding to the accident occurrence position.

The road condition information request may carry the accident occurrence time point or the accident occurrence position. If both the accident occurrence time point and the accident occurrence position are omitted by default, it may indicate that road condition information that is obtained currently or recently is requested. Specifically, the road accident condition reporting device may establish a communication connection to the second terminal that is located in a preset area around the accident occurrence position at the accident occurrence time point, and then the road condition reporting initiation module 2420 sends the road condition information request to the second terminal. The communication connection may be established by using one or more of a cellular network, a wireless local area network, near field communication, or Bluetooth. For example, if the road accident condition reporting device is currently located in the accident occurrence position, the road accident condition reporting device may send the road condition information request to a second terminal in a preset surrounding area.

In an optional embodiment, if the accident occurrence time point is a current instant time determined by the road accident condition reporting device, that is, a current time point, the road accident condition reporting device may establish a communication connection to a second terminal that is currently in a preset area around the accident occurrence position. If the accident occurrence time point is an instant time determined by the road accident condition reporting device, and the accident occurrence position is a position in which the road accident condition reporting device is currently located, the road accident condition reporting device may establish a communication connection to a second terminal that is in a preset area around the current position of the road accident condition reporting device, for example, may broadcast a communication connection request to the preset area around the position of the road accident condition reporting device, so as to establish the communication connection to the second terminal.

In another optional embodiment, if the accident occurrence time is not a current instant time, or the accident occurrence position is not a position in which the road accident condition reporting device is currently located, the road accident condition reporting device may submit the accident occurrence position and the accident occurrence time point to a server, so that the server searches, according to the accident occurrence position and the accident occurrence time point, for a second terminal that is located in a preset area around the accident occurrence position at the accident occurrence time point, and the road accident condition reporting device may establish, according to a searching result of the server, a communication connection to the second terminal that is located in the preset area around the accident occurrence position at the accident occurrence time point. For example, the road accident condition reporting device receives communication connection information of the second terminal that is sent by the server, and establishes the communication connection to the second terminal according to the communication connection information of the second terminal. The communication connection information may be network information required for establishing a communication connection to the second terminal, for example, a MAC or IP address, Bluetooth interconnection information, and an NFC interconnection password. The road condition information request sent by the road condition reporting initiation module 2420 in this embodiment of the present invention does not request the second terminal to return road condition information, but requests the second terminal to directly send the road condition information to the accident assessment server. Different from the foregoing embodiment described with reference to FIG. 21, the second terminal in this embodiment directly submits the road condition information corresponding to the accident occurrence position to the accident assessment server according to the road condition information request. That is, the road condition reporting initiation device in this embodiment does not need to collect road condition information obtained by another second terminal near the accident occurrence position, but requests the another second terminal to submit the road condition information corresponding to the accident occurrence position to the accident assessment server.

The accident assessment server may perform responsibility assessment for a current accident according to the road condition information corresponding to the accident occurrence position, and send an accident assessment result to a vehicle or a terminal related to the accident. In an optional embodiment, the accident assessment server may further send the accident assessment result to an insurance company, and after subsequently completing an electronic insurance book according to the accident assessment result, the insurance company may send the insurance book to the vehicle or the terminal related to the accident.

Optionally, the road condition reporting initiation device in this embodiment may further include a rephotographing terminal searching module 2430 and a rephotographing request sending module 2440.

The rephotographing terminal searching module 2430 is configured to determine a third terminal that meets a road accident condition rephotographing qualification, where the road accident condition rephotographing qualification includes: the accident occurrence position is located ahead of a driving route of the third terminal.

In an optional embodiment, the accident assessment server may determine whether the currently received road condition information corresponding to the accident occurrence position meets an accident assessment requirement, for example, whether a vehicle license plate number of an involved vehicle is obtained, or whether an image of a collision position of an involved vehicle is clear. If the currently obtained road condition information corresponding to the accident occurrence position cannot meet the accident assessment requirement, the accident assessment server sends a road accident condition rephotographing requirement to the road condition reporting initiation device, so as to trigger the rephotographing terminal searching module 2430 in the road condition reporting initiation device to search for the third terminal that meets the road accident condition rephotographing qualification. The road accident condition rephotographing requirement may carry required target photographing information, for example, the accident occurrence position, a vehicle license plate of an involved vehicle that needs to be photographed, or a specified photographing position and/or photographing angle.

The third terminal that meets the road accident condition rephotographing qualification may be a terminal device that uses a camera or a driving recording apparatus to photograph and record road condition information, for example, a third terminal disposed on a vehicle or worn by a pedestrian, or a road infrastructure surveillance photographing device. The road accident condition rephotographing qualification is: being able to obtain road condition information of the accident occurrence position currently or shortly, for example, the third terminal is currently located in the accident occurrence position, or the accident occurrence position is located ahead of a driving route of the third terminal, that is, the third terminal is currently located or is about to arrive at the accident occurrence position. The road accident condition rephotographing qualification may further be determined according to the road accident condition rephotographing requirement sent by the accident assessment server. For example, if the road accident condition rephotographing requirement includes a photographing pixel requirement, a photographing definition requirement, or a photographing angle requirement, the road accident condition rephotographing qualification correspondingly may further include: being able to meet the foregoing requirement.

For different manners for determining the third terminal, the rephotographing terminal searching module 2430 has two optional structures.

Manner 1: As shown in FIG. 24, the rephotographing terminal searching module 2430 further includes a rephotographing qualification broadcasting unit 2431 and a rephotographing terminal determining unit 2432.

The rephotographing qualification broadcasting unit 2431 is configured to broadcast the road accident condition rephotographing qualification to a road condition recording terminal in an area to which the accident occurrence position belongs, so that the road condition recording terminal in the area to which the accident occurrence position belongs detects whether the road condition recording terminal meets the road accident condition rephotographing qualification.

The area to which the accident occurrence position belongs may be a geographical administrative region to which the accident occurrence position belongs, for example, a city, county, or road to which the accident occurrence position belongs, or a geometric area of a specified shape and range that uses the accident occurrence position as a center. The rephotographing qualification broadcasting unit 2431 may search, according to obtained position information that is reported by road condition recording terminals, the road condition recording terminal that is currently located in the area to which the accident occurrence position belongs, and then broadcast the road accident condition rephotographing qualification to the road condition recording terminal in the area to which the accident occurrence position belongs. The road condition recording terminal in the area to which the accident occurrence position belongs detects whether the road condition recording terminal meets the road accident condition rephotographing qualification. If the road condition recording terminal meets the road accident condition rephotographing qualification, the road condition recording terminal returns a rephotographing qualification acknowledgement message to the road condition reporting initiation device; or if the road condition recording terminal does not meet the road accident condition rephotographing qualification, the road condition recording terminal may discard the road accident condition rephotographing qualification, or returns a rephotographing qualification inconformity message to the road condition reporting initiation device.

The rephotographing terminal determining unit 2432 is configured to determine, according to a rephotographing qualification acknowledgement message returned by the road condition recording terminal in the area to which the accident occurrence position belongs, the third terminal that meets the road accident condition rephotographing qualification.

Figure 25:
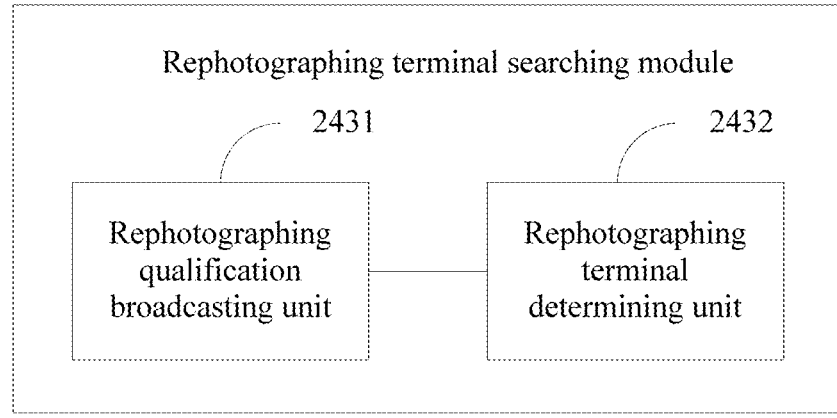
FIG. 25 is a schematic structural diagram of a rephotographing terminal searching module in a road condition reporting initiation device according to an embodiment of the present invention.
Figure 26:
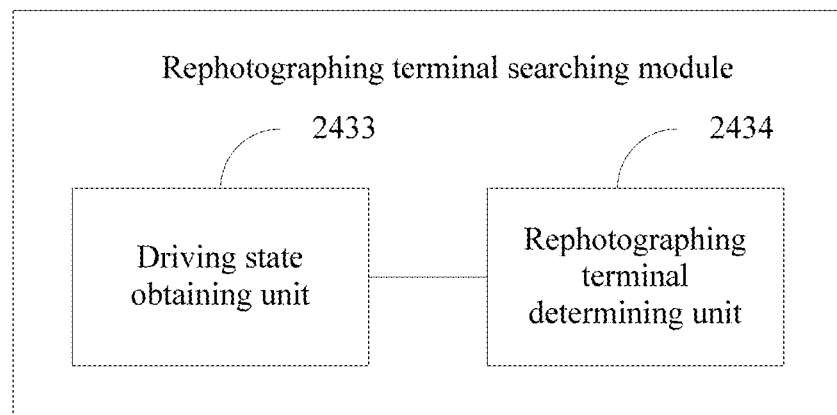
FIG. 26 is a schematic structural diagram of a rephotographing terminal searching module in a road condition reporting initiation device according to another embodiment of the present invention.

Manner 2: As shown in FIG. 25, the rephotographing terminal searching module 2430 further includes a driving state obtaining unit 2433 and a rephotographing terminal determining unit 2434.

The driving state obtaining unit 2433 is configured to obtain driving state information of a road condition recording terminal in an area to which the accident occurrence position belongs.

In this manner, the road condition reporting initiation device may collect driving state information of a road condition recording terminal in an area to which the accident occurrence position belongs. The driving state information includes a current position and a navigation route, and correspondingly may further include a photographing pixel or definition, a supported photographing angle range, and the like according to the road accident condition rephotographing qualification.

The rephotographing terminal determining unit 2434 is configured to: determine whether the driving state information of the road condition recording terminal in the area to which the accident occurrence position belongs meets the road accident condition rephotographing qualification; and determine a road condition recording terminal whose driving state information meets the road accident condition rephotographing qualification as the third terminal.

Specifically, the rephotographing terminal determining unit 2434 may compare the driving state information of the road condition recording terminal with the road accident condition rephotographing qualification, determine whether the driving state information of the road condition recording terminal in the area to which the accident occurrence position belongs meets the road accident condition rephotographing qualification, and determine a road condition recording terminal whose driving state information meets the road accident condition rephotographing qualification as the third terminal.

The rephotographing request sending module 2440 is configured to send a road accident condition rephotographing request to the second terminal, where the road condition rephotographing request carries the accident occurrence position, so that the second terminal obtains a rephotographed road driving condition corresponding to the accident occurrence position, and reports the rephotographed road driving condition corresponding to the accident occurrence position to the accident assessment server, so that the accident assessment server performs accident assessment according to the road condition information corresponding to the accident occurrence position and the rephotographed road driving condition corresponding to the accident occurrence position.

Specifically, the second terminal may set a driving state and a road driving condition photographing parameter according to the road accident condition rephotographing request, for example, arriving at a target photographing position, stopping or decelerating when arriving at the accident occurrence position, and adjusting a photographing angle and a photographing pixel or definition for photographing a road driving condition, to meet corresponding requirements in the road accident condition rephotographing request, so as to obtain the rephotographed road driving condition corresponding to the accident occurrence position. In an optional embodiment, the second terminal may further detect whether key information such as a vehicle license plate of an involved vehicle is photographed.

In an optional embodiment, the second terminal may also send the road condition information corresponding to the accident occurrence position to the road condition reporting initiation device, and the road condition reporting initiation device receives the road condition information corresponding to the accident occurrence position and sends the collected road condition information corresponding to the accident occurrence position to the accident assessment server.

In this embodiment, a road condition reporting initiation device may request a second terminal that is located in an accident occurrence position at an accident occurrence time point to send road condition information corresponding to the accident occurrence position to an accident assessment server, and may further request the second terminal to obtain a rephotographed road driving condition corresponding to the accident occurrence position, so that the accident assessment server performs accident assessment according to the road condition information obtained by the second terminal that is located around the accident occurrence position at the accident occurrence time point, and the rephotographed road driving condition obtained by the second terminal. In this way, road condition rephotographing can be performed when road condition information is insufficient in a process of collecting a road driving accident condition, so as to improve accident assessment fairness and accuracy.

Figure 27:
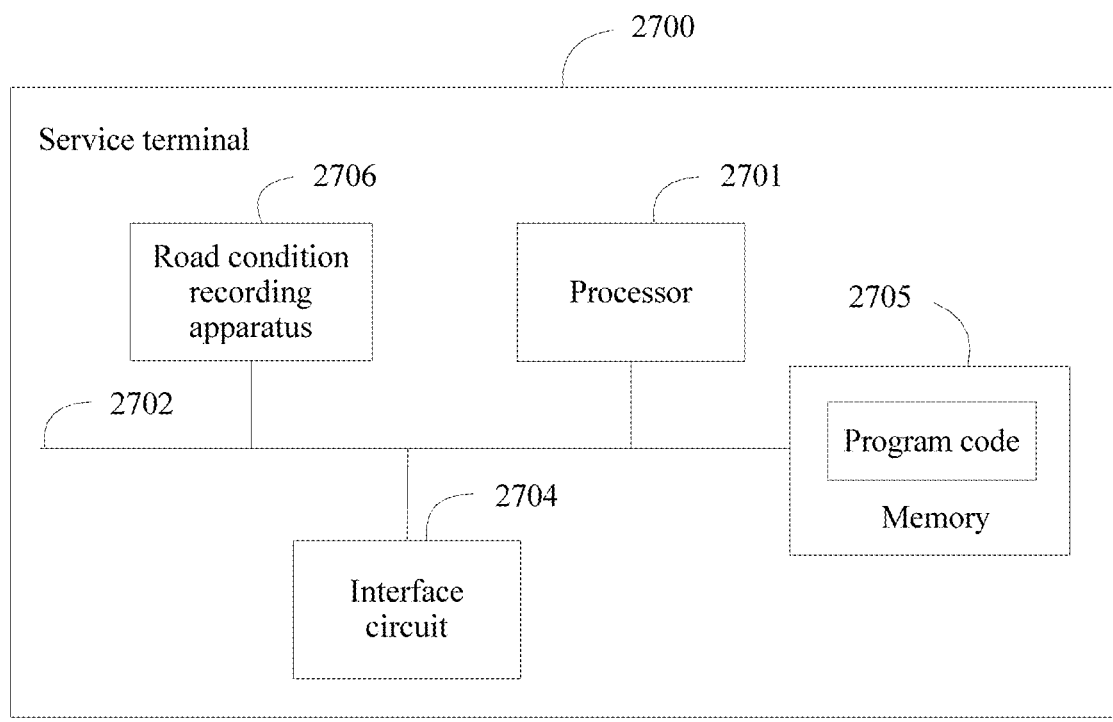
FIG. 27 is a schematic structural diagram of a road condition reporting initiation device according to another embodiment of the present invention.

FIG. 27 is a schematic structural diagram of a road condition reporting initiation device according to another embodiment of the present invention. As shown in FIG. 27, the road condition reporting initiation device 2700 in this embodiment may include a processor 2701 and an interface circuit 2704, and optionally may further include a road condition recording apparatus 2706. FIG. 27 further shows a memory 2705 and a bus 2702. The processor 2701, the interface circuit 2704, and the memory 2705 are connected and communicate with each other by using the bus 2702.

It should be noted that the processor 2701 herein may be one processing element or may be a collective term of multiple processing elements. For example, the processing element may be a central processing unit, or an application specific integrated circuit, or may be configured as one or more integrated circuits implementing this embodiment of the present invention, for example, one or more microprocessors or one or more field programmable gate arrays.

The interface circuit 2704 may include a wireless transmitter/receiver, or may include a wired interface unit such as an optical fiber or cable interface. The interface circuit 2704 of the road condition reporting initiation device in this embodiment is configured to communicate with or connect to a second terminal and an accident assessment server, and may be further configured to communicate with a server.

The memory 2705 may be one storage apparatus or may be a collective term of multiple storage elements, and is configured to store executable program code or a parameter, data, and the like that are required for running an access network management device. The memory 2705 may include a random access memory, and may further include a non-volatile memory, for example, a disk memory and a flash memory.

The bus 2702 may be an industry standard architecture bus, a peripheral component interconnect bus, or an extended industry standard architecture bus, or the like. The bus 2702 may be categorized into an address bus, a data bus, a control bus, and the like. For ease of representation, only one line is used in FIG. 27 for representation, but it does not mean that there is only one bus or one type of bus.

Optionally, the road condition reporting initiation device 2700 may further include an input/output apparatus. The input/output apparatus is connected to the bus 2702, so as to connect to another component such as the processor 2701 by using the bus 2702. In an example, a GUI operation/display panel may be provided to display a vehicle operation state, a device state, an environment in which a self-driving car is located, a user operation interface, and an operation result. The panel may be a touchscreen that is configured to receive a user touch operation and convert the user touch operation into a user operation instruction.

The processor 2701 in the road condition reporting initiation device 2700 may invoke the program code in the memory 2705 to perform the following operations:

determining an accident occurrence position and an accident occurrence time point;

sending a road condition information request to a second terminal by using the interface circuit 2704, where the second terminal has a road condition recording capability, and a distance between the accident occurrence position and the second terminal at the accident occurrence time point is less than a preset threshold, so that the second terminal reports road condition information corresponding to the accident occurrence position to the accident assessment server, and the accident assessment server performs accident assessment according to the road condition information corresponding to the accident occurrence position.

Optionally, the processor 2701 may further invoke the program code in the memory 2705 to perform the following operations:

determining a third terminal that meets a road accident condition rephotographing qualification, where the road accident condition rephotographing qualification includes: the accident occurrence position is located ahead of a driving route of the third terminal; and sending a road accident condition rephotographing request to the third terminal by using the interface circuit 2704, where the road condition rephotographing request carries the accident occurrence position, so that the third terminal obtains a rephotographed road driving condition corresponding to the accident occurrence position, and reports the rephotographed road driving condition corresponding to the accident occurrence position to the accident assessment server, so that the accident assessment server performs accident assessment according to the road condition information corresponding to the accident occurrence position and the rephotographed road driving condition corresponding to the accident occurrence position.

Further, optionally, the determining a third terminal that meets a road accident condition rephotographing qualification includes:

broadcasting, by using the interface circuit 2704, the road accident condition rephotographing qualification to a road condition recording terminal in an area to which the accident occurrence position belongs, so that the road condition recording terminal in the area to which the accident occurrence position belongs detects whether the road condition recording terminal meets the road accident condition rephotographing qualification; and determining, according to a rephotographing qualification acknowledgement message returned by the road condition recording terminal in the area to which the accident occurrence position belongs, the third terminal that meets the road accident condition rephotographing qualification.

In another optional manner, the determining a third terminal that meets a road accident condition rephotographing qualification includes:

obtaining driving state information of a road condition recording terminal in an area to which the accident occurrence position belongs;

determining whether the driving state information of the road condition recording terminal in the area to which the accident occurrence position belongs meets the road accident condition rephotographing qualification; and determining a road condition recording terminal whose driving state information meets the road accident condition rephotographing qualification as the third terminal.

In this embodiment, a road condition reporting initiation device may request a second terminal that is located in an accident occurrence position at an accident occurrence time point to send road condition information corresponding to the accident occurrence position to an accident assessment server, and may further request a third terminal to obtain a rephotographed road driving condition corresponding to the accident occurrence position, so that the accident assessment server performs accident assessment according to the road condition information obtained by the second terminal that is located around the accident occurrence position at the accident occurrence time point, and the rephotographed road driving condition obtained by the third terminal. In this way, road condition rephotographing can be performed when road condition information is insufficient in a process of collecting a road driving accident condition, so as to improve accident assessment fairness and accuracy.

Figure 28:
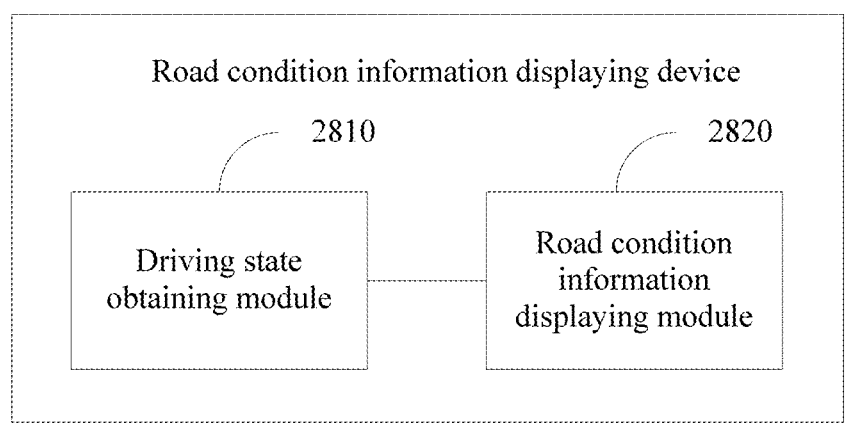
FIG. 28 is a schematic structural diagram of a road condition information prompting device according to an embodiment of the present invention.

FIG. 28 is a schematic structural diagram of a road condition information prompting device according to an embodiment of the present invention. As shown in FIG. 28, the road condition information prompting device in this embodiment of the present invention may include:

a driving state obtaining module 2810, configured to obtain current driving state information, where the driving state information includes driving route information, driving position information, or a driving speed; and a driving prompting module 2820 and a road condition information displaying module, configured to switch between displaying of a driving navigation picture and displaying of a road condition information picture according to the driving state information.

In an optional embodiment, the road condition information displaying device in the present invention may be a mobile terminal or an in-vehicle terminal in which a navigation module that provides a navigation picture is built, and may obtain a road condition information image from a road driving condition recording apparatus. In another embodiment, the road condition information displaying device may be a road driving condition recording apparatus, and can display currently photographed road condition information in real time; a navigation module that provides a navigation picture may be built in the road condition information displaying device, or the road condition information displaying device may be connected to a mobile terminal or an in-vehicle terminal that provides a navigation picture. The road condition information displaying device may also be a mobile terminal, a tablet computer, or any other user equipment, and may obtain a navigation picture from an in-vehicle terminal and obtain a road condition information picture from a road driving condition recording apparatus. The driving route information may be provided by the navigation module that provides a navigation picture, or may be obtained by using a GPS or another sensor that is built in the road condition information displaying device.

Specifically, that the driving prompting module 2820 switches between displaying of the driving navigation picture and displaying of the road condition information picture according to the driving state information may include any one or more of the following cases:

(101) A length of a route to be passed along a current road is calculated according to the driving route information and the driving position information, and the road condition information picture is displayed if the length of the route to be passed along the current road is greater than a preset distance threshold.

In a specific implementation, the road condition information displaying device may obtain the current road according to the driving position information, and then obtain a remaining distance ahead along the current road according to the driving route information. The remaining distance is the length of the route to be passed along the current road. For example, a current driving position is a point on a road A, a length of a route from the current driving position to a position ahead in which a corresponding vehicle departs from the road A is 400 meters by means of calculation according to the driving route information, and if the preset distance threshold is 200 meters, the length of the route to be passed along the current road is greater than the preset distance threshold. This indicates that there is still a relatively long distance to be passed along the current road, and a requirement for displaying the navigation picture may be relatively low. In this case, if the road condition information displaying device currently displays the road condition information picture, it remains unchanged; if the road condition information displaying device currently displays the navigation picture, the road condition information displaying device switches to displaying of the road condition information picture.

(102) If it is determined, according to the driving position information, that a corresponding vehicle is currently located in a road junction area, the driving navigation picture is displayed.

In a specific implementation, if the road condition information displaying device determines, according to the driving position information and a preset road map, that a distance between a current driving position and a nearest road junction position is less than a preset threshold, for example, 100 meters or 200 meters, it is determined that the vehicle is currently located in the road junction area; or the road condition information displaying device may determine, according to the driving route information and the driving position information, whether the vehicle is about to arrive at a road junction, and if the vehicle is about to arrive at the road junction, for example, the road junction is ahead of the vehicle by 100 meters or 200 meters, it is determined that the vehicle is located in the road junction area. When a vehicle is in a road junction area, a requirement for displaying the navigation picture is generally high, and if the road condition information displaying device currently displays the navigation picture, it remains unchanged; or if the road condition information displaying device currently displays the road condition information picture, the road condition information displaying device switches to displaying the navigation picture.

(103) If it is determined, according to the driving speed and the currently photographed road condition information, that a corresponding road is currently in a road congestion state, the road condition information picture is displayed.

In a specific implementation, if the current driving speed is less than a preset threshold, for example, 5 km/h, and there is a large quantity of vehicles in the currently photographed road condition information picture, it may be considered that the road is currently in a road congestion state. Because the road congestion state is often associated with a traffic incident such as rear-ending or a collision, a requirement for displaying the road condition information picture may be higher. Therefore, if the road condition information displaying device currently displays the road condition information picture, it remains unchanged; or if the road condition information displaying device currently displays the navigation picture, the road condition information displaying device switches to displaying of the road condition information picture.

(104) If the current driving speed is less than a preset speed threshold, the driving navigation picture is displayed.

In an optional embodiment, if the current driving speed is less than the preset speed threshold, it indicates that a corresponding vehicle is currently in a low-speed driving state, and in this case, a requirement for displaying the road condition information picture may be higher. Therefore, if the road condition information displaying device currently displays the road condition information picture, it remains unchanged; or if the road condition information displaying device currently displays the navigation picture, the road condition information displaying device switches to displaying of the road condition information picture.

The road condition information displaying device in this embodiment can automatically switch between displaying of a navigation picture and displaying of a road condition information picture according to current driving state information, so as to automatically switch, in a same display area according to a requirement, between displaying of the navigation picture and displaying of the road condition information picture, and avoid a security risk caused because a user watches two display areas or manually switches between displayed pictures in a driving process.

Figure 29:
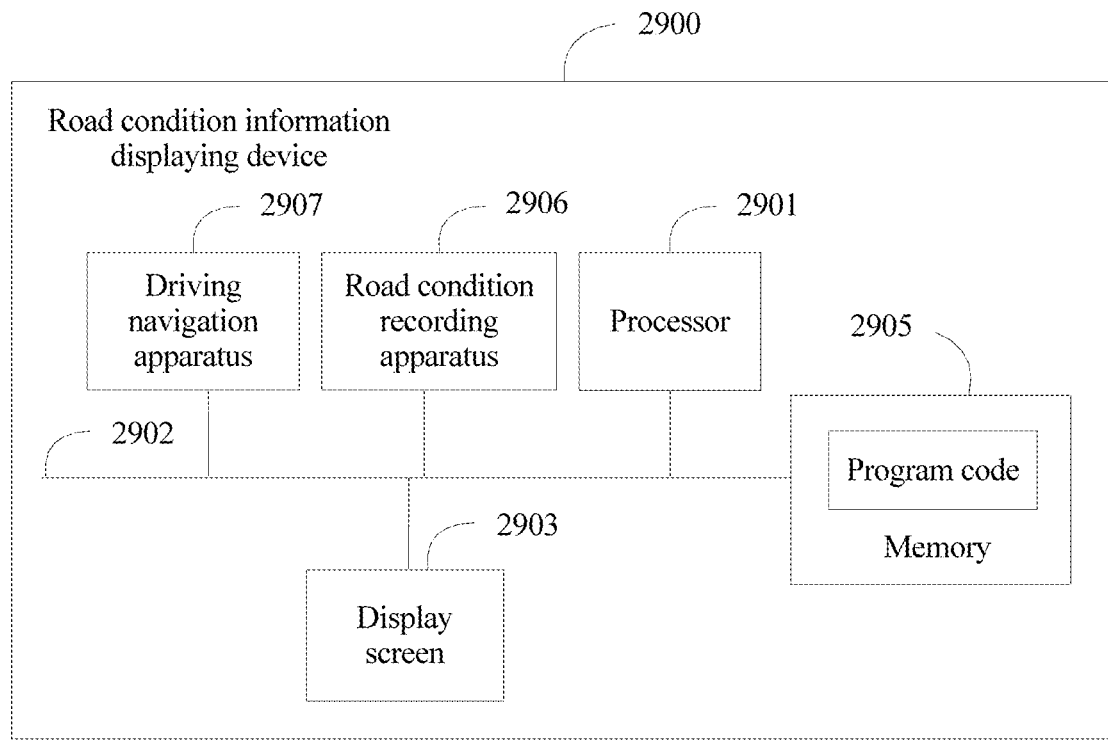
FIG. 29 is a schematic structural diagram of a road condition information displaying device according to another embodiment of the present invention.

FIG. 29 is a schematic structural diagram of a road condition information displaying device according to another embodiment of the present invention. As shown in FIG. 29, the road condition information displaying device 2900 in this embodiment may include a processor 2901, an interface circuit 2904, a road condition recording apparatus 2906, and a driving navigation apparatus 2907. FIG. 29 further shows a memory 2905 and a bus 2902. The processor 2901, the interface circuit 2904, the memory 2905, the road condition recording apparatus 2906, and the driving navigation apparatus 2907 are connected and communicate with each other by using the bus 2902.

It should be noted that the processor 2901 herein may be one processing element or may be a collective term of multiple processing elements. For example, the processing element may be a central processing unit, or an application specific integrated circuit, or may be configured as one or more integrated circuits implementing this embodiment of the present invention, for example, one or more microprocessors or one or more field programmable gate arrays.

The interface circuit 2904 may include a wireless transmitter/receiver, or may include a wired interface unit such as an optical fiber or cable interface. The interface circuit 2904 of the road condition information displaying device 2900 in this embodiment is configured to communicate with or connect to a second terminal and a server, and may be further configured to communicate with a network base station.

The memory 2905 may be one storage apparatus or may be a collective term of multiple storage elements, and is configured to store executable program code or a parameter, data, and the like that are required for running an access network management device. The memory 2905 may include a random access memory, and may further include a non-volatile memory, for example, a disk memory and a flash memory.

The bus 2902 may be an industry standard architecture bus, a peripheral component interconnect bus, or an extended industry standard architecture bus, or the like. The bus 2902 may be categorized into an address bus, a data bus, a control bus, and the like. For ease of representation, only one line is used in FIG. 29 for representation, but it does not mean that there is only one bus or one type of bus.

A display screen 2903 is configured to display a road condition information picture or a navigation picture.

The road condition recording apparatus 2906 is configured to photograph and record road condition information. In an optional embodiment, the road condition recording apparatus 2906 may further be connected to an in-vehicle second terminal, to obtain road condition information photographed by the in-vehicle second terminal.

The driving navigation apparatus 2907 is configured to: determine a navigation route according to a departure place and a destination that are determined by a user, and provide a navigation picture.

Optionally, the road condition information displaying device 2900 may further include an input/output apparatus. The input/output apparatus is connected to the bus 2902, so as to connect to another component such as the processor 2901 by using the bus 2902. In an example, a GUI operation/display panel may be provided to display a vehicle operation state, a device state, an environment in which a self-driving car is located, a user operation interface, and an operation result. The panel may be a touchscreen that is configured to receive a user touch operation and convert the user touch operation into a user operation instruction.

The processor 2901 in the road condition information displaying device 2900 may invoke the program code in the memory 2905 to perform the following operations:

obtaining current driving state information, where the driving state information includes driving route information, driving position information, or a driving speed; and controlling, according to the driving state information, the display screen 2903 to switch between displaying of the driving navigation picture of the driving navigation apparatus 2907 and displaying of the road condition information picture of the road condition recording apparatus 2906.

Specifically, the switching between displaying of the driving navigation picture and displaying of the road condition information picture according to the driving state information may include any one or more of the following cases:

(101) A length of a route to be passed along a current road is calculated according to the driving route information and the driving position information, and the road condition information picture is displayed if the length of the route to be passed along the current road is greater than a preset distance threshold.

(102) If it is determined, according to the driving position information, that a corresponding vehicle is currently located in a road junction area, the driving navigation picture is displayed.

(103) If it is determined, according to the driving speed and the currently photographed road condition information, that a corresponding road is currently in a road congestion state, the road condition information picture is displayed.

(104) If the current driving speed is less than a preset speed threshold, the driving navigation picture is displayed.

The road condition information displaying device in this embodiment can automatically switch between displaying of a navigation picture and displaying of a road condition information picture according to current driving state information, so as to automatically switch, in a same display area according to a requirement, between displaying of the navigation picture and displaying of the road condition information picture, and avoid a security risk caused because a user watches two display areas or manually switches between displayed pictures in a driving process.

Figure 30:
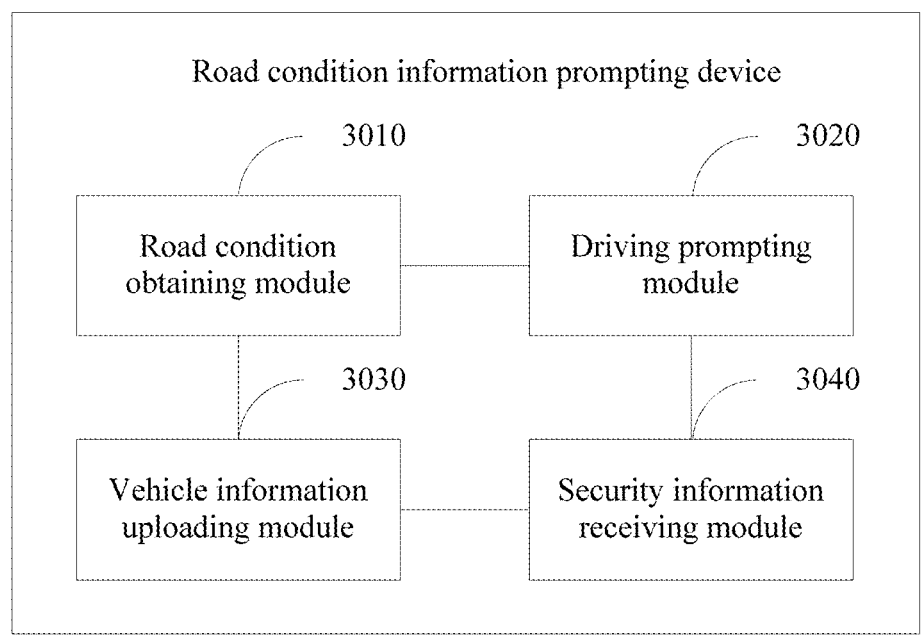
FIG. 30 is a schematic structural diagram of a road condition information prompting device according to an embodiment of the present invention.

FIG. 30 is a schematic structural diagram of a road condition information prompting device according to an embodiment of the present invention. The road condition information prompting device in this embodiment of the present invention may be a user terminal such as a smart phone, a tablet computer, an intelligent wearable device, an e-reader, an in-vehicle terminal, or a second terminal. As shown in FIG. 30, the road condition information prompting device in this embodiment of the present invention may include a road condition obtaining module 3010 and a driving prompting module 3020.

The road condition obtaining module 3010 is configured to obtain current real-time road condition information that includes static information or driving state information of a surrounding vehicle that is photographed in real time.

Specifically, the road condition obtaining module 3010 in this embodiment photographs the real-time road condition information by using a camera, and may extract, from the photographed road condition information, the static information and the driving state information of the surrounding vehicle. The static information of the surrounding vehicle may include vehicle license plate information or a vehicle model identity, and may further include static information of a driver or a passenger. The vehicle model identity may include a vehicle brand and model. The driving state information may include a speed or a driving path of the corresponding vehicle, and may further include a driver's behavior and the like.

The driving prompting module 3020 is configured to: determine, according to the static information or the driving state information of the surrounding vehicle, whether the surrounding vehicle has a security risk; and if the surrounding vehicle has a security risk, send a driving security prompt according to the surrounding vehicle that has a security risk.

In a specific implementation, the road condition information prompting device may prompt a user that a vehicle having a security risk exists around the user, and may further give a driving security suggestion, for example, which vehicles are dangerous vehicles, and the user should keep away from them or overtake them quickly.

For example, when the road condition information prompting device identifies, in the photographed road condition information, that a quantity of drivers and passengers in a surrounding vehicle obviously exceeds a limit for the vehicle, for example, if there are eight persons (including a driver and passengers) in a hatchback with four or five seats, the driving prompting module 3020 may consider that the vehicle has a security risk. For another example, when the road condition information prompting device identifies, in the photographed road condition information, that a driver in a surrounding vehicle takes both hands off the steering wheel and is operating a phone or is lighting a cigarette or the like, it may be considered that the vehicle has a security risk.

In an optional embodiment, the driving prompting module 3020 may determine, according to a speed or a driving path of the surrounding vehicle, whether a driver in the surrounding vehicle is in an abnormal state, and if the driver in the surrounding vehicle is in an abnormal state, it may be considered that the surrounding vehicle has a security risk. For example, when the road condition information prompting device identifies, in the photographed road condition information, that a driving path of a surrounding vehicle is of an "S" shape, or hard braking or overspeed driving occurs, or a vehicle gives out black smokes or shudders, or the like, it may be considered that the vehicle has a security risk.

In an optional embodiment, if determining that the surrounding vehicle has a security risk, the road condition information prompting device may send a driving security alarm to a server or a nearby user.

In an optional embodiment, the road condition information prompting device may further include:

a vehicle information uploading module 3030, configured to upload the vehicle license plate information or the vehicle model identity of the surrounding vehicle to a server, so that the server queries a driving security record of the vehicle corresponding to the vehicle license plate information or the vehicle model identity; and a security information receiving module 3040, configured to receive vehicle security information that is delivered by the server according to the driving security record of the vehicle corresponding to the vehicle license plate information or the vehicle model identity.

Specifically, the server may query the driving security record of the vehicle corresponding to the vehicle license plate information or the vehicle model identity. The driving security record may include historical violation information, and historical accident occurrence information or vehicle servicing information of the corresponding vehicle, and may further include a vehicle performance defect, an accident occurrence rate, a potential trouble of design, and the like of a corresponding model. Specifically, the server may obtain the historical violation information, and the historical accident occurrence information or the vehicle servicing information of the corresponding vehicle according to the vehicle license plate information of the surrounding vehicle that is uploaded by the road condition information prompting device; the server may further obtain, according to the vehicle model identity of the surrounding vehicle that is uploaded by the road condition information prompting device, the vehicle performance defect, the accident occurrence rate, the potential trouble of design, and the like of this type of vehicle by using big data in a vehicle information database.

If the server queries, according to the driving security record of the surrounding vehicle that is uploaded by the road condition information prompting device, that there is a security risk, for example, a quantity of violation times of a vehicle during the last year exceeds five times, a quantity of traffic accident occurrence times exceeds four times, or a vehicle has not been maintained for two years, it may be considered that the vehicle has a security risk, and the server may send vehicle security information of the vehicle to the road condition information prompting device. For another example, if the server queries that the vehicle corresponding to the vehicle model identity of the surrounding vehicle that is uploaded by the road condition information prompting device has a vehicle performance defect, a high accident occurrence rate, and a potential trouble of design, it may also be considered that the vehicle has a security risk, and the server may send vehicle security information of the vehicle to the road condition information prompting device. The vehicle security information may include description information of the foregoing security risks, and may further include security prompt information set by the server for corresponding security risk types.

The driving prompting module 3020 is specifically configured to: determine, according to the vehicle security information, whether the surrounding vehicle has a security risk; and send the driving security prompt according to the surrounding vehicle that has a security risk.

The road condition information prompting device in this embodiment can determine, according to static information or driving state information of a surrounding vehicle in photographed road condition information, whether the surrounding vehicle has a security risk, so as to send a driving security prompt according to the surrounding vehicle that has a security risk, and improve driving security. In addition, a more convenient and safer vehicle driving environment can be constructed.

Figure 31:
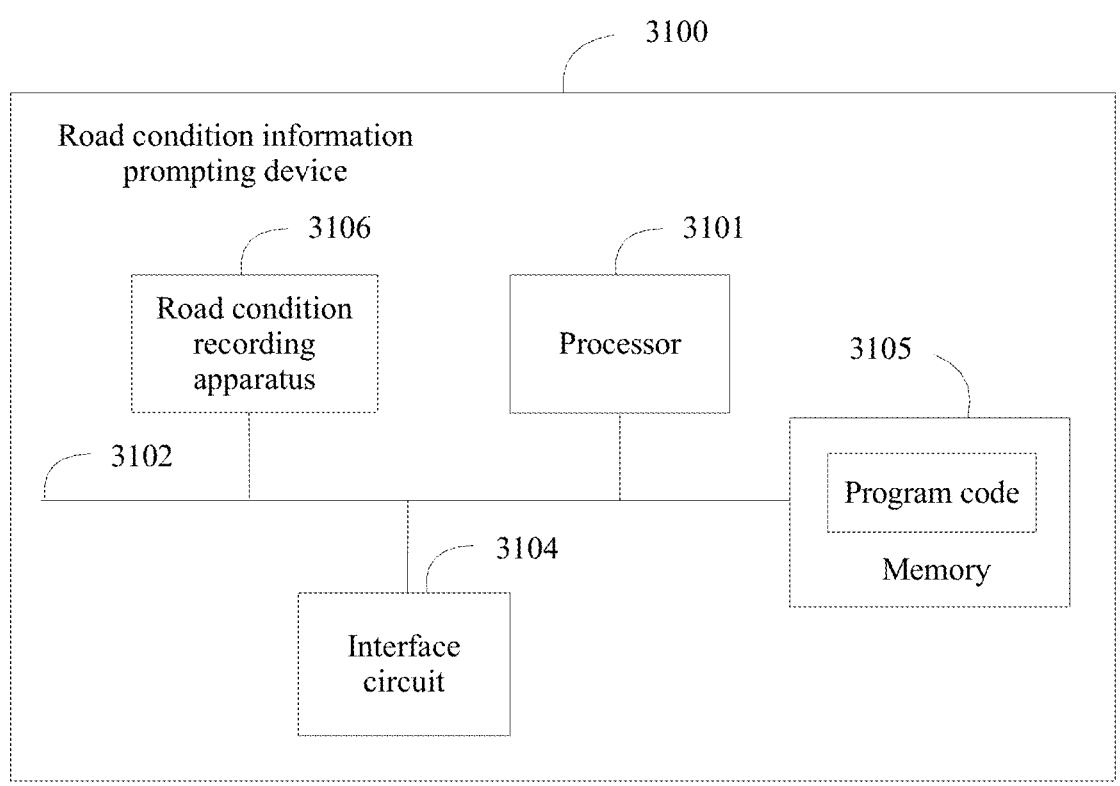
FIG. 31 is a schematic structural diagram of a road condition information prompting device according to another embodiment of the present invention.

FIG. 31 is a schematic structural diagram of a road condition information prompting device according to another embodiment of the present invention. As shown in FIG. 31, the road condition information prompting device 3100 in this embodiment may include a processor 3101 and a road condition recording apparatus 3106. FIG. 31 further shows a memory 3105 and a bus 3102. The processor 3101, an interface circuit 3104, the memory 3105, and the road condition recording apparatus 3106 are connected and communicate with each other by using the bus 3102.

It should be noted that the processor 3101 herein may be one processing element or may be a collective term of multiple processing elements. For example, the processing element may be a central processing unit, or an application specific integrated circuit, or may be configured as one or more integrated circuits implementing this embodiment of the present invention, for example, one or more microprocessors or one or more field programmable gate arrays.

The memory 3105 may be one storage apparatus or may be a collective term of multiple storage elements, and is configured to store executable program code or a parameter, data, and the like that are required for running an access network management device. The memory 3105 may include a random access memory, and may further include a non-volatile memory, for example, a disk memory and a flash memory.

The bus 3102 may be an industry standard architecture bus, a peripheral component interconnect bus, or an extended industry standard architecture bus, or the like. The bus 3102 may be categorized into an address bus, a data bus, a control bus, and the like. For ease of representation, only one line is used in FIG. 31 for representation, but it does not mean that there is only one bus or one type of bus.

The road condition recording apparatus 3106 is configured to photograph and record road condition information. In an optional embodiment, the road condition recording apparatus 2906 may further be connected to an in-vehicle second terminal, to obtain road condition information photographed by the in-vehicle second terminal.

Optionally, the road condition information prompting device 3100 may further include an input/output apparatus. The input/output apparatus is connected to the bus 3102, so as to connect to another component such as the processor 3101 by using the bus 3102. In an example, a GUI operation/display panel may be provided to display a vehicle operation state, a device state, an environment in which a self-driving car is located, a user operation interface, and an operation result. The panel may be a touchscreen that is configured to receive a user touch operation and convert the user touch operation into a user operation instruction.

The processor 3101 in the road condition information prompting device 3100 may invoke the program code in the memory 3105 to perform the following operations:

obtaining, by using the road condition recording apparatus 3106, current real-time road condition information that includes static information or driving state information of a surrounding vehicle that is photographed in real time; and determining, according to the static information or the driving state information of the surrounding vehicle, whether the surrounding vehicle has a security risk; and if the surrounding vehicle has a security risk, sending a driving security prompt according to the surrounding vehicle that has a security risk.

In an optional embodiment, the static information of the surrounding vehicle includes vehicle license plate information or a vehicle model identity.

The determining, according to the static information of the surrounding vehicle, whether the surrounding vehicle has a security risk includes:

uploading the vehicle license plate information or the vehicle model identity of the surrounding vehicle to a server, so that the server queries a driving security record of the vehicle corresponding to the vehicle license plate information or the vehicle model identity;

receiving vehicle security information that is delivered by the server according to the driving security record of the vehicle corresponding to the vehicle license plate information or the vehicle model identity; and determining, according to the vehicle security information, whether the surrounding vehicle has a security risk.

In an optional embodiment, the driving state information of the surrounding vehicle includes a speed or a driving path of the corresponding vehicle.

The determining, according to the driving state information of the surrounding vehicle, whether the surrounding vehicle has a security risk includes:

determining, according to the speed or the driving path of the surrounding vehicle, whether a driver in the surrounding vehicle is in an abnormal state; and if the driver is in an abnormal state, considering that the surrounding vehicle has a security risk.

Optionally, the road condition information prompting device 3100 may further include the interface circuit 3104. The interface circuit 3104 may include a wireless transmitter/receiver, or may include a wired interface unit such as an optical fiber or cable interface. In an optional embodiment, if determining that the surrounding vehicle has a security risk, the road condition information prompting device 3100 may send a driving security alarm to the server or a nearby user terminal by using the interface circuit 3104.

The road condition information prompting device in this embodiment can determine, according to static information or driving state information of a surrounding vehicle in photographed road condition information, whether the surrounding vehicle has a security risk, so as to send a driving security prompt according to the surrounding vehicle that has a security risk, and improve driving security. In addition, a more convenient and safer vehicle driving environment can be constructed.

An embodiment of the present invention further provides a computer storage medium, where the computer storage medium may store a program, and when the program is executed, some or all of the steps of the methods described in the embodiments of the present invention with reference to FIG. 2 to FIG. 13 are performed.

A person of ordinary skill in the art may understand that all or some of the steps of the method embodiments may be implemented by a program instructing relevant hardware. The program may be stored in a computer readable storage medium. When the program runs, one or a combination of the steps of the method embodiments are performed.

In addition, functional units in the embodiments of the present invention may be integrated into one processing module, or each of the units may exist alone physically, or two or more units are integrated into one module. The integrated module may be implemented in a form of hardware, or may be implemented in a form of a software functional module. When the integrated module is implemented in the form of a software functional module and sold or used as an independent product, the integrated unit may be stored in a computer-readable storage medium.

The foregoing storage medium may be a read-only memory, a magnetic disk or an optical disk. Although the embodiments of the present invention are shown and described above, it can be understood that, the foregoing embodiments are examples, and cannot be construed as a limitation to the present invention. Within the scope of the present invention, a person of ordinary skill in the art may make changes, modifications, replacement, and variations to the foregoing embodiments.

What are disclosed above are merely examples of embodiments of the present invention, and certainly are not intended to limit the protection scope of the present invention. Therefore, equivalent variations made in accordance with the claims of the present invention shall fall within the scope of the present invention.

What is claimed is:

1. A road condition information sharing method comprising:
 receiving, by a server, a road condition information request sent by a first terminal, wherein the road condition information request carries: a road condition position of concern, and a time point of concern, and wherein the server manages device information of a plurality of second terminals including:
 position information reported to, and obtained in advance by, the server at specific time points from the plurality of second terminals, and
 road condition recording capability information indicative of road condition recording capabilities of the plurality of second terminals, the road condition recording capabilities being determined according to credit information of the plurality of second terminals, the credit information of each of the plurality of second terminals indicating a number of times for which road condition information collected by the second terminal was adopted historically;
 determining, by the server, a second terminal of the plurality of second terminals according to: the road condition position of concern, the time point of concern, and the road condition recording capability information, wherein determining the second terminal comprises searching the position information and the road condition recording capability information to obtain the second terminal having a road condition recording capability that meets a preset criterion and located at a distance from the road condition position of concern that is less than a preset distance threshold at the time point of concern, and wherein the second terminal has a road condition recording capability; and
 sending, by the server, a road condition sharing request to the second terminal, the road condition sharing request including a terminal identifier of the first terminal, to enable the second terminal to share road condition information according to: the road condition position of concern, the time point of concern, and the road condition recording capability information, directly with the first terminal according to the terminal identifier of the first terminal, wherein the road condition information includes a photograph of or near the road condition position of concern.

2. The method according to claim 1, wherein the road condition information corresponding to the road condition position of concern comprises a road condition photographing position; and wherein the method further comprises:
 receiving, by the server, the road condition information corresponding to the road condition position of concern and submitted by the second terminal according to the road condition sharing request;
 identifying, by the server, a driving accident image from the road condition information corresponding to the road condition position of concern; and
 sending, by the server, road condition information corresponding to the driving accident image to the first terminal when a photographing position corresponding to the driving accident image matches the road condition position of concern.

3. The method according to claim 2, wherein:
 the road condition information corresponding to the road condition position of concern further comprises a road condition photographing time; wherein the method further comprises:
 identifying, by the server, a driving accident image from the road condition information corresponding to the road condition position of concern, and
 sending, by the server, road condition information corresponding to the driving accident image to the first terminal when the photographing position corresponding to the driving accident image matches the road condition position of concern and a photographing time corresponding to the driving accident image matches the time point of concern.

4. The method according to claim 1, wherein the determining, by the server, a second terminal according to the road condition position of concern further comprises:
 obtaining position information reported to the server by the plurality of second terminals within a preset time period;
 screening the reported position information to determine one or more third terminals, wherein distances between the one or more third terminals and the road condition position of concern are less than the preset distance threshold;
 determining road condition recording capabilities of the one or more third terminals; and
 determining a third terminal of the one or more third terminals having a road condition recording capability that satisfies a preset criterion as the second terminal.

5. A road condition information sharing method, comprising:
 sending, by a first terminal, a condition information request to a server, wherein the server manages device information of a plurality of second terminals including:
 position information reported to, and obtained in advance by, the server at specific time points from the plurality of second terminals, and
 road condition recording capability information indicative of road condition recording capabilities of the plurality of second terminals, the road condition recording capabilities being determined according to credit information of the plurality of second terminals, the credit information of each of the plurality of second terminals indicating a number of times for which road condition information collected by the second terminal was adopted historically;
 wherein the road condition information request carries: a road condition road position of concern, and a time point of concern, to enable the server to:
 determine a second terminal of the plurality of second terminals according to: the road condition position of concern, the time point of concern, and the road condition recording capability information, wherein the server determines the second terminal by searching the position information and the road condition recording capability information to obtain the second terminal having a road condition recording capability that meets a preset criterion and located at a distance from the road condition position of concern that is less than a preset distance threshold at the time point of concern; and send a road condition sharing request to the second terminal, wherein the second terminal has a road condition recording capability; and receiving, by the first terminal, directly from the second terminal, road condition information corresponding to: the road condition position of concern, the time point of concern, and the road condition recording capability information, and sent by the second terminal responsive to the road condition sharing request.

6. The method according to claim 5, wherein the method further comprises:

performing, by the first terminal according to a spatial relationship of road condition recording positions of one or more second terminals, image compositing on road condition information corresponding to the road condition position of concern and sent by at least one of the one or more second terminals; and displaying, by the first terminal, the road condition information corresponding to the road condition position of concern and on which image compositing is performed.

7. A server, comprising a processor and a memory having processor-executable instructions stored thereon, the processor-executable instructions including a plurality of executable modules, the modules including:

a road condition request receiving module, configured to receive a road condition information request sent by a first terminal, wherein the road condition information request carries: a road condition position of concern, and a time point of concern, and wherein the server manages device information of a plurality of second terminals including:

position information reported to, and obtained in advance by, the server at specific time points from the plurality of second terminals, and road condition recording capability information indicative of road condition recording capabilities of the plurality of second terminals, the road condition recording capabilities being determined according to credit information of the plurality of second terminals, the credit information of each of the plurality of second terminals indicating a number of times for which road condition information collected by the second terminal was adopted historically;

a terminal searching module, configured to determine a second terminal of the plurality of second terminals according to: the road condition position of concern, the time point of concern, and the road condition recording capability information, wherein the terminal searching module is further configured to determine the second terminal by searching the position information and the road condition recording capability information to obtain the second terminal having a road condition recording capability that meets a preset criterion and located at a distance from the road condition position of concern that is less than a preset distance threshold at the time point of concern, and wherein the second terminal has a road condition recording capability; and a sharing request sending module, configured to send a road condition sharing request to the second terminal, the road condition sharing request including a terminal identifier of the first terminal, to enable the second terminal to share road condition information according to: the road condition position of concern, the time point of concern, and the road condition recording capability information, directly with the first terminal according to the terminal identifier of the first terminal, wherein the road condition information includes a photograph of or near the road condition position of concern.

8. The server according to claim 7, wherein the road condition information corresponding to the road condition position of concern comprises a road condition photographing position; and the modules further comprises:

an accident image identification module, configured to identify a driving accident image from the road condition information corresponding to the road condition position of concern; wherein the road condition information sending module is configured to send road condition information corresponding to the driving accident image to the first terminal when a photographing position corresponding to the driving accident image matches the road condition position of concern.

9. The server according to claim 8, wherein:

the road condition information corresponding to the road condition position of concern further comprises a road condition photographing time; and the road condition information sending module is configured to send the road condition information corresponding to the driving accident image to the first terminal when the photographing position corresponding to the driving accident image matches the road condition position of concern and a photographing time corresponding to the driving accident image matches the time point of concern.

10. The server according to claim 7, wherein the terminal searching module comprises:

a terminal position obtaining unit, configured to obtain position information reported to the server by the plurality of second terminals within a preset time period;

a terminal screening unit, configured to screen the reported position information to determine one or more third terminals, wherein distances between the one or more third terminals and the road condition position of concern are less than the preset distance threshold;

a recording capability obtaining unit, configured to determine road condition recording capabilities of the one or more third terminals; and a terminal determining unit, configured to determine one of the one or more third terminals having a road condition recording capability that meets a preset criterion as the second terminal.

11. A terminal, comprising a processor and a memory having processor-executable instructions stored thereon, the processor-executable instructions including a plurality of executable modules, the modules including:

a road condition request module, configured to send a road condition information request to a server, wherein the server manages device information of a plurality of second terminals including:

position information reported to, and obtained in advance by, the server at specific time points from the plurality of second terminals, road condition recording capability information indicative of road condition recording capabilities of the plurality of second terminals, the road condition recording capabilities being determined according to credit information of the plurality of second terminals, the credit information of each of the plurality of second terminals indicating a number of times for which road condition information collected by the second terminal was adopted historically; and wherein the road condition information request carries: a road condition position of concern, and a time point of concern, to enable the server to:

determine a second terminal of the plurality of second terminals according to: the road condition position of concern, the time point of concern, and the road condition recording capability information, wherein the server determines the second terminal by searching the position information and the road condition recording capability information to obtain the second terminal having a road condition recording capability that meets a preset criterion and located at a distance from the road condition position of concern that is less than a preset distance threshold at the time point of concern; and send a road condition sharing request to the second terminal, wherein the second terminal has a road condition recording capability; and a road condition receiving module, configured to receive, directly from the second terminal, road condition information corresponding to: the road condition position of concern, the time point of concern, and the road condition recording capability information, and sent by the second terminal responsive to the road condition sharing request.

12. The terminal according to claim 11, the modules further comprising:

an image compositing module, configured to perform, according to a spatial relationship of road condition recording positions of one or more second terminals, image compositing on road condition information corresponding to the road condition position of concern and sent by at least one of the one or more second terminals; and a road condition displaying module, configured to display the road condition information corresponding to the road condition position of concern and on which image compositing is performed.

* * * * *

UNITED STATES PATENT AND TRADEMARK OFFICE
CERTIFICATE OF CORRECTION

| | |
|---|---|
| PATENT NO. | : 10,971,007 B2 |
| APPLICATION NO. | : 15/954028 |
| DATED | : April 6, 2021 |
| INVENTOR(S) | : Zhang et al. |

It is certified that error appears in the above-identified patent and that said Letters Patent is hereby corrected as shown below:

On the Title Page

Page 2, Item (56) Foreign Patent Documents, Citation 4: "CN 102354119 A 2/2012" should read -- CN 102354449 A 2/2012 --.

In the Claims

Claim 8: Column 88, Line 10: "the modules further comprises:" should read -- the modules further comprise: --.

Signed and Sealed this
Twenty-second Day of March, 2022

Drew Hirshfeld
*Performing the Functions and Duties of the
Under Secretary of Commerce for Intellectual Property and
Director of the United States Patent and Trademark Office*